(12) United States Patent
Wigren et al.

(10) Patent No.: US 12,474,432 B2
(45) Date of Patent: Nov. 18, 2025

(54) USER EQUIPMENT (UE) MOVEMENT STATE ESTIMATION BASED ON MEASUREMENTS FOR TWO OR MORE SITES IN A WIRELESS NETWORK

(71) Applicant: Telefonaktiebolaget LM Ericsson (publ), Stockholm (SE)

(72) Inventors: Torbjörn Wigren, Uppsala (SE); Walter Müller, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 301 days.

(21) Appl. No.: 18/028,013

(22) PCT Filed: Oct. 19, 2020

(86) PCT No.: PCT/SE2020/051001
§ 371 (c)(1),
(2) Date: Mar. 23, 2023

(87) PCT Pub. No.: WO2022/086378
PCT Pub. Date: Apr. 28, 2022

(65) Prior Publication Data
US 2023/0341502 A1    Oct. 26, 2023

(51) Int. Cl.
    G01S 5/02    (2010.01)
(52) U.S. Cl.
    CPC .......... *G01S 5/0246* (2020.05); *G01S 5/0268* (2013.01); *G01S 5/0294* (2013.01)
(58) Field of Classification Search
    CPC .... G01S 5/0246; G01S 5/0268; G01S 5/0294; G01S 13/584
    (Continued)

(56) References Cited

U.S. PATENT DOCUMENTS

| 8,886,125 B2 | 11/2014 | Agrawal et al. |
| 2017/0060810 A1 | 3/2017 | Preston et al. |
| 2018/0206075 A1* | 7/2018 | Demirdag ............. G01S 13/584 |

FOREIGN PATENT DOCUMENTS

| CN | 106154253 A | 11/2016 |
| CN | 111650577 A | 9/2020 |
| GB | 2388749 A | 11/2003 |
| JP | 2000131088 A | 5/2000 |
| JP | 2009533990 A | 9/2009 |
| WO | 2020190184 A1 | 9/2020 |

(Continued)

OTHER PUBLICATIONS

"3GPP TS 38.300 V16.2.0", 3rd Generation Partnership Project; Technical Specification Group Radio Access Network; NR; NR and NG-RAN Overall Description; Stage 2 (Release 16), Jul. 2020, pp. 1-148.

(Continued)

*Primary Examiner* — Bo Fan
(74) *Attorney, Agent, or Firm* — Murphy, Bilak & Homiller, PLLC

(57) ABSTRACT

Embodiments include methods for determining a movement state of a user equipment (UE) operating in a radio access network (RAN). Such methods include performing positioning measurements on signals received from a plurality of transmission points (TPs) in the RAN, including first measurements of Doppler shift of signals from a first TP, second measurements of Doppler shift of signals from a second TP that is spatially separated from the first TP, and third measurements of signals from a third TP. The third TP can be the same as the first or second TP, or spatially separated from both. Such methods include determining a UE movement state based on the positioning measurements and an interacting multiple-model (IMM) that includes a first almost-constant velocity model, a second maneuver velocity model, and a Doppler shift bias state common to the first and second models. Other embodiments include complementary methods for a RAN node.

22 Claims, 22 Drawing Sheets

(58) Field of Classification Search
USPC .............. 342/451, 104, 113, 357.51, 357.61
See application file for complete search history.

(56) References Cited

FOREIGN PATENT DOCUMENTS

| WO | 2020256603 A1 | 12/2020 |
|---|---|---|
| WO | 2021054873 A1 | 3/2021 |
| WO | 2021096397 A1 | 5/2021 |

OTHER PUBLICATIONS

"3GPP TS 38.331 V16.1.0", 3rd Generation Partnership Project; Technical Specification Group Radio Access Network; NR; Radio Resource Control (RRC) protocol specification (Release 16), Jul. 2020, pp. 1-906.

Genovese, Anthony F., "The Interacting Multiple Model Algorithm for Accurate State Estimation of Maneuvering Targets", Johns Hopkins APL Technical Digest, vol. 22, No. 4, 2001, pp. 614-623.

Ma, Fuhe, et al., "Direct Position Determination of Moving Sources Based on Delay and Doppler", IEEE Sensors Journal, vol. 20, No. 14, Jul. 15, 2020, pp. 7859-7869.

Tahat, Ashraf, et al., "A Look at the Recent Wireless Positioning Techniques With a Focus on Algorithms for Moving Receivers", IEEE Access; vol. 4, Sep. 7, 2016, pp. 6652-6680.

Meng, Fanchen et al: "New Techniques to Enhance the Performance of Stand-Alone GNSS Positioning", 2015 International Conference On Computational Intelligence and Communication Networks (CICN), IEEE, Dec. 12, 2015 (Dec. 12, 2015), pp. 548-552, XP032947001, DOI: 10.1109/CICN.2015.112 [retrieved on Aug. 16, 2016].

* cited by examiner

USER EQUIPMENT (UE) MOVEMENT STATE ESTIMATION BASED ON MEASUREMENTS FOR TWO OR MORE SITES IN A WIRELESS NETWORK

TECHNICAL FIELD

The present disclosure generally relates to wireless networks, and particularly relates to estimating two-dimensional movement states for user equipment (UE, including aerial UEs) based on UE measurements of signals transmitted by two or more spatially separated sites (e.g., transmission points) in the wireless network.

BACKGROUND

Long Term Evolution (LTE) is an umbrella term for so-called fourth generation (4G) radio access technologies developed within the Third-Generation Partnership Project (3GPP) and initially standardized in Release 8 (Rel-8) and Release 9 (Rel-9), also known as Evolved Universal Mobile Telecommunications System (UMTS) Terrestrial Radio Access Network (E-UTRAN). LTE is targeted at various licensed frequency bands and is accompanied by improvements to non-radio aspects commonly referred to as System Architecture Evolution (SAE), which includes Evolved Packet Core (EPC) network. An LTE E-UTRAN comprises a plurality of evolved Node B's (eNBs), each of which communicates with UEs via one or more cells.

Communications between an LTE network and user equipment (UEs) is based on a multi-layer protocol stack. The multiple access scheme for the LTE PHY is based on Orthogonal Frequency Division Multiplexing (OFDM) with a cyclic prefix (CP) in the downlink (DL), e.g., E-UTRAN to user equipment (UE), and on Single-Carrier Frequency Division Multiple Access (SC-FDMA) with a cyclic prefix in the uplink (UL), e.g., UE to E-UTRAN.

LTE continues to evolve through subsequent releases that are developed according to standards-setting processes with 3GPP and its working groups (WGs), including the Radio Access Network (RAN) WG, and sub-working groups (e.g., RAN1, RAN2, etc.). LTE Rel-10 supports bandwidths larger than 20 MHz. One important requirement on Rel-10 is backward compatibility with LTE Rel-8. This also includes spectrum compatibility in which a wideband LTE Rel-10 carrier (e.g., wider than 20 MHz) should appear as multiple carriers to an LTE Rel-8 ("legacy") terminal ("user equipment" or UE). Each such carrier can be referred to as a Component Carrier (CC). For efficient usage, legacy terminals can be scheduled in all parts of the wideband LTE Rel-10 carrier. This can be done by Carrier Aggregation (CA), in which a Rel-10 terminal receives multiple CCs, each having the same structure as a Rel-8 carrier. LTE Rel-12 introduced dual connectivity (DC) whereby a UE can be connected to two network nodes simultaneously, thereby improving connection robustness and/or capacity.

3GPP standards provide various ways for positioning (e.g., determining the position of, locating, and/or determining the location of) UEs operating in LTE networks. In general, an LTE positioning node (referred to as Evolved Serving Mobile Location Center, "E-SMLC" or "location server") configures a target device (e.g., UE), an eNB, and/or a radio network node dedicated for positioning measurements (e.g., a "location measurement unit" or "LMU") to perform one or more positioning measurements according to one or more positioning methods. For example, the positioning measurements can include timing (and/or timing difference) measurements on UE, network, and/or satellite transmissions. The positioning measurements are used by the target device (e.g., UE), the measuring node, and/or the E-SMLC to determine the location of the target device. UE positioning (also referred to as "location services" or LCS) is also expected to be an important feature for NR networks.

Currently the fifth generation ("5G") of cellular systems, also referred to as New Radio (NR), is being standardized within the Third-Generation Partnership Project (3GPP). NR is developed for maximum flexibility to support many different use cases. These include mobile broadband, machine type communication (MTC), ultra-low latency critical communications (URLCC), side-link device-to-device (D2D), and several other use cases. Fifth-generation NR technology shares many similarities with fourth-generation LTE, particularly in relation to the protocol layers and radio interface. In addition to providing coverage via cells, as in LTE, NR networks also provide coverage via "beams." For example, a DL "beam" can be a coverage area of a network-transmitted reference signal (RS) that may be measured or monitored by UEs. UL beams are transmitted by UEs in a similar manner. DL beams may be available to all proximate UEs ("common") or tailored to support a specific UE's connection to the network ("dedicated").

Positioning is also expected to be an important application for 5G/NR networks. These networks will support positioning methods similar the ones supported in LTE but based on NR positioning measurements. NR will also support one or more additional positioning methods based on different types of measurements than used in LTE networks. However, none of the currently envisioned LTE and NR positioning methods provide the combination of accuracy and availability (e.g., including indoors) that is needed for certain use cases including emergency location, personal safety, and unmanned aerial vehicles (e.g., aerial UEs or drones).

SUMMARY

Embodiments of the present disclosure provide specific improvements to determining movement state (e.g., 2D position and velocity) for UEs operating in a RAN, such as by providing, enabling, and/or facilitating solutions to overcome exemplary problems summarized above and described in more detail below.

Some embodiments include methods (e.g., procedures) for determining a movement state of a user equipment (UE) operating in a radio access network (RAN). These exemplary methods can be implemented by UE (e.g., wireless device, aerial UE, etc.) operating in the RAN (e.g., E-UTRAN, NG-RAN).

These exemplary methods can include performing positioning measurements on signals received from a plurality of transmission points (TPs) in the RAN. The positioning measurements can include the following:
  first measurements of Doppler shift of signals from a first TP, and
  second measurements of Doppler shift of signals from a second TP that is spatially separated from the first TP, and
  third measurements of signals from a third TP.
These exemplary methods can also include determining a UE movement state based on the positioning measurements and an interacting multiple-model (IMM) that includes a first almost-constant velocity model, a second maneuver velocity model, and a Doppler shift bias state common to the first and second models.

In some embodiments, the third measurements are of signal round trip time (RTT) and the third TP is the same as the first TP or the second TP. In some of these embodiments, the third measurements are based on UE timing advance (TA) with respect to any of the following for the UE: a primary cell (PCell), a primary secondary cell (PSCell), and a secondary cell (SCell).

In other embodiments, the third measurements are of Doppler shift and the third TP is spatially separated from the first TP and from the second TP.

In some embodiments, the determined UE movement state can include two-dimensional (2D) horizontal position, 2D horizontal velocity, and Doppler shift bias.

In some embodiments, the IMM model also includes a Hidden Markov Model (HMM) comprising respective transition probabilities of the UE between any of the first and second models during successive updates of the UE movement state. In such embodiments, each transition probability is dependent on the duration between successive updates of the UE movement state.

In some embodiments, the IMM model can include estimated probabilities associated with the first and second models. In such embodiments, the determining operations can include determining first and second movement states for the UE based on the respective first and second models and combining the first and second movement states into the UE movement state according to the estimated probabilities. In some of these embodiments, the first and second movement states can be determined using respective extended Kalman filters (EKFs).

In some embodiments, one of the first and second TPs can be associated with a serving cell for the UE in the RAN, while the other of the first and second TPs is associated with a neighbor cell for the UE in the RAN.

In some embodiments, these exemplary methods can also include receiving, from a RAN node associated with at least one of the first and second TPs, a positioning measurement configuration including one or more of the following:
- a request to initiate determination of UE movement state;
- one or more first trigger events to initiate determination of UE movement state;
- identification of one or more radio access technologies (RATs) of signals to be measured;
- estimated signal round trip time (RTT) between the UE and a TP associated with the RAN node;
- identification of the TP associated with the estimated RTT;
- identification of a plurality of candidate TPs for Doppler shift measurements;
- identification of downlink (DL) carrier frequencies used by the plurality of candidate TPs;
- respective locations for the plurality of candidate TPs;
- one or more rules or criteria for selecting TPs for Doppler shift measurements;
- one or more second trigger events for reporting UE movement state;
- one or more third trigger events for stopping reporting of UE movement state; and
- a reporting interval for periodic reporting of UE movement states.

In some embodiments, the one or more third trigger events are implicit from the respective one or more second trigger events identified in the positioning measurement configuration.

In various embodiments, the determining operations can include determining a first value of the UE movement state based on the estimated signal RTT received from the RAN node and subsequently determining one or more second values of the UE movement state based on UE positioning measurements of signal RTT between the UE and the first TP or the second TP.

In some embodiments, the one or more second trigger events can include any of the following:
- a position within or outside of an area;
- a position change threshold;
- a speed (scalar) or velocity (vector) threshold; and
- a speed (scalar) or velocity (vector) change threshold.

In some embodiments, these exemplary method can also include receiving, from the RAN node, a request for UE capability of movement state determination and sending, to the RAN node, an indication that the UE is capable of movement state determination. In some embodiments, the measurement configuration can be received after sending the indication. Likewise, performing the positioning measurements can be responsive to receiving the measurement configuration.

In some embodiments, these exemplary methods can also include sending one or measurement reports to the RAN node, wherein each measurement report is responsive to one or more of the following from the received positioning measurement configuration: a second trigger event, a third trigger event, and the reporting interval. For example, a first measurement report to can be sent in response to the second trigger event and one or more second measurement reports can be sent at respective one or more reporting intervals after the first measurement report and until occurrence of the third trigger event. In some embodiments, each measurement report can include:
- at least a portion of the UE movement state determined at a particular measurement time,
- the particular measurement time, and
- identification of TPs, carrier frequencies, and/or signals used in the positioning measurements from which the included UE movement state was determined.

Other embodiments include methods (e.g., procedures) to facilitate user equipment (UE) determination of movement state. These exemplary methods can be implemented by a RAN node (e.g., base station, eNB, gNB, ng-eNB, en-gNB, etc.) serving a cell in the RAN (e.g., E-UTRAN, NG-RAN).

These exemplary methods can include, at a first transmission point (TP) associated with the RAN node, transmitting one or more signals that facilitate first UE measurements of Doppler shift. These exemplary methods can also include receiving, from a UE, one or more measurement reports including at least a portion of a UE movement state determined at respective one or more measurement times based on:
- the first UE measurements of Doppler shift,
- second UE measurements of Doppler shift of signals transmitted by a second TP that is spatially separated from the first TP,
- third measurements of signals from a third TP, and
- an interacting multiple-model (IMM) that includes:
  - a first almost-constant velocity model,
  - a second maneuver velocity model, and
  - a Doppler shift bias state common to the first and second models.

In some embodiments, the third measurements are of signal round trip time (RTT) and the third TP is the same as the first TP or the second TP. In some of these embodiments, the third measurements are based on UE timing advance (TA) with respect to any of the following for the UE: a primary cell (PCell), a primary secondary cell (PSCell), and a secondary cell (SCell).

In other embodiments, the third measurements are of Doppler shift and the third TP is spatially separated from the first TP and from the second TP.

In some embodiments, the UE movement state can include two-dimensional (2D) horizontal position, 2D horizontal velocity, and Doppler shift bias. For example, the 2D horizontal position and the 2D horizontal velocity can be included in the received measurement report(s).

In some embodiments, the first TP can be associated with a serving cell for the UE in the RAN, while the second TP can be associated with a neighbor cell for the UE in the RAN.

In some embodiments, the exemplary method can also include sending, to the UE, a positioning measurement configuration including any of the features summarized above in relation to UE embodiments.

In some embodiments, the exemplary method can also include sending, to the UE, a request for UE capability of movement state determination and receiving, from the UE, an indication that the UE is capable of movement state determination. In some embodiments, the measurement configuration can be sent after receiving the indication.

In some embodiments, the one or more measurement reports can include:
 a first measurement report including the at least a portion of the UE movement state determined based on an estimated signal RTT determined by the RAN node; and
 one or more subsequent second measurement reports including the at least a portion of the UE movement state determined based on UE positioning measurements of signal RTT between the UE and the first TP.

In some embodiments, each measurement report can be responsive to a second trigger event, a third trigger event, and/or a reporting interval included in the positioning measurement configuration, in a similar manner as summarized above for UE embodiments. In some embodiments, each measurement report can also include the following:
 the measurement time corresponding to the included UE movement state; and
 identification of TPs, carrier frequencies, and/or signals used in UE positioning measurements from which the included UE movement state was determined.

Other embodiments include UEs (e.g., wireless devices, aerial UEs, etc. or a component thereof) and RAN nodes (e.g., base stations, eNBs, gNBs, ng-eNBs, en-gNBs, etc. or components thereof) configured to perform operations corresponding to any of the exemplary methods described herein. Other embodiments include non-transitory, computer-readable media storing program instructions that, when executed by processing circuitry, configure such UEs or RAN nodes to perform operations corresponding to any of the exemplary methods described herein.

These and other objects, features, and advantages of embodiments disclosed herein will become apparent upon reading the following Detailed Description in view of the Drawings briefly described below.

DETAILED DESCRIPTION

Figure 1:
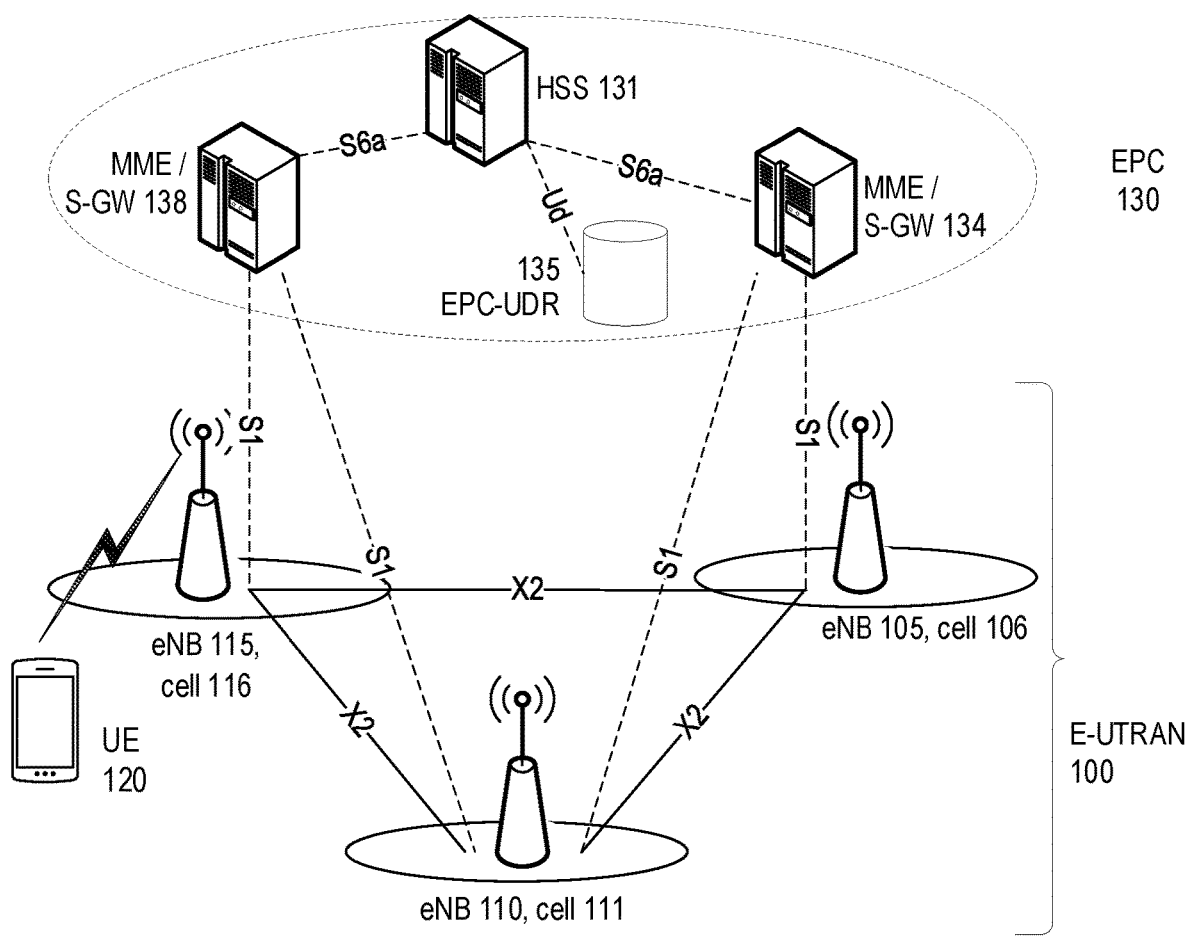
FIG. 1 is a high-level block diagram of an exemplary architecture of the Long-Term Evolution (LTE) Evolved UTRAN (E-UTRAN) and Evolved Packet Core (EPC) network, as standardized by 3GPP.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided as examples to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objects, features, and advantages of the enclosed embodiments will be apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., Centralized Unit (CU) and Distributed Unit (DU)), a high-power or macro base station, a low-power base station (e.g., micro, pico, femto, or home base station, or the like), an integrated access backhaul (IAB) node, a transmission point (TP), a transmission reception point (TRP), a remote radio unit (RRU) or Remote Radio Head (RRH), and a relay node.

Core Network Node: As used herein, a "core network node" is any type of node in a core network. Some examples of a core network node include, e.g., a Mobility Management Entity (MME), a serving gateway (SGW), a Packet Data Network (PDN) Gateway (P-GW), a Policy and Charging Rules Function (PCRF), an access and mobility management function (AMF), a session management function (SMF), a user plane function (UPF), a Charging Function (CHF), a Policy Control Function (PCF), an Authentication Server Function (AUSF), a location management function (LMF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with "user equipment" (or "UE" for short). Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, aerial UEs (or drones), etc.

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Base station: As used herein, a "base station" may comprise a physical or a logical node transmitting or controlling the transmission of radio signals, e.g., eNB, gNB, ng-eNB, en-gNB, centralized unit (CU)/distributed unit (DU), transmitting radio network node, transmission point (TP), transmission reception point (TRP), remote radio head (RRH), remote radio unit (RRU), Distributed Antenna System (DAS), relay, etc.

Positioning node: As used herein, "positioning node" can refer to a network node with positioning functionality, e.g., ability to provide assistance data, request positioning measurements, calculate a location based on positioning measurements, and/or provide a calculated location to other network nodes or to an external client.

Positioning signals: As used herein, "positioning signals" may include any signal or channel to be received by a UE or a network node for performing a positioning measurement such as a DL reference signal, Positioning Reference Signals (PRS), Synchronization Signal Block (SSB), synchronization signal, Demodulation Reference Signal (DM-RS), Channel State Information Reference Signal (CSI-RS), Sounding Reference Signal (SRS), satellite signal, etc.

Positioning measurements: As used herein, "positioning measurements" may include timing measurements (e.g., time difference of arrival, TDOA, RSTD, time-of-arrival, TOA, Rx-Tx time difference, Round Trip Time (RTT), etc.), frequency-related measurements (e.g., Doppler shift), power-based measurements (e.g., reference signal received power (RSRP), reference signal received quality (RSRQ), signal-to-interference-plus-noise ratio (SINR), path loss, etc.), identifier detection/measurement (e.g., cell ID, beam ID, etc.), and/or other sensor measurement (e.g., barometric pressure) that are configured for a positioning method (e.g., OTDOA, Enhanced Cell ID, E-CID, Assisted GNSS, A-GNSS, etc.). UE positioning measurements may be reported to a network node or may be used for positioning purposes by the UE.

The above definitions are not meant to be exclusive. In other words, various ones of the above terms may be explained and/or described elsewhere in the present disclosure using the same or similar terminology. Nevertheless, to the extent that such other explanations and/or descriptions conflict with the above definitions, the above definitions should control.

Note that the description given herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As briefly mentioned above, none of the currently envisioned LTE and NR positioning methods provide the combination of accuracy and availability (e.g., including indoors) that is needed for certain use cases including emergency location, personal safety, and unmanned aerial vehicles (e.g., aerial UEs or drones). This is discussed in more detail after the following discussion of LTE and 5G/NR network architectures and LTE and NR positioning architectures.

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or Global System for Mobile Communications (GSM) Enhanced Data rates for GSM Evolution (EDGE) Radio Access Network (GERAN), as the third-generation ("3G") and second-generation ("2G") 3GPP RANs are commonly known.

As specified by 3GPP, E-UTRAN 100 is responsible for all radio-related functions in the network, including radio bearer control, radio admission control, radio mobility control, scheduling, and dynamic allocation of resources to UEs (e.g., UE 120) in uplink and downlink, as well as security of the communications with UEs. These functions reside in the eNBs, such as eNBs 105, 110, and 115. Each of the eNBs can serve a geographic coverage area including one more cells, including cells 106, 111, and 116 served by eNBs 105, 110, and 115, respectively.

The eNBs in the E-UTRAN communicate with each other via the X2 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. Generally speaking, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The SGW handles all Internet Protocol (IP) data packets (e.g., data or user plane) between the UE and the EPC and serves as the local mobility anchor for the data bearers when UE 120 moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations. HSS 131 can also communicate with MME/S-GWs 134 and 138 via respective Sha interfaces.

In some embodiments, HSS 131 can communicate with a user data repository (UDR)-labelled EPC-UDR 135 in FIG. 1—via a Ud interface. EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

Figure 2:
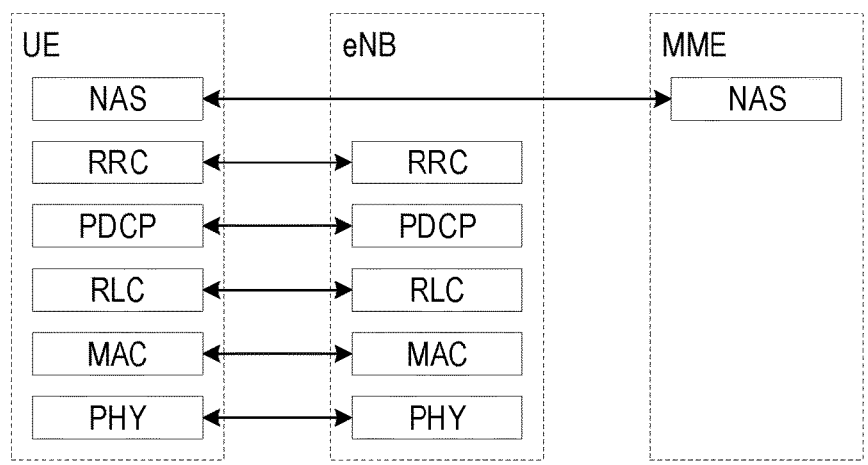
FIG. 2 illustrates an exemplary LTE control plane (CP) protocol stack between a UE, an eNB, and an MME.

FIG. 2 illustrates a block diagram of an exemplary control plane (CP) protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PDCP layer provides ciphering/deciphering and integrity protection for both CP and user plane (UP), as well as other UP functions such as header compression. The exemplary protocol stack also includes non-access stratum (NAS) signaling between the UE and the MME.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur), The UE returns to RRC_IDLE after the connection with the network is released. In RRC_IDLE state, the UE's radio is active on a discontinuous reception (DRX) schedule configured by upper layers. During DRX active periods (also referred to as "DRX On durations"), an RRC_IDLE UE receives system information (SI) broadcast by a serving cell, performs measurements of neighbor cells to support cell reselection, and monitors a paging channel on PDCCH for pages from the EPC via eNB. A LTE in RRC_IDLE state is known in the EPC and has an assigned IP address, but is not known to the serving eNB (e.g., there is no stored context).

Figure 3:
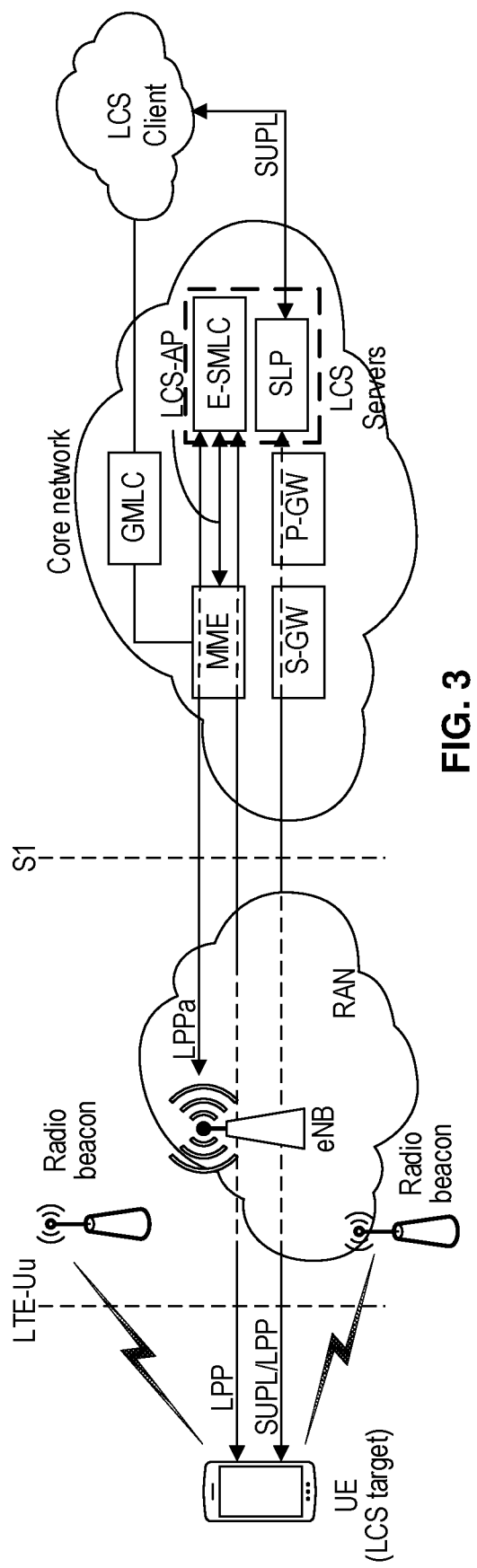
FIG. 3 illustrates a high-level architecture for UE positioning in LTE networks.

FIG. 3 shows an exemplary positioning architecture within an LTE network. Three important functional elements of the LTE positioning architecture are LCS Client, LCS target, and LCS Server. The LCS Server is a physical or logical entity (e.g., as embodied by the E-SMLC or SLP in FIG. 3) that manages positioning for an LCS target (e.g., as embodied by the UE in FIG. 3) by collecting positioning measurements and other location information, assisting the terminal in positioning measurements when necessary, and estimating the LCS target location.

In general, LCS Servers are located in a Core Network (CN, e.g., EPC) and communicate with and/or via other CN nodes and/or functions such as MME, S-GW, and Packet Data Network Gateway (P-GW). The E-SMLC is responsible for control-plane (CP) positioning and communicates with various entities using different protocols. For example, E-SMLC communicates with MME via LCS Application Protocol (LCS-AP), with the RAN (e.g., E-UTRAN) via LTE Positioning Protocol A (LPPa) (which can be transparent to MME), and with the LCS target via LTE Positioning Protocol (LPP) (which can be transparent to both RAN and MME). In contrast, the SLP is responsible for user-plane (UP) positioning procedures. The SLP communicates with the UE via LPP and/or secure user plane location (SUPL) protocols, which can be transparent to other UP entities including RAN, S-GW, and P-GW. The LTE radio interface between RAN and UE is also referred to as LTE-Uu.

An LCS Client is a software and/or hardware entity that interacts with an LCS Server for the purpose of obtaining location information for one or more LCS targets (i.e., the entities being positioned) such as the UE in FIG. 3. LCS Clients may also reside in the LCS targets themselves. An LCS Client sends a request to an LCS Server to obtain location information, and the LCS Server processes and serves the received requests and sends the positioning result and optionally a velocity estimate to the LCS Client. A positioning request can originate from the terminal or a network node or external client. For example, an external LCS client can communicate with SLP via SUPL and with E-SMLC via Gateway Mobile Location Centre (GMLC) and MME.

In the LTE architecture shown in FIG. 3, position calculation can be conducted, for example, by the LCS Server (e.g., E-SMLC or SLP) or by the LCS target (e.g., a UE). The former approach corresponds to the UE-assisted positioning mode when it is based on UE positioning measurements, whilst the latter corresponds to the UE-based positioning mode. The following positioning methods are supported in LTE:

Enhanced Cell ID (E-CID). Utilizes information to associate the UE with the geographical area of a serving cell, and then additional information to determine a finer granularity position. The following positioning measurements are supported for E-CID: Angle of Arrival (AoA) (base station only), UE Rx-Tx time difference, timing advance (TA) types 1 and 2, reference signal received power (RSRP), and reference signal received quality (RSRQ).

Assisted GNSS (A-GNSS). The UE receives and measures Global Navigation Satellite System (GNSS) signals, supported by assistance information provided to the UE from E-SMLC.

OTDOA (Observed Time Difference of Arrival). The UE receives and measures LTE signals transmitted by the RAN (including eNBs and radio beacons), supported by assistance information provided to the UE from E-SMLC.

UTDOA (Uplink TDOA). The UE is requested to transmit a specific waveform that is detected by multiple location measurement units (LMUs, which may be stand-alone, co-located or integrated into an eNB) at known positions. These positioning measurements are forwarded to the E-SMLC for multilateration.

A Terrestrial Beacon System (TBS) may be used to further enhance the positioning methods based on radio signals received by an LCS target (e.g., UE). The TBS can include a network of ground-based transmitters that broadcast signals only for positioning purposes. These can include the (non-LTE) Metropolitan Beacon System (MBS) signals as well as LTE Positioning Reference Signals (PRS), discussed in more detail below.

In addition, one or more of the following positioning modes can be utilized in each of the positioning methods listed above:

UE-Assisted: The UE performs positioning measurements with or without assistance from the network and sends these measurements to the E-SMLC where the position calculation may take place.

UE-Based: The UE performs positioning measurements and calculates its own position with assistance from the network.

Standalone: The UE performs positioning measurements and calculates its own position without network assistance.

The detailed assistance data may include information about network node locations, beam directions, satellite orbits and clocks, etc. The assistance data can be provided to the UE via unicast or via broadcast.

Figure 4:
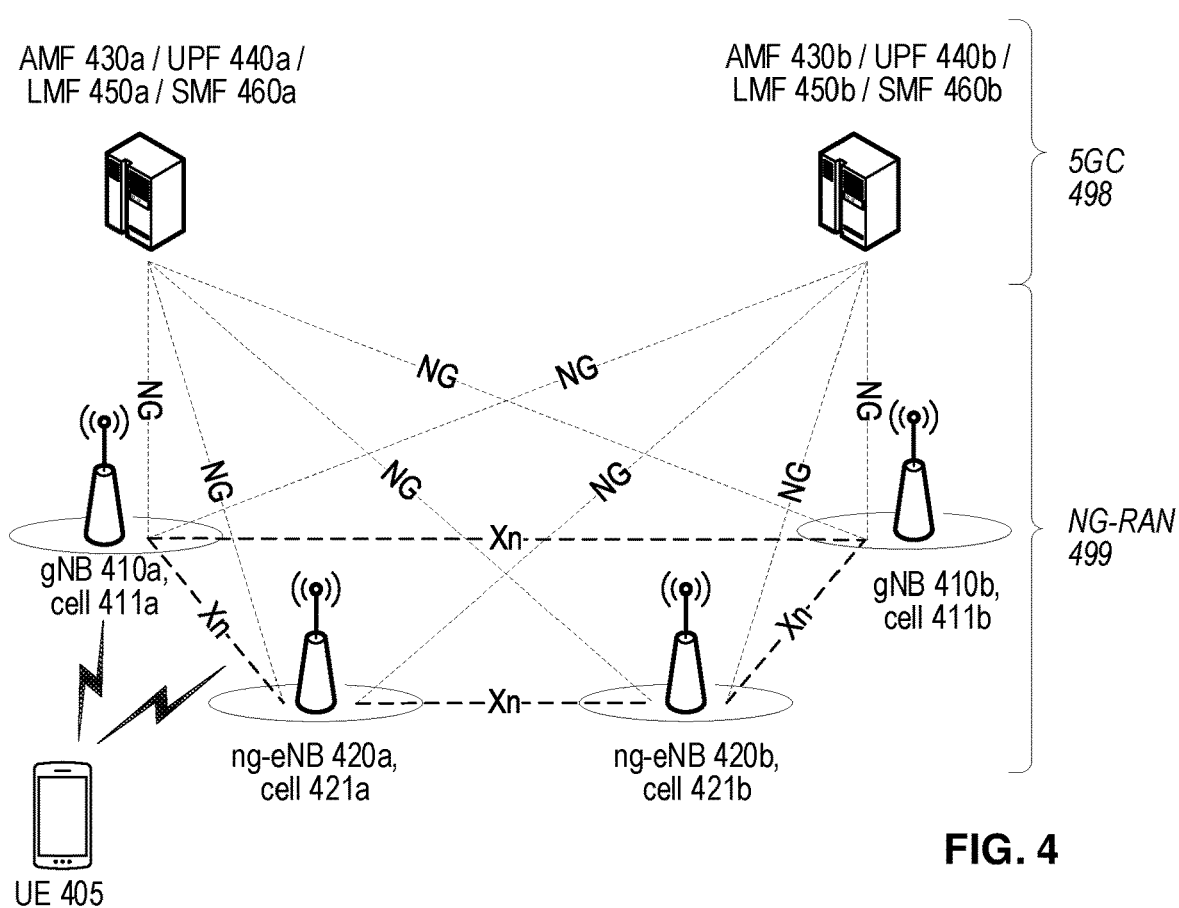
FIG. 4 shows a high-level view of an exemplary 5G network architecture, according to various exemplary embodiments of the present disclosure.

As mentioned above, positioning is also expected to be an important application for 5G networks. FIG. 4 shows a high-level view of an exemplary 5G network architecture, including a Next Generation Radio Access Network (NG-RAN) 499 and a 5G Core (5GC) 498. As shown in the figure, NG-RAN 499 can include gNBs 410 (e.g., 410a,b) and ng-eNBs 420 (e.g., 420a,b) that are interconnected with each other via respective Xn interfaces. The gNBs and ng-eNBs are also connected via the NG interfaces to 5GC 598, more specifically to the AMF (Access and Mobility Management Function) 430 (e.g., AMFs 430a,b) via respective NG-C interfaces and to the UPF (User Plane Function) 440 (e.g., UPFs 440a,b) via respective NG-U interfaces. Moreover, AMFs 430a,b and UPFs 440a,b can communicate with one or more location management functions (LMFs, e.g., LMFs 450a,b) and session management functions (SMFs, e.g., SMFs 460a,b). The AMFs, UPFs, LMFs, and SMFs are described further below.

Each of the gNBs 410 can support the NR radio interface including frequency division duplexing (FDD), time division duplexing (TDD), or a combination thereof. In contrast, each of ng-eNBs 420 can support the LTE radio interface but, unlike conventional LTE eNBs (such as shown in FIG. 1), can also connect to the 5GC via the NG interface. Each of the gNBs and ng-eNBs can serve a geographic coverage area including one or more cells, including cells 411a-b and 421a-b shown as exemplary in FIG. 4. As mentioned above, the gNBs and ng-eNBs can also use various directional beams to provide coverage in the respective cells. Depending on the particular cell in which it is located, a UE 405 can communicate with the gNB or ng-eNB serving that particular cell via the NR or LTE radio interface, respectively.

Each of the gNBs 410 may include and/or be associated with a plurality of Transmission Reception Points (TRPs). Each TRP is typically an antenna array with one or more antenna elements and is located at a specific geographical location. In this manner, a gNB associated with multiple TRPs can transmit the same or different signals from each of the TRPs. For example, a gNB can transmit different version of the same signal on multiple TRPs to a single UE. Each of the TRPs can also employ beams for transmission and reception towards the UEs served by the gNB, as discussed above.

UPFs 440a,b support handling of user plane traffic based on the rules received from SMFs 460a,b, including packet inspection and different enforcement actions (e.g., event detection and reporting). UPFs communicate with the RAN (e.g., NG-RAN) via the N3 reference point, with SMFs via the N4 reference point, and with an external packet data network (PDN) via the N6 reference point. The N9 reference point is for communication between two UPFs.

SMFs 460a,b interact with the decoupled traffic (or user) plane, including creating, updating, and removing Protocol Data Unit (PDU) sessions and managing session context with the UPF, e.g., for event reporting. For example, SMFs perform data flow detection (e.g., based on filter definitions included in Policy and Charging Control (PCC) rules), online and offline charging interactions, and policy enforcement.

AMFs 430a,b terminate the RAN CP interface and handle all mobility and connection management of UEs (similar to MME in EPC). AMFs communicate with UEs via the N1 reference point and with the RAN (e.g., NG-RAN) via the N2 reference point.

LMFs 450a,b support various functions related to determination of UE locations, including location determination for a UE and obtaining any of the following: DL positioning measurements or a location estimate from the UE; UL positioning measurements from the NG RAN; and non-UE associated assistance data from the NG RAN.

Figure 5:
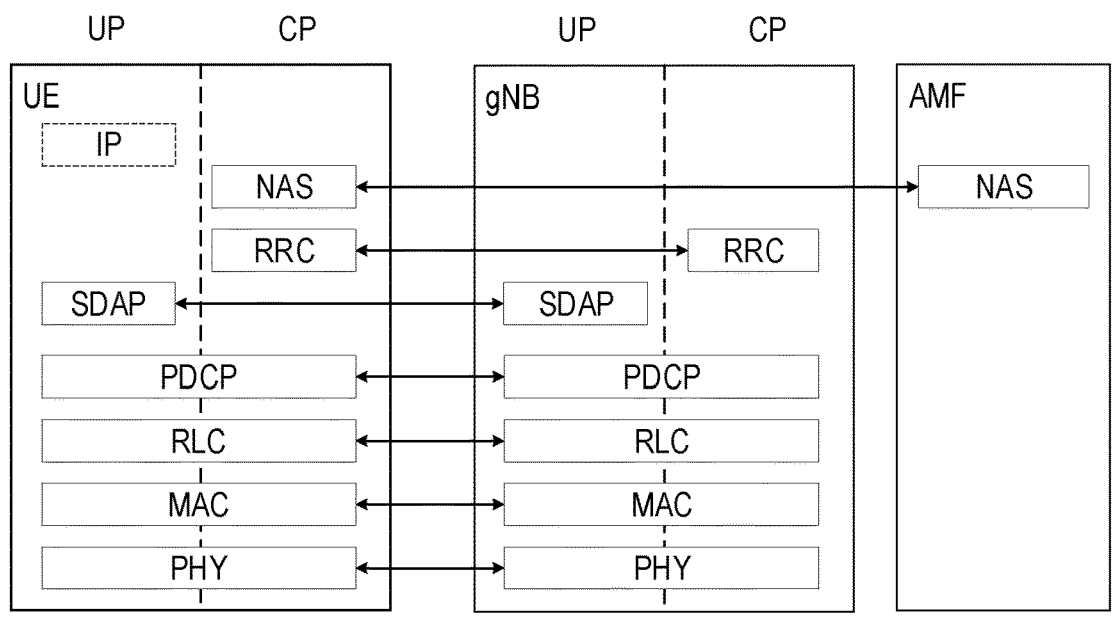
FIG. 5 shows an exemplary configuration of NR user plane (UP) and control plane (CP) protocol stacks.

FIG. 5 shows an exemplary configuration of NR user plane (UP) and control plane (CP) protocol stacks between a UE, a gNB, and an AMF, such as those shown in FIG. 4. The PHY, MAC, RLC, and PDCP layers between the UE and the gNB are common to UP and CP. The PDCP layer provides ciphering/deciphering, integrity protection, sequence numbering, reordering, and duplicate detection for both CP and UP. In addition, PDCP provides header compression and retransmission for UP data.

On the UP side, Internet protocol (IP) packets arrive to the PDCP layer as service data units (SDUs), and PDCP creates protocol data units (PDUs) to deliver to RLC. When each IP packet arrives, PDCP starts a discard timer. When this timer expires, PDCP discards the associated SDU and the corresponding PDU. If the PDU was delivered to RLC, PDCP also indicates the discard to RLC.

The RLC layer transfers PDCP PDUs to the MAC through logical channels (LCH). RLC provides error detection/correction, concatenation, segmentation/reassembly, sequence numbering, and reordering of data transferred to/from the upper layers. If RLC receives a discard indication from associated with a PDCP PDU, it will discard the corresponding RLC SDU (or any segment thereof) if it has not been sent to lower layers.

The MAC layer provides mapping between LCHs and PHY transport channels, LCH prioritization, multiplexing into or demultiplexing from transport blocks (TBs), hybrid ARQ (HARQ) error correction, and dynamic scheduling (on gNB side). The PHY layer provides transport channel services to the MAC layer and handles transfer over the NR radio interface, e.g., via modulation, coding, antenna mapping, and beam forming.

On UP side, the Service Data Adaptation Protocol (SDAP) layer handles quality-of-service (QoS). This includes mapping between QoS flows and Data Radio Bearers (DRBs) and marking QoS flow identifiers (QFI) in UL and DL packets. On CP side, the non-access stratum (NAS) layer is between UE and AMF and handles UE/gNB authentication, mobility management, and security control.

The RRC layer sits below NAS in the UE but terminates in the gNB rather than the AMF. The NR RRC layer is similar in many ways to the LTE RRC layer, described above. In addition to RRC_IDLE and RRC_CONNECTED states, the NR RRC layer includes an RRC_INACTIVE state in which a UE is known (e.g., via UE context) by the serving gNB. RRC_INACTIVE has some properties similar to a "suspended" condition used in LTE.

In a typical operation, an AMF can receive a request for a location service associated with a particular target UE from another entity (e.g., a gateway mobile location center, GMLC), or the AMF itself can initiate some location service on behalf of a particular target UE (e.g., for an emergency call from the UE). The AMF then sends a location services (LS) request to the LMF. The LMF processes the LS request, which may include transferring assistance data to the target UE to assist with UE-based and/or UE-assisted positioning; and/or positioning of the target UE. The LMF then returns the result of the LS (e.g., a position estimate for the UE and/or an indication of any assistance data transferred to the UE) to the AMF or to another entity (e.g., GMLC) that requested the LS.

An LMF may have a signaling connection to an E-SMLC, enabling the LMF to access information from E-UTRAN, e.g., to support E-UTRA OTDOA positioning using downlink positioning measurements obtained by a target UE. An LMF can also have a signaling connection to an SLP, the LTE entity responsible for user-plane positioning.

Various interfaces and protocols are used for, or involved in, NR positioning. The LTE Positioning Protocol (LPP) is used between a target device (e.g., UE in the control-plane, or SET in the user-plane) and a positioning server (e.g., LMF in the control-plane, SLP in the user-plane). LPP can use either the control- or user-plane protocols as underlying transport. NR Positioning Protocol (NRPP) is terminated between a target device and the LMF. RRC protocol is used between UE and gNB (via NR radio interface) and between UE and ng-eNB (via LTE radio interface).

Furthermore, the NR Positioning Protocol A (NRPPa) carries information between the NG-RAN Node and the LMF and is transparent to the AMF. As such, the AMF routes the NRPPa PDUs transparently (e.g., without knowledge of the involved NRPPa transaction) over NG-C interface based on a Routing ID corresponding to the involved LMF. More specifically, the AMF carries the NRPPa PDUs over NG-C interface either in UE associated mode or non-UE associated mode. The NGAP protocol between the AMF and an NG-RAN node (e.g., gNB or ng-eNB) is used as transport for LPP and NRPPa messages over the NG-C interface. NGAP is also used to instigate and terminate NG-RAN-related positioning procedures.

LPP/NRPP are used to deliver messages such as positioning capability request, OTDOA positioning measurements request, and OTDOA assistance data to the UE from a positioning node (e.g., location server). LPP/NRPP are also used to deliver messages from the UE to the positioning node including, e.g., UE capability, UE positioning measurements for UE-assisted OTDOA positioning, UE request for additional assistance data, UE configuration parameter(s) to be used to create UE-specific OTDOA assistance data, etc. NRPPa is used to deliver the information between ng-eNB/gNB and LMF in both directions. This can include LMF requesting some information from ng-eNB/gNB, and ng-eNB/gNB providing some information to LMF. For example, this can include information about PRS transmitted by ng-eNB/gNB that are to be used for OTDOA positioning measurements by the UE.

NR networks will support positioning methods similar to LTE E-CID, OTDOA, and UTDOA but based on NR positioning measurements. NR may also support one or more of the following position methods:

Multi-RTT: The device (e.g. UE) computes UE Rx-Tx time difference and gNBs compute gNB Rx-Tx time difference. The results are combined to find the UE position based upon round trip time (RTT) calculation.

DL angle of departure (DL-AoD): gNB or LMF calculates the UE angular position based upon UE DL RSRP measurement results (e.g., of PRS transmitted by network nodes).

UL angle of arrival (UL-AoA): gNB calculates the UL AoA based upon positioning measurements of a UE's UL SRS transmissions.

Each of the NR positioning methods can be supported in UE-assisted, UE-based or UE-standalone modes, similar to LTE discussed above.

In OTDOA positioning, a UE measures the reference signal time difference (RSTD) between RS transmitted by a reference cell and RS transmitted by at least two neighbor cells. The UE measures time-of-arrival (TOA) for RS transmitted by various cells (or TRPs). Each measurement depends on the time when the cell (e.g., eNB or gNB) transmitted the measured RS and the propagation distance between the cell and UE antennas.

Although OTDOA can be relatively accurate, it is generally much less accurate than A-GNSS. A primary advantage of OTDOA is that it provides high precision positioning indoors, where the availability of A-GNSS is very limited. However, OTDOA requires RS timing measurements on at least three cells to determine a two-dimensional UE location and one at least four cells to determine a three-dimensional UE location. Furthermore, measurements on even more cells may be needed to achieve an acceptable accuracy, which may not be possible and/or feasible in many situations.

A-GNSS is an aggregation of several national or regional navigation systems including the U.S. Global Positioning System (GPS), the Russian GLObal NAvigation Satellite System (GLONASS), the European Galileo system, and the Chinese Compass and Beidu systems. Each includes a relatively large number of satellites that transmit positioning signals with properties that facilitate timing measurements. Each also provides highly accurate satellite orbital parameters such that receivers can accurately determine satellite positions and transmission timing associated with any measured signal. Given this information, receivers can determine a "pseudorange" to each satellite measured, which includes the receiver's unknown time offset from GNSS time. Given enough pseudoranges, the receiver can determine its own position and time offset with very high accuracy. In general, GNSS receivers produce position results that can be easily translated to Cartesian position in the local earth tangential coordinate system, e.g., used for state estimation as discussed further below.

Although conventional UEs can provide position measurements based on 3GPP A-GNSS techniques, operators of aerial UEs often disable such features. In such cases, the network (e.g., E-SMLC, LMF) must determine a position measurement and/or estimate the current state of the aerial UE based on positioning measurements made by RAN nodes.

In general, TDOA methods produce relatively poor estimates of UE altitude relative to local topography. This is due to inter-site measurement geometry, specifically that the base station transmitting/receiving antennas are all located at similar altitudes. Furthermore, aerial UEs are often flying at approximately the same altitudes as the antennas. Since all entities involved in these TDOA measurements are roughly in one plane, small variations in aerial UE altitude are obscured by noise or uncertainty of the TOA measurements, resulting in poor altitude accuracy. This effect is also known as a high vertical geographical dilution of precision (GDOP), which refers to a ratio of vertical position determination error to range measurement error.

Other positioning measurements can be used to improve altitude accuracy. One possibility is to augment TDOA measurements with barometric measurements, which can indicate altitude variation. Such measurements are standardized in LTE and NR and available in many UE brands. Barometric measurements can also be used to augment other positioning methods such as assisted GNSS.

Figure 6:
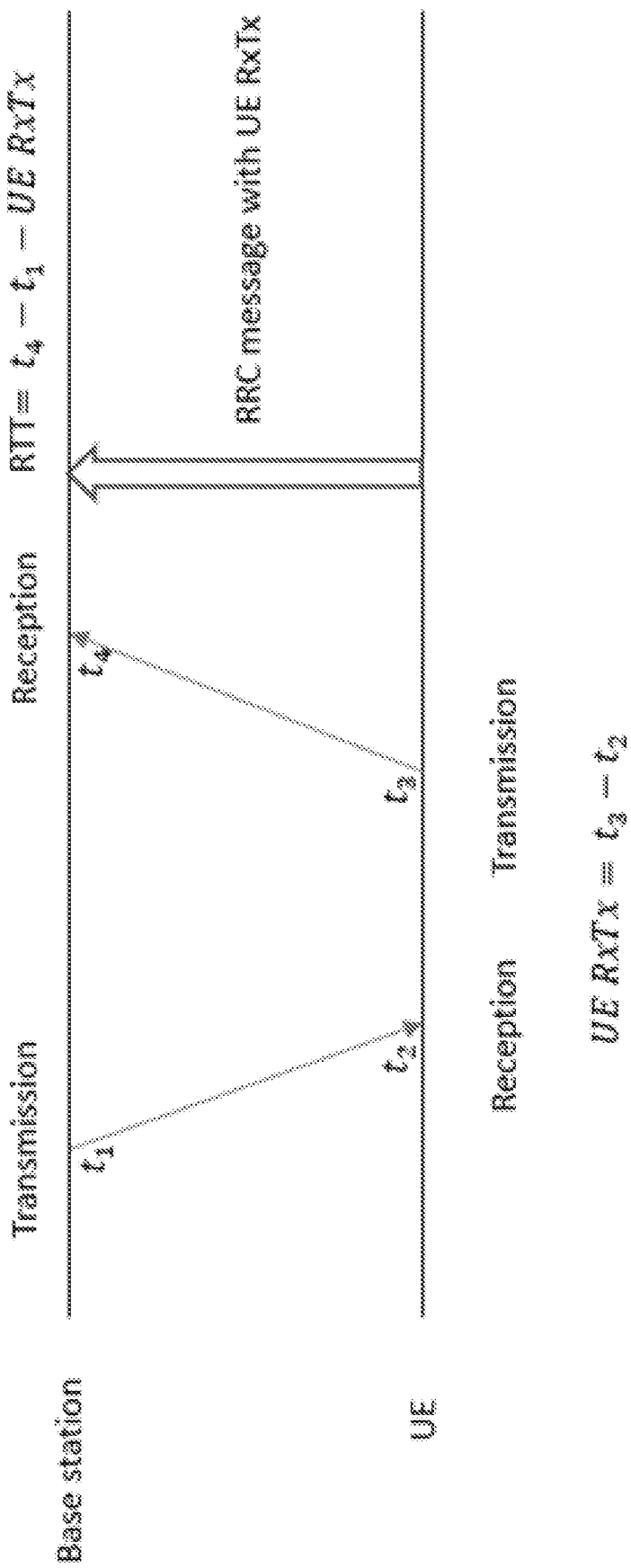
FIG. 6 illustrates principles of measuring round-trip time (RTT) between a UE and a base station.

RTT (round-trip time) measurements represent the travel time of radio waves from a base station to a UE and back. Given an RTT measurement, the range R can be computed as:

$$R = c\frac{RTT}{2}$$

where c denotes the speed of light. FIG. 6 illustrates principles of RTT measurement. As shown in FIG. 6, the RTT value is obtained as $$RTT = t_4 - t_1 - \text{UE } RxTx,$$

where UE RxTX is measured in the UE as $$\text{UE } RxTx = t_3 - t_2$$

and reported back to the base station via RRC or MAC protocols.

The main inaccuracy in R is due to signal reception processes in the UE and the base station. The theoretical inaccuracy of one such measurement is, in free space propagation, inversely proportional to the measurement bandwidth, as:

$$\Delta t = \frac{1}{4\pi \Delta f}$$

For an example measurement bandwidth of 30 MHz, the best possible time inaccuracy (one standard deviation) is 2.65 ns, which is slightly less than 1 m in distance at the speed of light. Since two independent measurement processes are used for RTT a 40-MHz measurement bandwidth would result in a combined RTT measurement inaccuracy of about 1 m.

In addition, Doppler shift measurements can be made by UEs or base stations in the E-UTRAN and/or NG-RAN. A Doppler shift (or Doppler frequency) is related to the speed of a UE in the direction to or from a radio source (e.g., base station), computed as:

$$f_D = \frac{v}{c} f_c$$

where $f_D$ is the Doppler frequency, v is the (departing) velocity of the UE relative to the base station, c is the speed of light and $f_c$ is the carrier frequency.

A Doppler shift measurement can be obtained in several ways: One approach is to use the Fourier transforms performed during OFDM reception in LTE and NR systems. The Fourier transform relationship $$e^{iw_0t}f(t) \leftrightarrow F(j(w-w_0))$$

can then be exploited in the uplink to compare the phase shift between reference signals on say two OFDM symbols after each other. This also allows for multi-base station doppler shift measurement.

In both LTE and NR, physical uplink control channel (PUCCH) transmissions by the UE can be measured for Doppler shift by base stations, while sounding reference signals (SRSs) can also be measured by NR base stations (e.g., gNBs). UEs can measure Doppler shift on various DL RS including PRS and cell-specific RS (CRS). For example, NR UEs may estimate Doppler shift based on the same symbols used for reference signal received power (RSRP) measurements. In addition, one gNB or TRP may transmit beams in different directions that may be sufficiently spatially separate such that a UE can accurately measure Doppler shift on beam specific reference signals (e.g., SSB).

There are many use cases where accurate estimates of UE Cartesian two-dimensional (2D) position and velocity (i.e., without vertical altitude and velocity) is important. These include:
- Seamless high accuracy personal navigation, independent of A-GNSS and accurate network-based methods.
- Seamless personal safety and E-911 localization, independent of A-GNSS and accurate network-based methods.
- Traffic flow analysis. This use case is associated with estimation of large scale movement patterns, e.g., traffic flow in cities, crowd movement in larger accidents or social unrest, etc. This use case benefits from accurate and seamless 2D position and velocity estimation in areas without A-GNSS availability
- Seamless support of network functionality such as predictive or conditional handover. This use case is associated with rapidly moving UEs that may drop their connection before a handover can be completed or even initiated. Accurate estimates of UE position and velocity is needed for prediction of handover. The relevant scenarios often occur indoors, in trains or buses, in tunnels, etc., all of which suffer from A-GNSS unavailability. OTDOA and U-TDOA methods do not provided needed velocity information.

Additionally, airborne radio-controlled drones (i.e., unmanned aerial vehicles or UAVs for short) are becoming more and more common. Conventionally, drones have been limited to operate within the propagation range of radio signals from dedicated or associated controllers used by drone operators. However, recently functionality allowing drones to be remotely controlled over the cellular network has increased their range considerably. However, a recent trend is to extend drone operational range by attaching an LTE UE and coupling the UE to the drone's navigation system, thereby creating an "airborne UE" or "aerial UE". With this arrangement, the drone can be controlled over a much wider range covering multiple cells, limited primarily by the drone's battery capacity. In some markets, this is already being regulated, such as by requiring UEs attached to drones in this manner to be registered as aerial UEs. Even so, many operators fail (or refuse) to register their aerial UEs, such that these drones become "rogue drones". In the following, the terms "aerial UE" and "drone" are used interchangeably unless otherwise noted.

Aerial UEs need to be restricted in flight for various reasons. For example, aerial UEs may experience radio propagation conditions that are different than those experienced by a conventional UE on or close to the ground. When an aerial UE is flying at a low altitude relative to a base station antenna height, the aerial UE behaves like a conventional UE. When the aerial UE is flying well above the base station antenna height, however, the uplink signal from the aerial UE can be received by multiple (e.g., many) cells since the lack of obstructions at this height creates highly favorable (e.g., line-of-sight) propagation conditions.

As such, the uplink signal from the aerial UE can increase interference in neighbor cells. Increased interference negatively impacts conventional UEs (e.g., smartphones, Internet-of-Things (IoT) devices, etc.) on or near the ground. Thus, the network may need to limit the admission of aerial UE in the network to restrict the impact to the performance of the conventional UEs. Furthermore, because the base station antenna beam patterns are typically down-tilted (e.g., negative elevation angle) to serve UEs at or near ground level, conventional UEs typically receive from/transmit to the antenna pattern's main lobe. However, aerial UEs flying significantly above antenna height are likely served by the antenna pattern's side lobes, which can vary significantly within a small area. Accordingly, aerial UEs may experience sudden signal loss that can cause the operator to lose control of the drone.

Furthermore, aerial UEs can create hazardous situations when flying illegally in certain parts of the airspace. For example, rogue drones have endangered commercial air traffic by flying in restricted airspace near major airports, with many such events reported in both Europe and the U.S. In 2019 there were several such events that temporarily closed Heathrow, Gatwick, and Newark international airports. Other hazardous situations include entry into military restricted areas and airspace over densely populated areas where a crash would likely cause human injuries.

Accordingly, it can be beneficial to restrict and/or limit aerial UEs operating as "rogue drones" in such scenarios. A prerequisite for these and other solutions is network knowledge of the current position, speed, and directional bearing (collectively "state") of aerial UEs. Even 2D position and velocity would be beneficial for determining aerial UE position/movement in relation to restricted air spaces. However, rogue drone operators often disable A-GNSS functionality and, as mentioned above, existing OTDOA and U-TDOA methods do not provide velocity information.

To summarize, existing 3GPP-standardized positioning techniques have the following problems, issues, and/or difficulties in relation to the use cases discussed above:
- A-GNSS relies on UE having specific A-GNSS receiver hardware, which may not be available or enabled in certain UEs. A-GNSS also has inferior signal availability, in particular indoors or other situations where satellite coverage can be obstructed.
- U-TDOA requires UE position calculation to be performed in a positioning node (e.g., LMF, E-SMLC) and does not provide velocity information. UTDOA also has inferior availability due to requirement of at least four (4) spatially separated transmission points being able to measure the UE signal.

OTDOA does not provide velocity information and has inferior availability due to requirement of UE being able to measure signals from at least four (4) spatially separated transmission points.

Kalman filters can be used to estimate the state of a discrete-time linear dynamic system described by a linear vector difference equation with additive white Gaussian noise that models unpredictable disturbances. The dynamic model of a Kalman filter is given by:

$$x(k+1)=F(k)x(k)+v(k),$$

where $x(k)$ is the $n_x$-dimensional state vector, and $v(k)$, $k=0, 1, \ldots$ is the sequence of zero-mean white Gaussian process noise (also $n_x$ vectors) with covariance $$\mathbb{E}[v(k)v(k)']=Q(k).$$

The measurement equation is $$z(k)=H(k)x(k)+w(k) \quad k=1, \ldots,$$

with $w(k)$ the sequence of zero-mean white Gaussian measurement noise with covariance $$\mathbb{E}_{E[w(k)w(k)']}=R(k).$$

The matrices F, H, Q, and R are assumed known and possibly time varying. In other words, the system can be time varying and the noises nonstationary. The initial state $x(0)$, in general unknown, is modeled as a random variable, Gaussian distributed with known mean and covariance. The two noise sequences and the initial state are assumed mutually independent, which is also referred to as a "Linear-Gaussian (LG) assumption."

The conditional mean is defined as:

$$\hat{x}(j|k)= \mathbb{E}[x(j)|Z^k],$$

where $Z^k=\{z(j), j \leq k\}$ denotes a sequence of observations available at time k, and is the estimate of the state if $j=k$ and predicted value of the state if $j>k$. The conditional covariance matrix of $x(j)$ given the data $Z^k$ or the covariance associated with the estimate is $$P(j|k)= \mathbb{E}[[x(j)-\hat{x}(j|k)][x(j)-\hat{x}(j|k)]'|Z^k].$$

Figure 7:
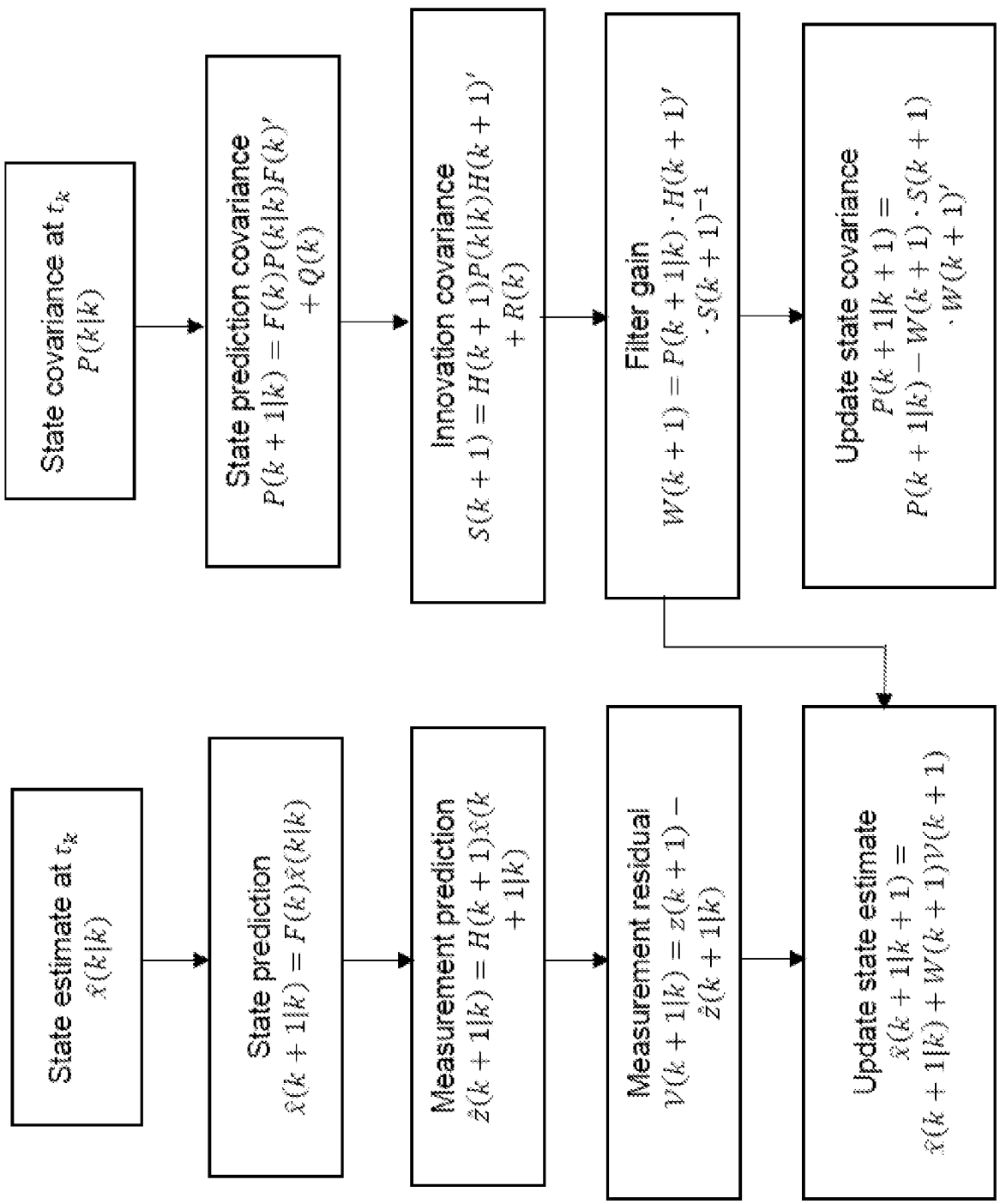
FIG. 7 shows an exemplary flow diagram of a Kalman filter.

FIG. 7 shows an exemplary flow diagram of a Kalman filter. The estimation algorithm starts with the initial estimate $\hat{x}(0|0)$ of $x(0)$ and the associated initial covariance $P(0|0)$, assumed to be available. The second (conditioning) index 0 stands for $Z^0$, the initial information. One cycle of the dynamic estimation algorithm—the Kalman filter (KF)—will thus consist of the computations to obtain the estimate $$\hat{x}(k|k)= \mathbb{E}[x(k)|Z^k],$$

which is the conditional mean of the state at time k (the current stage) given the observation up to and including time k, and the associated covariance matrix $$P(k|k)= \mathbb{E}[[x(k)-\hat{x}(k|k)][x(k)-\hat{x}(k|k)]'|Z^k].$$

The extended Kalman filter (EKF) is a nonlinear version of the Kalman filter that linearizes about an estimate of the current mean and covariance. The EKF model is a linear state space difference equation (e.g., a differential equation in discrete time) and a non-linear measurement equation. The differential equation is then discretized as described below. Since the measurement update requires a linearized measurement matrix in case the Kalman filter is used as a basis for the EKF, it follows that the linearization is of the measurement equation around the predicted measurement, i.e., $$\hat{z}^i(t_k|t_{k-1})=h(\hat{x}^i(t_k|t_{k-1})), \quad i=1, \ldots, r$$

The underlying state space model of the EKF is given by:

$$\hat{x}^i(t_{k+1})=F^i(t_{k+1},t_k)\hat{x}^i(t_k)+w^i(t_k)$$

$$\hat{z}^i(t_k)=h(\hat{x}^i(t_k))+e(t_k), \quad i=1, \ldots, r.$$

In the above, superscript i is a movement mode index (described in more detail below), $h(x)$ is the measurement equation, and F is a discrete-time systems matrix. In addition, quantities $w^i(t_k)$ and $e(t_k)$ are systems and measurement noises, respectively. Their covariance matrices are given by:

$$Q^i(t_{k+1},t_k)=E[w^i(t_k)(w^i(t_k))^T], \quad i=1, \ldots, r.$$

$$R^i(t_{k+1},t_k)=E[e(t_k)(e(t_k))^T], \quad i=1, \ldots, r.$$

One iteration of the EKF for mode i is given by the following equations:

$$\hat{x}^i(t_k \mid t_{k-1}) = F^i(t_k, t_{k-1})\hat{x}^i(t_{k-1} \mid t_{k-1})$$

$$P^i(t_k \mid t_{k-1}) = F^i(t_k, t_{k-1})P^i(t_{k-1} \mid t_{k-1})\left(F^i(t_k, t_{k-1})\right)^T + Q^i(t_k, t_{k-1})$$

$$\hat{z}^i(t_k \mid t_{k-1}) = h\left(\hat{x}^i(t_k \mid t_{k-1})\right)$$

$$H^i\left(\hat{x}^i(t_k \mid t_{k-1})\right) = \left.\frac{\partial h(\hat{x})}{\partial \hat{x}}\right|_{x=\hat{x}^i(t_k|t_{k-1})}$$

$$\varepsilon^i(t_k) = z(t_k) - \hat{z}^i(t_k \mid t_{k-1})$$

$$S^i(t_k) = H^i\left(\hat{x}^i(t_k \mid t_{k-1})\right)P^i(t_k \mid t_{k-1})\left(H^i\left(\hat{x}^i(t_k \mid t_{k-1})\right)\right)^T + R^i(t_k, t_{k-1})$$

$$W^i(t_k) = P^i(t_k \mid t_{k-1})\left(H^i\left(\hat{x}^i(t_k \mid t_{k-1})\right)\right)^T \left(S^i(t_k)\right)^{-1}$$

$$\hat{x}^i(t_k \mid t_k) = \hat{x}^i(t_k \mid t_{k-1}) + W^i v^i(t_k)$$

$$P^i(t_k \mid t_k) = P^i(t_k \mid t_{k-1}) - K^i(t_k)S^i(t_k)\left(K^i(t_k)\right)^T$$

Although Kalman filters may be used to model a movement state of some vehicles, a conventional Kalman filter is inadequate to model the state of an aerial UE such as a drone. More specifically, drones have very specific modes of movement that need to be reflected by the optimal estimator applied for measurement processing. Even so, there are various methods for state estimation of an object, such as a drone, that has multiple dynamic movement modes.

A general technique for performing such estimation is based on the joint probability distribution of the object's state. In general, propagation of the object's state forward in time is governed by the Fokker-Planck partial differential equation. The measurement processing is performed by a multi-dimensional integration to obtain the posterior probability state distribution from the likelihood of the measurement and the prior probability distribution. This process is more generally referred to as Bayesian inference. In general, however, implementation can be very complex in terms of computational and memory requirements. Bayesian inference methods can be simplified to some degree by approximation as "particle filters" in which the probability density functions are discretized as "particles". Even so, implementation of particle filtering can be very complex.

As an extreme simplification, each of the object's movement modes can be modeled and estimated separately, with ad-hoc logic used to select the movement mode applicable at any given time. For example, two movement modes can be used for estimating the state of a conventional air vehicle: a constant velocity mode (i.e., straight line movement) and a maneuver mode, which can respond to measurements with much higher agility than the constant velocity mode. A maneuver detector can select the maneuver mode if it is deemed to better match incoming measurements than the constant velocity mode. After a maneuver is terminated, a re-initialized constant velocity mode can be used for state estimation. One problem, issue, and/or difficulty with this approach is selection of appropriate threshold values for the maneuver detector.

Another approach to the multi-movement mode state estimation problem is the interacting-multiple-model (IMM) filter. The IMM algorithm assumes that the system behaves according to one of a finite number of models. These models can differ in noise levels and/or structure, such as having different state dimensions and unknown inputs. In the IMM approach, at time k the state estimate is computed for each possible model using r filters, with each filter using a different combination of the previous model-conditioned estimates, so-called "mixed initial conditions". The mixing of state estimates is thus performed in the beginning of a filter update cycle.

Figure 8:
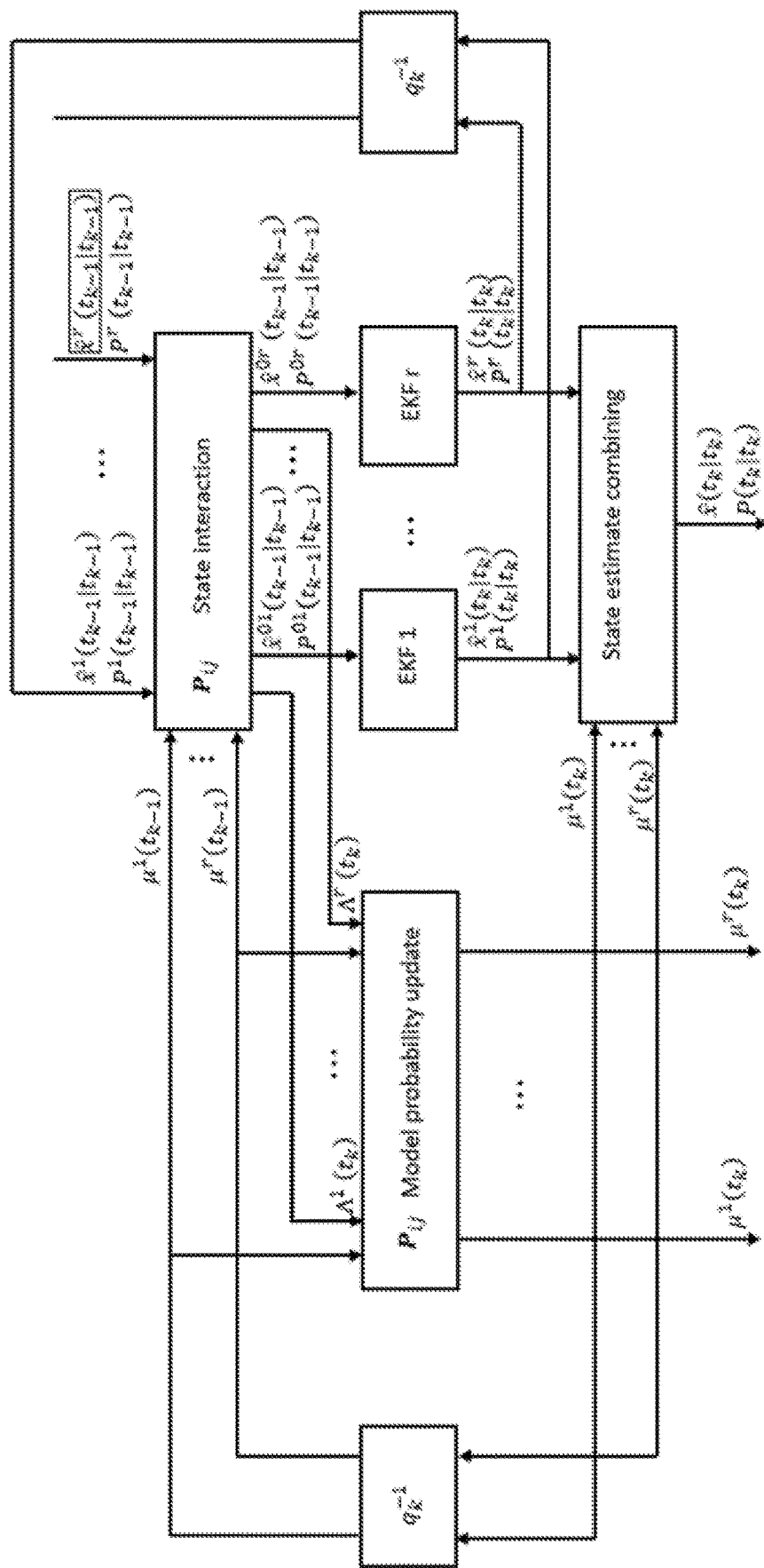
FIG. 8 shows a block diagram that illustrates one operation cycle of an interacting multiple-model (IMM) algorithm that includes r interacting enhanced Kalman filters (EKFs) operating in parallel.

FIG. 8 illustrates one operation cycle of an IMM algorithm that includes r interacting EKFs operating in parallel. The overall structure of the IMM algorithm is given by:

$$(N_e; N_f) = (r; r),$$

where $N_e$ is the number of estimates at the start of the cycle of the algorithm and $N_f$ is the number of filters. One cycle of the algorithm includes the following operations:

1. State interaction. To provide initial conditions to the mode matched filtering, the state and covariance matrices of the previous iteration need to be mixed. This mixing is based on the mode transition probability matrix and the mode probabilities of the previous iteration, and is given by the so called mixing probabilities, $\mu_{i|j}$, i,j=1, . . . r. The definition is based on the probability that mode $M_i$ was in effect at time $t_{k-1}$, given that mode $M_j$ is in effect at time $t_k$, conditioned on the data $Z^{k-1}$ up to time $t_{k-1}$. The result becomes:

$$\mu_{i|j}(t_{k-1} \mid t_{k-1}) = \frac{1}{\bar{c}_j} p_{ij}\mu_i(t_{k-1})$$

$$\bar{c}_j = \sum_{i=1}^{r} p_{ij}\mu_i(k-1)$$

2. Mixing (j=1, . . . r). Starting with $\hat{x}^i(k-1|k-1)$ one computes the mixed initial condition for the filter matched to $M_j(k)$ as:

$$\hat{x}^{0j}(k-1 \mid k-1) = \sum_{i=1}^{r} \hat{x}^i(k-1 \mid k-1)\mu_{i|j}(k-1 \mid k-1)$$

$$j = 1, \ldots, r$$

The covariance corresponding to the above is given by:

$$P^{0j}(t_{k-1} \mid t_{k-1}) = \sum_{i=1}^{r} \mu_{i|j}(t_{k-1} \mid t_{k-1})\big(P^i(t_{k-1} \mid t_{k-1}) + $$
$$\big(\hat{x}^i(t_{k-1} \mid t_{k-1}) - \hat{x}^{0j}(t_{k-1} \mid t_{k-1})\big)\big(\hat{x}^i(t_{k-1} \mid c_{k-1}) - \hat{x}^{0j}(t_{k-1} \mid t_{k-1})\big)^T\big).$$

3. Mode-matched filtering (j=1, . . . r). The estimate and the covariance obtained in step 2 are used as input to the r EKFs matched to the respective modes. An iteration of EKF computations is performed for each mode as described above. The likelihood function corresponding to the r filters is computed using the mixed initial condition and the associated covariance as:

$$\Lambda^j(t_k) = p(z(t_k) \mid M_j, \hat{x}^{0j}(t_{k-1}|t_{k-1}), P^{0j}(t_{k-1}|t_{k-1})),$$
$$j = 1, \ldots, r.$$

4. Model probability update (j=1, . . . , r). Given the likelihood function, the model probabilities are updated according to:

$$\mu_j(k) = \frac{1}{c}\Lambda_j(k)\bar{c}_j$$

$$j = 1, \ldots, r$$

where $\bar{c}_j$ is given above and $$c = \sum_{j=1}^{r} \Lambda_j(k)\bar{c}_j$$

is the normalization factor.

5. Estimate and covariance combination. Combination of the model-conditioned estimates and covariances is done according to the mixture equations:

$$\hat{x}(t_k \mid t_k) = \sum_{j=1}^{r} \mu^j(t_k)\hat{x}^j(t_k \mid t_k),$$

$$P(t_k \mid t_k) =$$
$$\sum_{j=1}^{r} \mu^j(t_k)\big(P^j(t_k \mid t_k) + \big(\hat{x}^j(t_k \mid t_k) - \hat{x}(t_k \mid t_k)\big)\big(\hat{x}^j(t_k \mid t_k) - \hat{x}(t_k \mid t_k)\big)^T\big).$$

Prior to performing the calculations discussed above, the following three choices must be made to set up the IMM filter:

Definition of movement modes. For each movement mode, this amounts to definition of a state space model, i.e. one vector difference equation that defines the dynamics, and another static vector equation that defines the mapping of states to measurements. In addition, the inaccuracies of the measurement equation and the dynamic state model are defined in terms of the covariance matrices of the uncertainties.

Definition of transition probabilities. These describe how the modes interact. Typically, this is given as a hidden Markov model that expresses the probabilities of a mode transition of the estimated object between two discrete instances of time.

Selection of filter initial conditions. This amounts to defining the expected initial state and covariance of each model.

Exemplary embodiments of the present disclosure can address these and other problems, issues, and/or difficulties by providing novel IMM-based state estimation techniques based on UE Doppler shift measurements on signals from two spatially separated transmission points (TPs) in the RAN, such as an antenna associated with the UE's serving base station (e.g., eNB/gNB) and/or serving cell, and an antenna associated with a neighbor base station and/or a neighbor cell. The techniques are also based on one of the following:

a measurement of signal RTT between the UE and the TP associated with the UE's serving cell; or a UE Doppler shift measurement of a signal from a third spatially separated TP (e.g., a second neighbor cell).

In either case, these techniques can be implemented only in the UE, since the UE may get the RTT from the serving base station or the UE can assume that the UE's timing advance (TA) has been adjusted so that it can use $t_3-t_2$ (see FIG. 6) and an assumption that UL delay is equal to DL delay. These embodiments provide various benefits and/or advantages, including the following:

Estimates of 2D horizontal position with high accuracy, e.g., error ≤15 m;

Estimates of 2D velocity estimates with high accuracy, e.g., error ≤1.5 m/s;

Estimates are usable by all applications and features of a UE;

Excellent indoor availability since no reliance on satellite signals and only requires reception from 2-3 spatially separated TPs;

No special UE hardware and/or software prerequisites;

Can be implemented in any UE generation (e.g., 3G, 4G, 5G, etc.); and

Facilitates a variety of new use cases such as:

Seamless high-accuracy personal navigation independent of A-GNSS and other high-accuracy network-based methods;

Seamless personal safety and E-911 localization independent of A-GNSS and other high-accuracy network-based methods;

Position-based commercial services, e.g., traffic flow analysis; and

Position-based network functionality, e.g., predictive handover.

As an example, emergency (e.g., E-911) positioning typically relies on A-GNSS for high accuracy, with a fallback to OTDOA or U-TDOA. For this use case, both indoor availability and high-accuracy position are critical, but velocity information may also be useful in case of moving vehicle accidents. Normally emergency positioning is initiated after an accident has occurred such that pre-accident A-GNSS position and velocity estimates are generally unavailable. However, embodiments provide the ability to continuously estimate 2D position and velocity for UEs, thereby enabling faster and enhanced logged E-911 positioning. This would be particularly useful in cases without A-GNSS availability, like indoors.

As another example, embodiments can be used for personal safety applications, e.g. in avalanche prone terrain. The UE may log 2D position and velocity and, in case of an accident, transfer such information to an emergency center possibly in conjunction with a high power repeater to enhance coverage. Alternately, the 2D position and velocity could be sent to an application server periodically even before the accident, in a similar manner as discussed above for E-911 scenarios.

Figure 9:
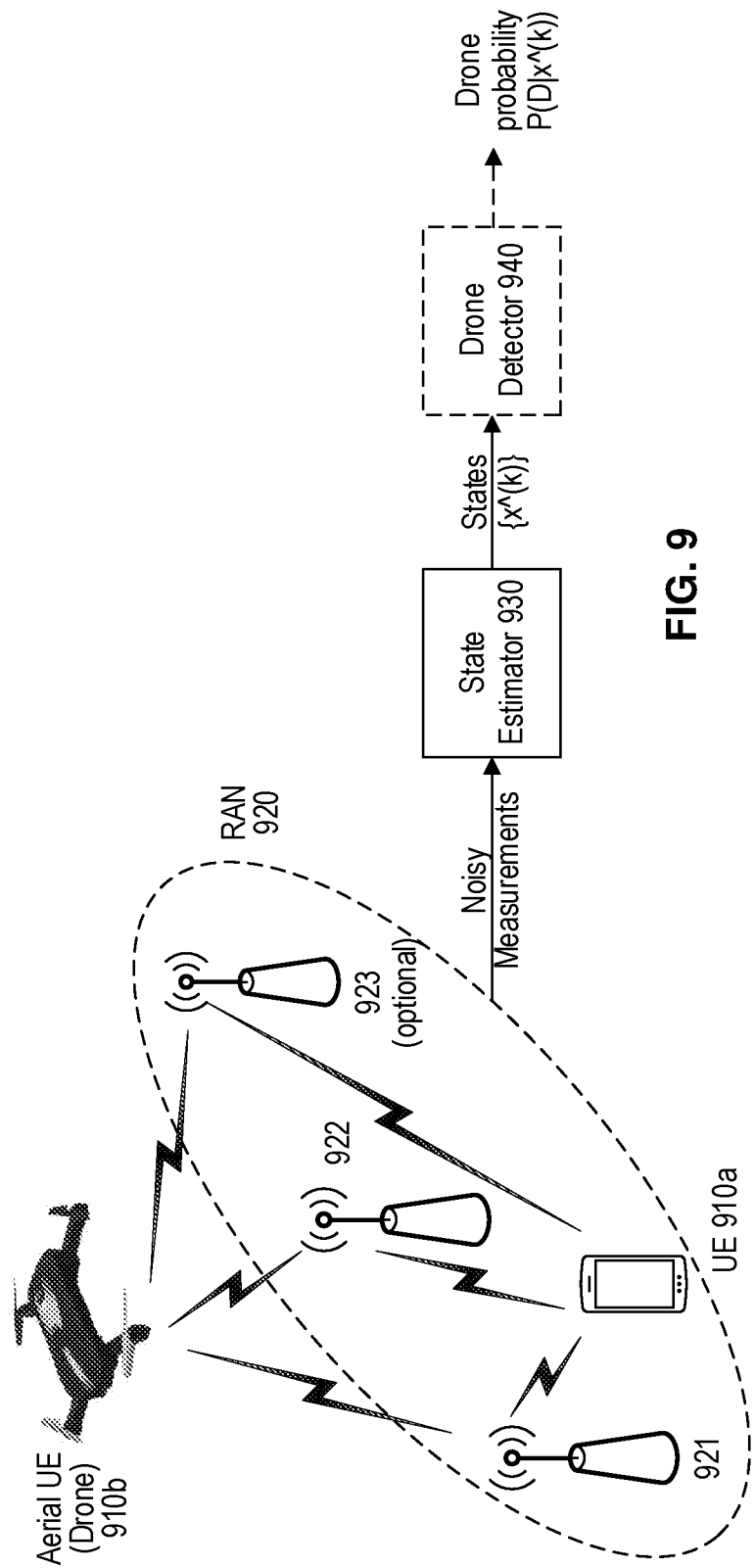
FIG. 9 is a block diagram of an exemplary UE movement state estimation system, according to various exemplary embodiments of the present disclosure.

FIG. 9 is a block diagram illustrating the architecture of an exemplary aerial UE (or drone) state estimation system, according to various exemplary embodiments of the present disclosure. In particular, FIG. 9 shows two UEs 910a,b that communicates with a RAN 920 that includes at least two RAN nodes (labelled 921-922) and optionally a third RAN node (labelled 923). In particular, UE 910a represents a conventional earth-bound UE (e.g., smartphone) while UE 910b represents an aerial UE (e.g., drone). In the following description UE 910 will be used to represent either of UE 910a,b.

The RAN nodes may make positioning measurements on UL signals (e.g., SRS) transmitted by drone 910, and/or transmit PRS or other signals to facilitate positioning measurements by UE 910. In either case, noisy measurements by RAN nodes or a UE are input to state estimator 930, which operates on them according to techniques described in more detail below to produce UE state estimates at time instance k—called {$\hat{x}(k)$}—that correspond to multiple UE movement modes.

In some embodiments, state estimator 930 can be located in UE 910, which can be particularly advantageous when UE 910 performs measurements on DL RS transmitted by the RAN nodes. In other embodiments, state estimator 930 can be located in one of the RAN nodes, which can be particularly advantageous when the RAN nodes perform measurements on UL RS transmitted by UE 910. In other embodiments, state estimator 930 can be located in or associated with a core network function, such as E-SMLC or LMF described above.

Optionally, the output of state estimator 930 can be input to drone detector 940, which operates on this information to produce a conditional drone probability metric, $P(D|\hat{x}(k))$. Drone detector 940 can be co-located with state estimator 930 (e.g., in a RAN node or core network function) or can be in a separate node or function.

As mentioned above, the EKF model is based on a non-linear measurement model that is linearized around a point. Various non-linear measurement models can be used, either individually or in combination.

In some embodiments, a nonlinear range measurement model can be used, based on an RTT measurement. For example, this can be serving cell timing advance (TA) in LTE or an actual RTT measurement by a base station (e.g., gNB). The RTT based range measurement model is given by:

$$h(\hat{x}(k)) = 2\frac{\sqrt{(\hat{x}_1(k) - x_{s,1})^2 + (\hat{x}_2(k) - x_{s,2})^2 + (0 - x_{s,3})^2}}{c},$$

where $\hat{x}_i(k)$, i=1, 2 denote the $k^{th}$ estimated position states for horizontal coordinates, along with the assumption of zero vertical altitude. The term $x_{s,i}$, i=1,2, 3 denotes the 3D position of site s and the constant c is the speed of light. The derivative (Jacobian) of the measurement model is used for the hovering mode (as explained below) and is defined as follows for range measurements:

$$\frac{\partial h(\hat{x}(k))}{\partial \hat{x}} = \left(\frac{2(\hat{x}_1(k) - x_{s,1})}{c\sqrt{(\hat{x}_1(k) - x_{s,1})^2 + (\hat{x}_2(k) - x_{s,2})^2 + (0 - x_{s,3})^2}} \atop \frac{2(\hat{x}_1(k) - x_{s,2})}{c\sqrt{(\hat{x}_1(k) - x_{s,1})^2 + (\hat{x}_2(k) - x_{s,2})^2 + (0 - x_{s,3})^2}}\right)'$$

Since the RTT measurements are scalars and are performed irregularly, the measurement covariance matrix is also scalar and equal to $r^i$.

The Doppler shift due to the movement of a UE manifests itself as a frequency shift in the received DL signals. A signal that reaches the UE as s(t) absent a Doppler shift is instead received as $e^{i2\pi f_D t}s(t)$ with frequency shift $f_D$. There are several ways to estimate the frequency shift in an OFDM system. For example, two identical transmitted signals may be correlated after reception and the phase change between the two identical signals is then used to estimate the frequency shift.

It is also possible to consider the frequency shift to be part of the propagation channel, h(t; τ), where t is time and τ is delay. Then the impact of the frequency shift is that h(t; τ) is replaced by $e^{j2\pi f_D t}$ h(t; τ).

Various DL signals or channels can be used for frequency shift estimation, including demodulation reference signals (DM-RS) associated with Physical Downlink Control CHannel (PDCCH) or Physical Downlink Shared CHannel (PDSCH), cell-specific reference signals (CRS), positioning reference signals (PRS), channel-state information reference signals (CSI-RS), synchronization signal/PBCH block (SSB), etc.

For aerial UEs, the channel is typically non-dispersive and can therefore be described as h(t). Let $\varphi_i = \angle h(t_i)$ (i.e., the phase of the channel at time $t_i$) and let '^' denote estimate. Then the frequency shift f is estimated using two channel estimates for two different reference signals (e.g., associated with PUSCH) as:

$$\hat{f} = \frac{\hat{\varphi}_2 - \hat{\varphi}_1}{2\pi \Delta T},$$

where $\Delta T = t_2 - t_1$ is the time difference between the two channel estimates. The estimation accuracy depends on the accuracies of both $\hat{\varphi}_i$ and $\Delta T$:

$$\sigma_f^2 = \frac{2\sigma_\varphi^2}{(2\pi\Delta T)^2},$$

where $\sigma_f^2$ and $\sigma_\varphi^2$ are the variances for the frequency shift estimate $\hat{f}$ and for the phase estimate $\hat{\varphi}$, respectively. The variance $\sigma_\varphi^2$ decreases with increasing signal-to-noise ratio (SNR).

One way to increase the received SNR is to increase the number of signal repetitions used for a measurement, such as repetitions of SSB and/or CRS. However, this also limits the rate at which state estimates can be updated. Another way to increase the received SNR is to increase the transmit power used to send the measured signal. This may be possible for UE-specific transmissions such as PDSHC, but it also can increase interference to neighbor cells.

As stated above the UE frequency shift bias is modeled as a random walk, and the mode states are augmented with one extra state that models the Doppler shift bias, $x_{bias}$. The Doppler shift measurements are modelled as:

$$z(t_k) = -\frac{f_c}{c} v_s(t_k) + x_{bias}(t_k),$$

where $v_s(t_k)$ denotes the speed with which the distance between the site s and the aerial UE increases. c denotes the speed of light. The negative sign indicates that Doppler shift is positive when the UE approaches the base station. As discussed above, the Doppler bias is dominated by UE oscillator inaccuracy and is the same as observed by all RAN nodes.

To relate the measured Doppler frequency shift to the estimated states in a measurement equation, it is noted that a simple scalar product computation, between the rate of the UE ($\dot{r}$) and the direction vector between a site s and the UE ($\hat{r} - r_s$) leads to:

$$v_s(\hat{x}) = \frac{(\hat{r} - r_s)}{\|\hat{r} - r_s\|} \cdot \dot{r} = \frac{(\hat{x}_1 - x_{s,1})\hat{x}_3 + (\hat{x}_2 - x_{s,2})\hat{x}_4}{\sqrt{(\hat{x}_1 - x_{s,1})^2 + (\hat{x}_2 - x_{s,2}) + (0 - x_{s,3})}},$$

which is based on the assumption that the UE moves at zero altitude. The measurement equation for one Doppler shift measurement made by the UE on a signal from site s is:

$$\hat{z}^i(\hat{x}^i) = h(\hat{x}^i) = -\frac{f_c}{c} \frac{(\hat{x}_1^i - x_{s,1})\hat{x}_3^i + (\hat{x}_2^i - x_{s,2})\hat{x}_4^i}{\sqrt{(\hat{x}_1^i - x_{s,1})^2 + (\hat{x}_2^i - x_{s,2})^2 + (0 - x_{s,3})^2}} + \hat{x}_5^i.$$

The measurement equation is evaluated using predicted states as indicated in the EKF iteration equations above; however, the time dependence is not shown here. Using the measurement equation, the partial derivatives with respect to the states can be computed to define the linearized measurement equation, i.e.:

$$\left.\frac{\partial h(\hat{x})}{\partial \hat{x}}\right|_{\hat{x}=\hat{x}^i} = \left(\frac{\partial h(\hat{x})}{\partial \hat{x}_1} \frac{\partial h(\hat{x})}{\partial \hat{x}_2} \frac{\partial h(\hat{x})}{\partial \hat{x}_3} \frac{\partial h(\hat{x})}{\partial \hat{x}_4} \frac{\partial h(\hat{x})}{\partial \hat{x}_5}\right)\bigg|_{\hat{x}=\hat{x}^i}.$$

This results in the following relations:

$$\left.\frac{\partial h(\hat{x})}{\partial \hat{x}_1}\right|_{\hat{x}=\hat{x}^i} = -\frac{f_c}{c} \frac{\hat{x}_3^i}{\sqrt{(\hat{x}_1^i - x_{s,1})^2 + (\hat{x}_2^i - x_{s,2})^2 + (0 - x_{s,3})^2}} +$$
$$\frac{f_c}{c} \frac{(\hat{x}_1^i - x_{s,1})((\hat{x}_1^i - x_{s,1})\hat{x}_3^i + (\hat{x}_2^i - x_{s,2})\hat{x}_4^i)}{((\hat{x}_1^i - x_{s,1})^2 + (\hat{x}_2^i - x_{s,2})^2 + (0 - x_{s,3})^2)^{\frac{3}{2}}},$$

$$\left.\frac{\partial h(\hat{x})}{\partial \hat{x}_2}\right|_{\hat{x}=\hat{x}^i} = -\frac{f_c}{c} \frac{\hat{x}_4^i}{\sqrt{(\hat{x}_1^i - x_{s,1})^2 + (\hat{x}_2^i - x_{s,2})^2 + (0 - x_{s,3})^2}} +$$
$$\frac{f_c}{c} \frac{(\hat{x}_2^i - x_{s,2})((\hat{x}_1^i - x_{s,1})\hat{x}_3^i + (\hat{x}_2^i - x_{s,2})\hat{x}_4^i +)}{((\hat{x}_1^i - x_{s,1})^2 + (\hat{x}_2^i - x_{s,2})^2 + (0 - x_{s,3})^2)^{\frac{3}{2}}},$$

$$\left.\frac{\partial h(\hat{x})}{\partial \hat{x}_3}\right|_{\hat{x}=\hat{x}^i} = -\frac{f_c}{c} \frac{(\hat{x}_1^i - x_{s,1})}{\sqrt{(\hat{x}_1^i - x_{s,1})^2 + (\hat{x}_2^i - x_{s,2})^2 + (0 - x_{s,3})^2}},$$

$$\left.\frac{\partial h(\hat{x})}{\partial \hat{x}_4}\right|_{\hat{x}=\hat{x}^i} = -\frac{f_c}{c} \frac{(\hat{x}_2^i - x_{s,2})}{\sqrt{(\hat{x}_1^i - x_{s,1})^2 + (\hat{x}_2^i - x_{s,2})^2 + (0 - x_{s,3})^2}},$$

$$\left.\frac{\partial h(\hat{x})}{\partial \hat{x}_5}\right|_{\hat{x}=\hat{x}^i} = 1.$$

The above-described embodiments, the measurement updates are irregular and scalar; hence the measurement covariance matrix is also scalar and equal to $r^i$.

Embodiments of the present disclosure can utilize a two movement-mode IMM model for to UE state estimation that is based only on measurements of Doppler shift. The model includes on two continuous-time constant velocity modes with a driving acceleration noise, more specifically:

2D (almost constant) velocity Wiener process, with very small acceleration noise and a UE Doppler bias state.
2D (maneuver) velocity Wiener process, with large acceleration noise and a UE Doppler bias state.

Note that the Doppler bias state is the same for both models and can be modeled as a random walk. The Doppler shift bias of the UE results from inaccuracies in the UE's reference oscillator, and the same value will be observed in all Doppler shift measurements. The continuous time equations for the above two movements modes are given by the following, where superscript denotes mode:

$$dx^1(t) = \begin{pmatrix} 0 & 0 & 1 & 0 & 0 \\ 0 & 0 & 0 & 1 & 0 \\ 0 & 0 & 0 & 0 & 0 \\ 0 & 0 & 0 & 0 & 0 \\ 0 & 0 & 0 & 0 & 0 \end{pmatrix} x^1(t)dt + \begin{pmatrix} 0 & 0 & 0 \\ 0 & 0 & 0 \\ 1 & 0 & 0 \\ 0 & 1 & 0 \\ 0 & 0 & 1 \end{pmatrix} w^1(t)dt$$

$$E[(w^1(t)dt)(w^1(s)ds)] = \begin{pmatrix} q_{11}^1 & 0 & 0 \\ 0 & q_{22}^1 & 0 \\ 0 & 0 & q_{bias} \end{pmatrix} \delta(t-s)dt$$

$$dx^2(t) = \begin{pmatrix} 0 & 0 & 1 & 0 & 0 \\ 0 & 0 & 0 & 1 & 0 \\ 0 & 0 & 0 & 0 & 0 \\ 0 & 0 & 0 & 0 & 0 \\ 0 & 0 & 0 & 0 & 0 \end{pmatrix} x^2(t)dt + \begin{pmatrix} 0 & 0 & 0 \\ 0 & 0 & 0 \\ 1 & 0 & 0 \\ 0 & 1 & 0 \\ 0 & 0 & 1 \end{pmatrix} w^2(t)dt$$

$$E[(w^2(t)dt)(w^2(s)ds)] = \begin{pmatrix} q_{11}^2 & 0 & 0 \\ 0 & q_{22}^2 & 0 \\ 0 & 0 & q_{bias} \end{pmatrix} \delta(t-s)dt$$

In the above, x denotes the state vector. The state vector components are $x_1$ as the first position coordinate, $x_2$ as the second position coordinate, $x_3$ as the first velocity coordinate, $x_4$ as the second velocity coordinate, and $x_5$ as the UE frequency bias. In addition, w denotes the systems noise, $q_{11}$ is the variance of the acceleration noise in the x-dimension, $q_{22}$ is the variance of the acceleration noise in the y-dimension, $q_{bias}$ is the variance of the drift rate of the UE Doppler bias and $\delta(t-s)$ denotes Dirac's delta function. The superscripts denote the modes described above (instead of exponents).

Using $T_k = t_k - t_{k-1}$ to denote a variable sampling interval (i.e., between successive samples), a formal sampling of the models above renders the following relationships:

$$F^1(t_k, t_{k-1}) = \begin{pmatrix} 1 & 0 & T_k & 0 & 0 \\ 0 & 1 & 0 & T_k & 0 \\ 0 & 0 & 1 & 0 & 0 \\ 0 & 0 & 0 & 1 & 0 \\ 0 & 0 & 0 & 0 & 1 \end{pmatrix}$$

$$Q^1(t_k, t_{k-1}) = \begin{pmatrix} 1/3 q_{11}^1 T_k^3 & 0 & 1/2 q_{11}^1 T_k^2 & 0 & 0 \\ 0 & 1/3 q_{22}^1 T_k^3 & 0 & 1/2 q_{22}^1 T_k^2 & 0 \\ 1/2 q_{11}^1 T_k^2 & 0 & q_{11}^1 T_k & 0 & 0 \\ 0 & 1/2 q_{22}^1 T_k^2 & 0 & q_{22}^1 T_k & 0 \\ 0 & 0 & 0 & 0 & q_{bias} T_k \end{pmatrix}$$

$$F^2(t_k, t_{k-1}) = \begin{pmatrix} 1 & 0 & T_k & 0 & 0 \\ 0 & 1 & 0 & T_k & 0 \\ 0 & 0 & 1 & 0 & 0 \\ 0 & 0 & 0 & 1 & 0 \\ 0 & 0 & 0 & 0 & 1 \end{pmatrix}$$

$$Q^2(t_k, t_{k-1}) = \begin{pmatrix} 1/3 q_{11}^2 T_k^3 & 0 & 1/2 q_{11}^2 T_k^2 & 0 & 0 \\ 0 & 1/3 q_{22}^2 T_k^3 & 0 & 1/2 q_{22}^2 T_k^2 & 0 \\ 1/2 q_{11}^2 T_k^2 & 0 & q_{11}^2 T_k & 0 & 0 \\ 0 & 1/2 q_{22}^2 T_k^2 & 0 & q_{22}^2 T_k & 0 \\ 0 & 0 & 0 & 0 & q_{bias} T_k \end{pmatrix}.$$

The mode transition matrix is fixed in the standard IMM filter, assuming regular/periodic measurement updates. In some embodiments, the measurement updates may be irregular and/or aperiodic, which can affect the performance. In particular, the mode mixing of the IMM filter will become very high per second, possibly leading to an under-utilization of the straight-line movement mode.

To handle this potential issue, some embodiments provide a continuous time mode transition probability model that is then sampled. The parameters of this model can then be determined from a well working mode transition matrix, for a given difference between measurement update times, this difference being denotes "sampling period" hereafter. Then the continuous time model can be re-sampled (re-discretized) every time a new measurement arrives.

The continuous-time model should reflect that the net increase of each mode probability equals the sum of diffused probability from the other modes minus the diffusion from the same mode. A reasonable model for the diffused mode probability from a mode i is the product of a mode unique diffusion rate parameter, $\lambda_{ij}$, the time increment h, and the mode probability of the originating mode, $\mu_i(t)$. This gives the vector model:

$$\begin{pmatrix} \mu_1(t+h) \\ \vdots \\ \mu_n(t+h) \end{pmatrix} = \begin{pmatrix} \mu_1(t) \\ \vdots \\ \mu_n(t) \end{pmatrix} + \begin{pmatrix} \lambda_{11} & \cdots & \lambda_{1n} \\ \vdots & \ddots & \vdots \\ \lambda_{n1} & \cdots & \lambda_{nn} \end{pmatrix} h \begin{pmatrix} \mu_1(t) \\ \vdots \\ \mu_n(t) \end{pmatrix}.$$

A rearrangement gives:

$$\frac{1}{h}\left( \begin{pmatrix} \mu_1(t+h) \\ \vdots \\ \mu_n(t+h) \end{pmatrix} - \begin{pmatrix} \mu_1(t) \\ \vdots \\ \mu_n(t) \end{pmatrix} \right) = \begin{pmatrix} \lambda_{11} & \cdots & \lambda_{1n} \\ \vdots & \ddots & \vdots \\ \lambda_{n1} & \cdots & \lambda_{nn} \end{pmatrix} \begin{pmatrix} \mu_1(t) \\ \vdots \\ \mu_n(t) \end{pmatrix}.$$

The definition of the derivative then gives the ordinary differential equation $$\begin{pmatrix} \dot{\mu}_1(t) \\ \vdots \\ \dot{\mu}_n(t) \end{pmatrix} = \begin{pmatrix} \lambda_{11} & \cdots & \lambda_{1n} \\ \vdots & \ddots & \vdots \\ \lambda_{n1} & \cdots & \lambda_{nn} \end{pmatrix} \begin{pmatrix} \mu_1(t) \\ \vdots \\ \mu_n(t) \end{pmatrix},$$

with the solution of:

$$\begin{pmatrix} \mu_1(\tau) \\ \vdots \\ \mu_n(\tau) \end{pmatrix} = exp\left( \begin{pmatrix} \lambda_{11} & \cdots & \lambda_{1n} \\ \vdots & \ddots & \vdots \\ \lambda_{n1} & \cdots & \lambda_{nn} \end{pmatrix} \tau \right) \begin{pmatrix} \mu_1(0) \\ \vdots \\ \mu_n(0) \end{pmatrix},$$

where $\tau$ denotes time. The result is complicated and requires a numerical solution to compute the three unknowns. However, there are two other useful constraints. First, for a stationary non-zero solution, the derivative is zero and the probabilities sum to unity, which leads to:

$$\lambda_{11} = -\lambda_{12}$$

$$\lambda_{22} = -\lambda_{21}.$$

Second, the diagonal elements of the discretized mode transition matrix used above are the same which means that the following equation is sometimes possible to use to restrict the solutions further as $$\lambda_{11} = \lambda_{22}$$

Making use of these relations gives the following:

$$\exp\begin{pmatrix} \lambda_{11}\tau & -\lambda_{11}\tau \\ -\lambda_{11}\tau & \lambda_{11}\tau \end{pmatrix} = \begin{pmatrix} \frac{1}{2}+\frac{1}{2}e^{2\lambda_{11}\tau} & \frac{1}{2}-\frac{1}{2}e^{2\lambda_{11}\tau} \\ \frac{1}{2}-\frac{1}{2}e^{2\lambda_{11}\tau} & \frac{1}{2}+\frac{1}{2}e^{2\lambda_{11}\tau} \end{pmatrix}$$

For IMM embodiments applicable to irregularly sampled measurements, the sampled version of the mode switching matrix is needed. This can be obtained by replacing $\tau$ with $T_k=t_k-t_{k-1}$ to represent a variable sampling interval (i.e., between successive samples). Consequently, the mixing probabilities are given by:

$$\mu_{i|j} = \exp\left(\begin{pmatrix} \lambda_{11} & \lambda_{12} \\ \lambda_{21} & \lambda_{22} \end{pmatrix} T_k\right).$$

In the simplified cases with additional conditions imposed, the above becomes:

$$\mu_{i|j} = \exp\begin{pmatrix} \lambda_{11}T_k & -\lambda_{11}T_k \\ -\lambda_{11}T_k & \lambda_{11}T_k \end{pmatrix} = \begin{pmatrix} \frac{1}{2}+\frac{1}{2}e^{2\lambda_{11}T_k} & \frac{1}{2}-\frac{1}{2}e^{2\lambda_{11}T_k} \\ \frac{1}{2}-\frac{1}{2}e^{2\lambda_{11}T_k} & \frac{1}{2}+\frac{1}{2}e^{2\lambda_{11}T_k} \end{pmatrix},$$

Therefore, given the continuous time parameters and the sampling period, a time varying discrete time transition probability matrix can be computed. This makes the mode mixing invariant with respect to the variation between successive measurement times.

The concept of linear system observability can be used to illustrate how embodiments can obtain 2D UE movement state estimates based on one RTT measurement and two UE Doppler shift measurements on signals from spatially separated transmission points. A linear system of order n, e.g., $\dot{x}=Ax$ $y=Hx$ Is observable provided that $$\text{rank}(O) = \text{rank}\begin{pmatrix} H \\ HA \\ \vdots \\ HA^{n-1} \end{pmatrix} = n.$$

where O is referred to as the observability matrix.

The observability matrix O was evaluated using the linear state equations above, together with linearized measurement equations, for one of the two modes. The minimum singular value, s, of the observability matrix was used as a tractable measure of observability, particularly in the form of a logarithmic measure. An example two-site arrangement based on the following TP positions was used:

$S_1=(200\ 100\ 5)^T m$, $S_2=(100\ 40\ 110)^T m$,

In addition, the UE movement was assumed to be a constant velocity, particularly:

$$\begin{pmatrix} x_3 \\ x_4 \end{pmatrix} = \begin{pmatrix} 5 \\ 10 \end{pmatrix} m/s.$$

The logarithmic measure of the singular value, s, is given by:

$10^{10} \log(s+10^{-20})$ where the last term is intended to avoid numerical problems by limiting the measure to be above −200. Since the minimal singular value of the observability matrix is nonnegative, a measure that equals −200 shows that the system is not observable, while values higher than −200 indicate that the system is observable.

Figure 10A:
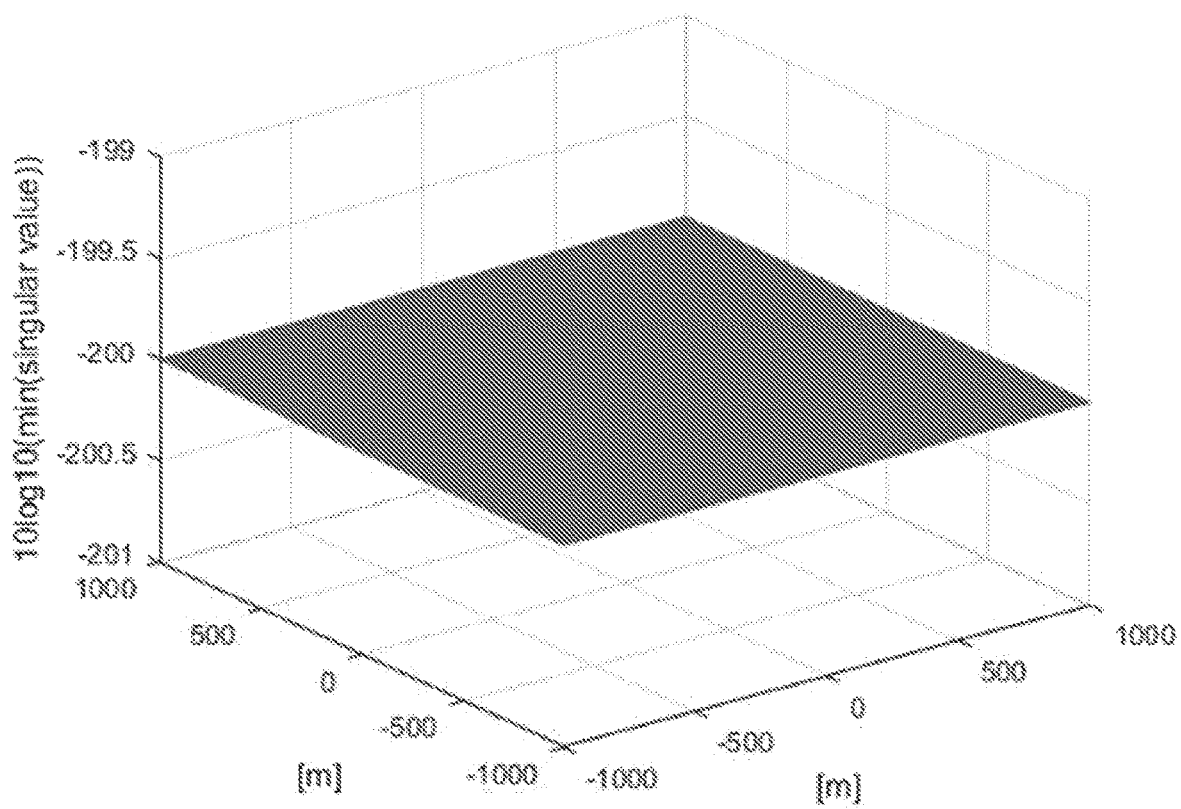
FIGS. 10A-B illustrate observability of UE movement state estimation system with and without adding a round-trip-time (RTT) measurement to two Doppler shift measurements, in accordance with certain embodiments of the present disclosure.

FIG. 10A is a plot of the logarithmic measure of s and indicates that the system is not observable. However, when the RTT measurement is added to a UE Doppler measurement for one of the TPs or sites (e.g., UE serving cell), the system becomes observable. This is illustrated by the plot of the logarithmic measure of s shown in FIG. 10B.

Figure 10B:
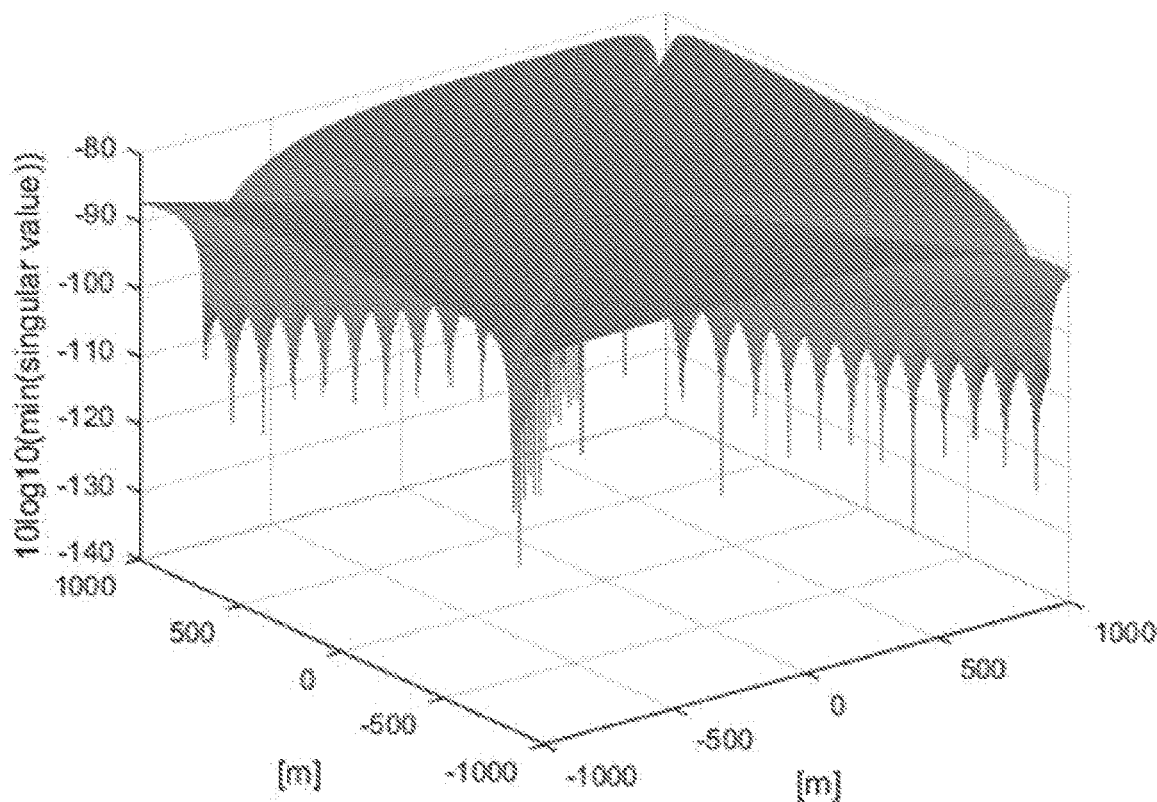

In other words, FIG. 10B illustrates the underlying principle that 2D UE movement state estimation (including UE frequency bias) can be obtained based on a combination of Doppler shift and RTT measurements with respect to a first TP and Doppler shift measurements with respect to a spatially separated second TP. In other words, only two spatially separated sites are needed to obtain a valid 2D UE movement state estimate according to these embodiments.

Figure 11A:
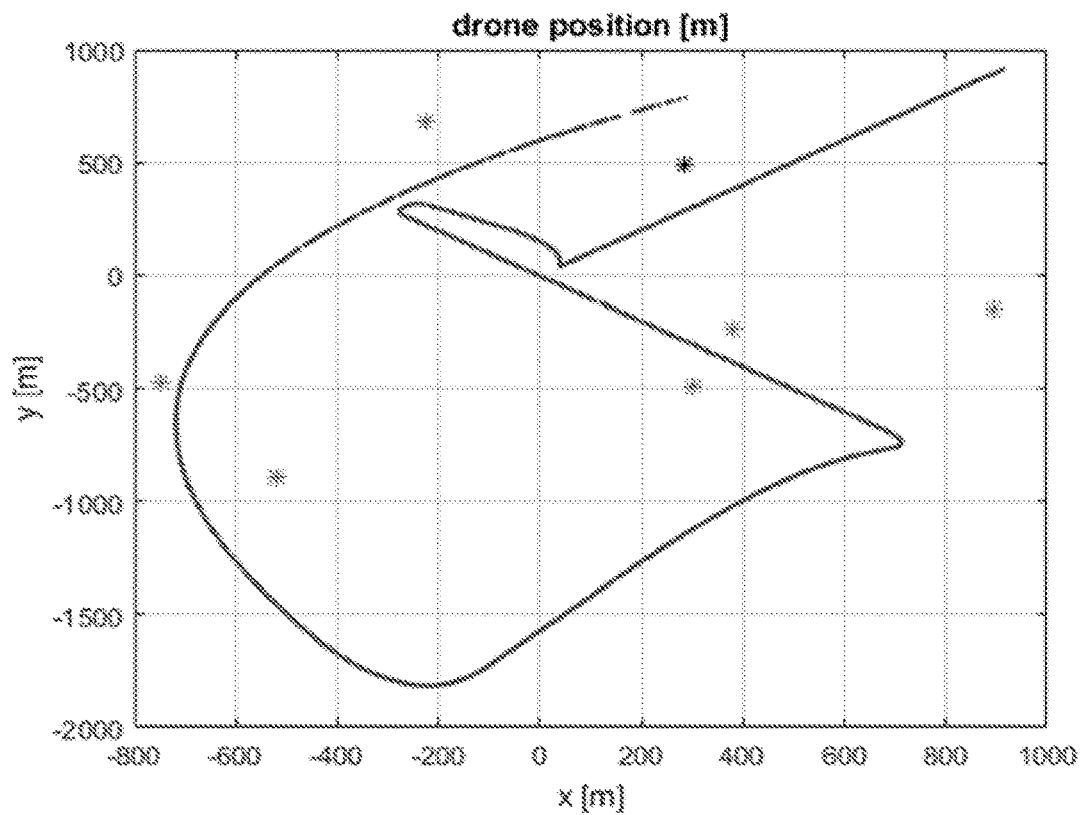
FIGS. 11A-B are plots of actual UE position and velocity, respectively, in a horizontal plane, as used in simulations of those embodiments.
Figure 11B:
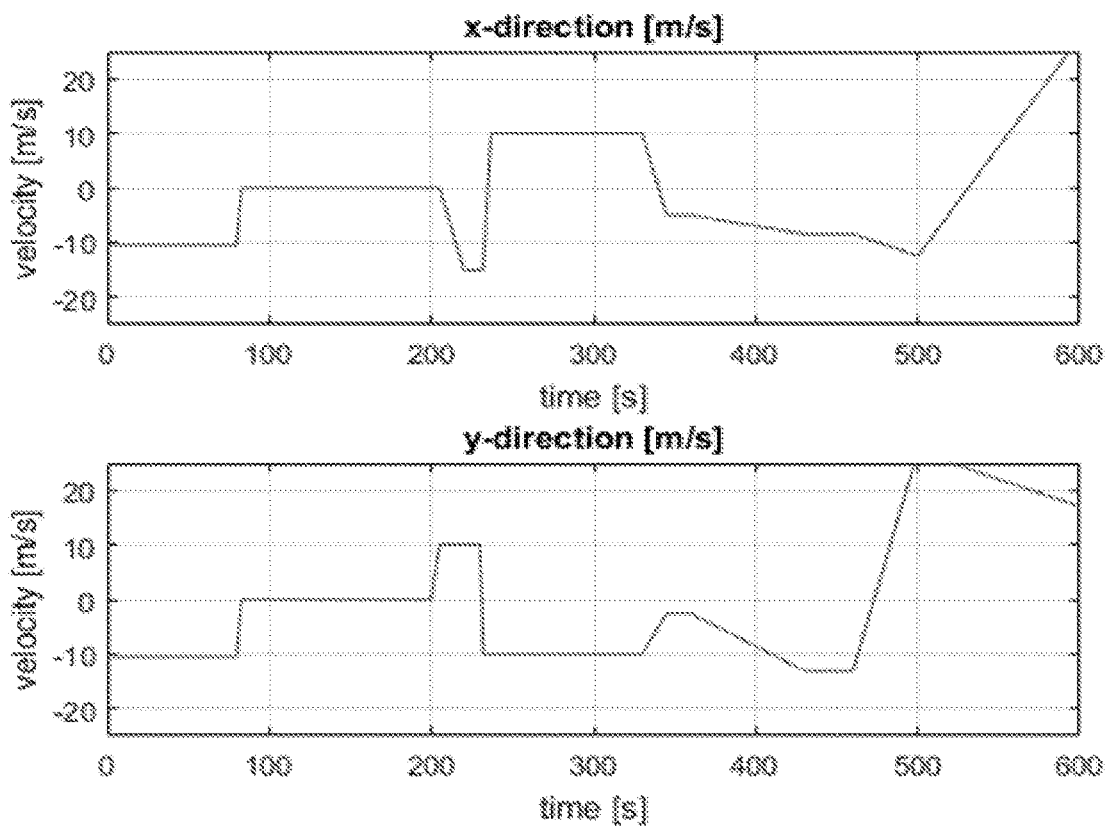

The following describes simulation techniques that can be used to validate the performance of exemplary embodiments described above. In these techniques, simulated UE trajectory, velocity, and base station positions can be generated. Additionally, the simulated UE can be configured to perform measurements on signals from the two closest base stations. The following seven (7) base station positions were used in the exemplary simulation:

$S_1=(200\ 100\ 5)^T m$, $S_2=(100\ 40\ 110)^T m$, $S_3=(800\ -50\ 70)^T m$, $S_4=(500\ -100\ 50)^T m$, $S_5=(50\ 200\ 180)^T m$, $S_6=(0\ 245\ 60)^T m$, $S_7=(-50\ 0\ 75)^T m$,

The simulation also used a UE Doppler shift bias of 70 Hz. FIG. 11A is a plot of the actual UE trajectory or path in the horizontal plane used in the simulation, along with the above positions of the seven (7) base stations in the horizontal plane as indicated by asterisks (*). FIG. 11B is a plot of the actual UE velocity components in the horizontal plane used in the simulation.

Table 2 below shows the parameters used for the two-mode IMM state estimator in the exemplary simulations.

TABLE 2

| Parameter | Description | Value |
|---|---|---|
| $r^i$ | The assumed Doppler shift measurement standard deviation of mode i. Note: In case measurement SNR is estimated and signaled, $r^i$ may be set to the corresponding Doppler shift standard deviation value, for each measurement. | 5.0 Hz |
| $\sqrt{q_{11}^I}$ | Almost constant velocity mode acceleration systems noise. | 4.0 m/s² |
| $\sqrt{q_{22}^I}$ | Almost constant velocity mode acceleration systems noise. | 4.0 m/s² |

TABLE 2-continued

| Parameter | Description | Value |
| --- | --- | --- |
| $\sqrt{q_{11}^2}$ | Maneuver velocity mode acceleration systems noise. | 25.0 m/s² |
| $\sqrt{q_{22}^2}$ | Maneuver velocity mode acceleration systems noise. | 25.0 m/s² |
| $\sqrt{q_{bias}}$ | UE Doppler drift rate systems noise. | 1/180 Hz/s |
| $\lambda_{11}$ | Mode switch rate 1→1 | −0.20/s |
| $\lambda_{22}$ | Mode switch rate 2→2 | −0.10/s |

The performance was evaluated based on above-described parameters for a number of combinations of UE Doppler shift measurement standard deviations and RTT measurement standard deviations (e.g., from actual values). An RTT standard deviation of 300 ns corresponds to a range standard deviation of 50m. A sampling period of 2.0 s was used.

Figure 12A:
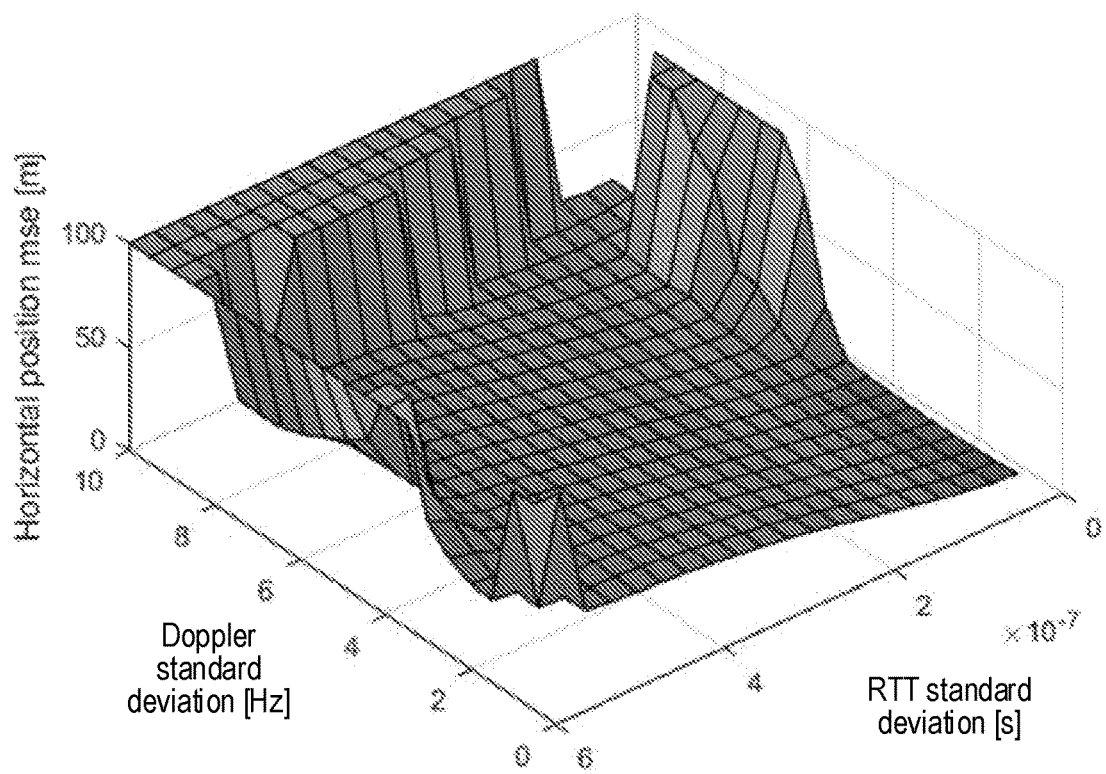
FIGS. 12A-C show mean square error (MSE) of estimated horizontal position, horizontal velocity, and UE frequency bias, respectively, as a function of UE Doppler shift measurement standard deviation and RTT measurement standard deviation, according to the simulations of those embodiments.
Figure 12B:
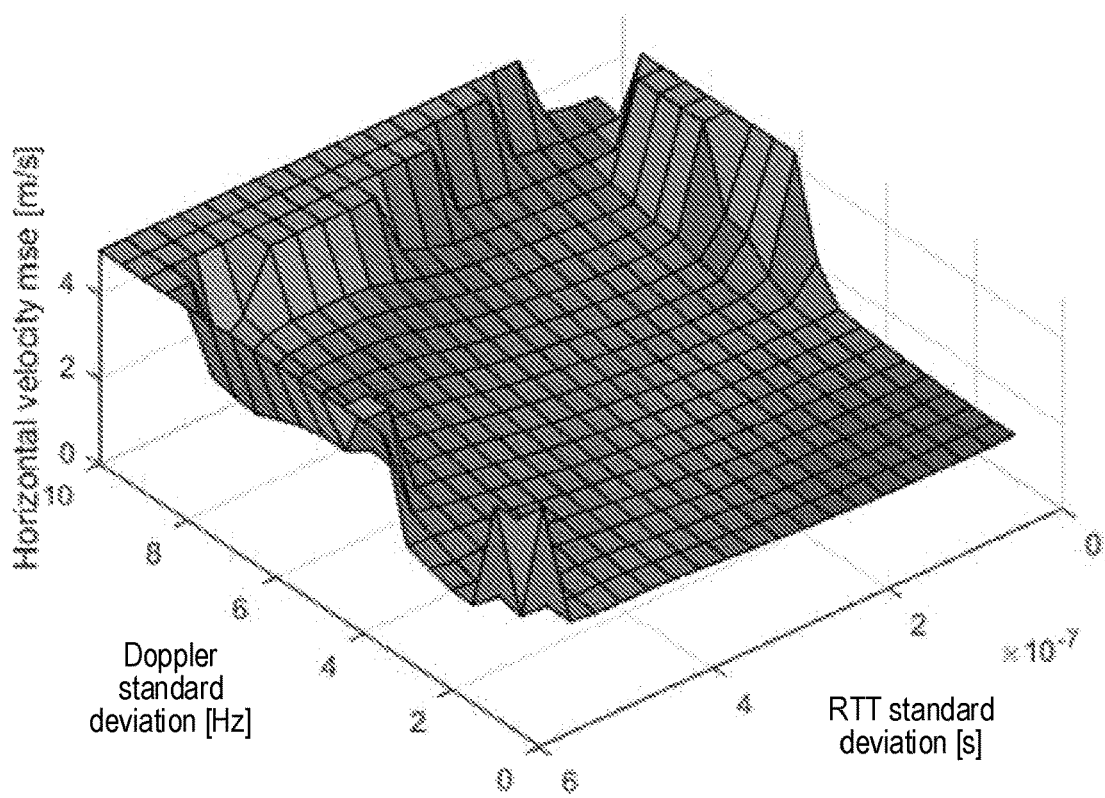
Figure 12C:
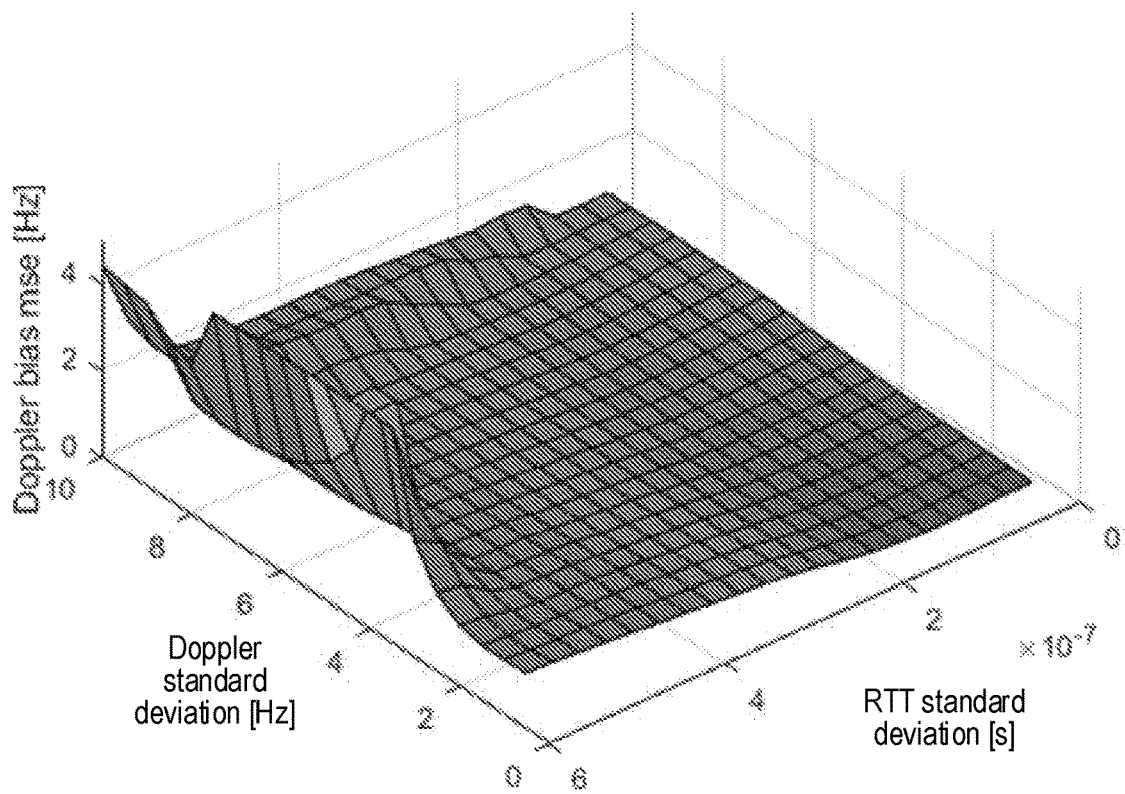

FIG. 12A shows mean square error (MSE) of estimated horizontal position as a function of the UE Doppler shift measurement standard deviation and the RTT measurement standard deviation. FIG. 12B shows MSE of estimated horizontal velocity as a function of the UE Doppler shift measurement standard deviation and the RTT measurement standard deviation. FIG. 12C shows MSE of estimated UE frequency bias as a function of UE Doppler shift measurement standard deviation and the RTT measurement standard deviation. Based on these results, It can be concluded that embodiments based on two UE Doppler measurements and one RTT measurement perform very well over a large range of measurement inaccuracies. Position MSE below 15 m and velocity MSE below 1.5 m/s are often achieved.

Figure 13A:
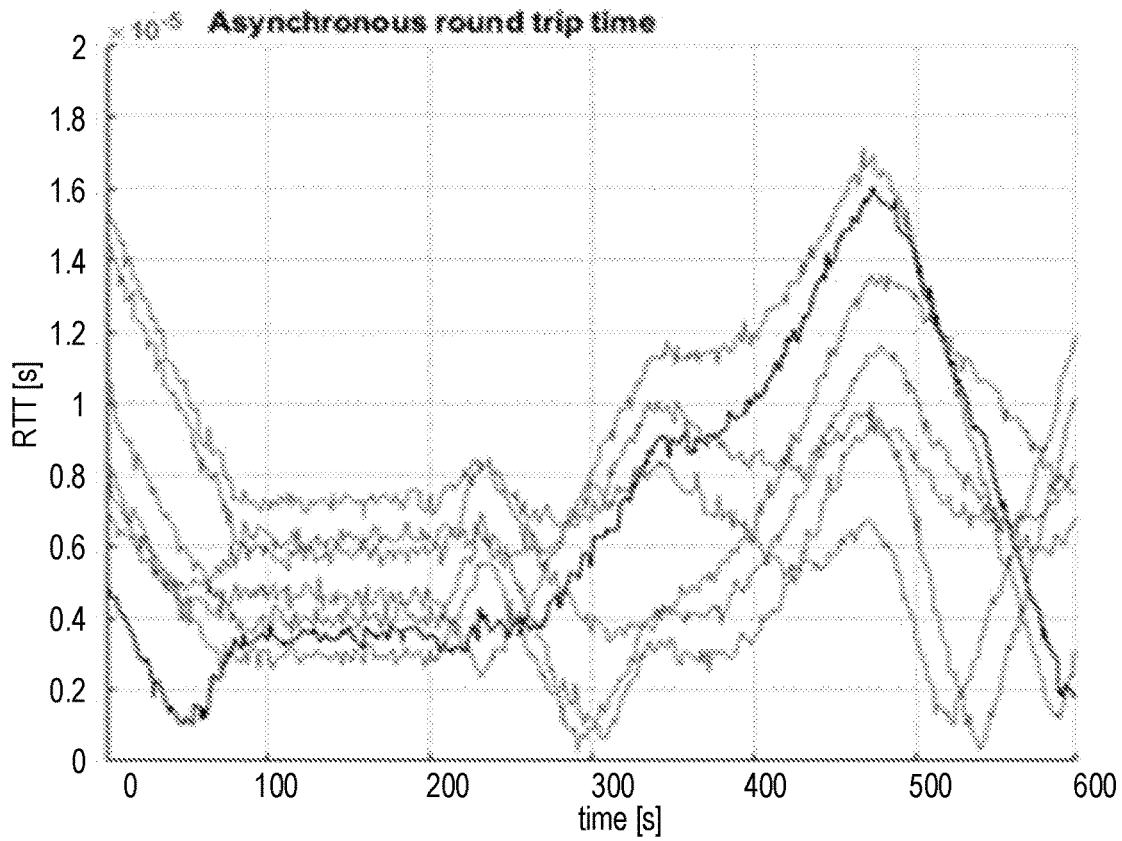
FIGS. 13A-B show RTT and UE Doppler measurements, respectively, associated with seven sites used in the simulations of those embodiments.
Figure 13B:
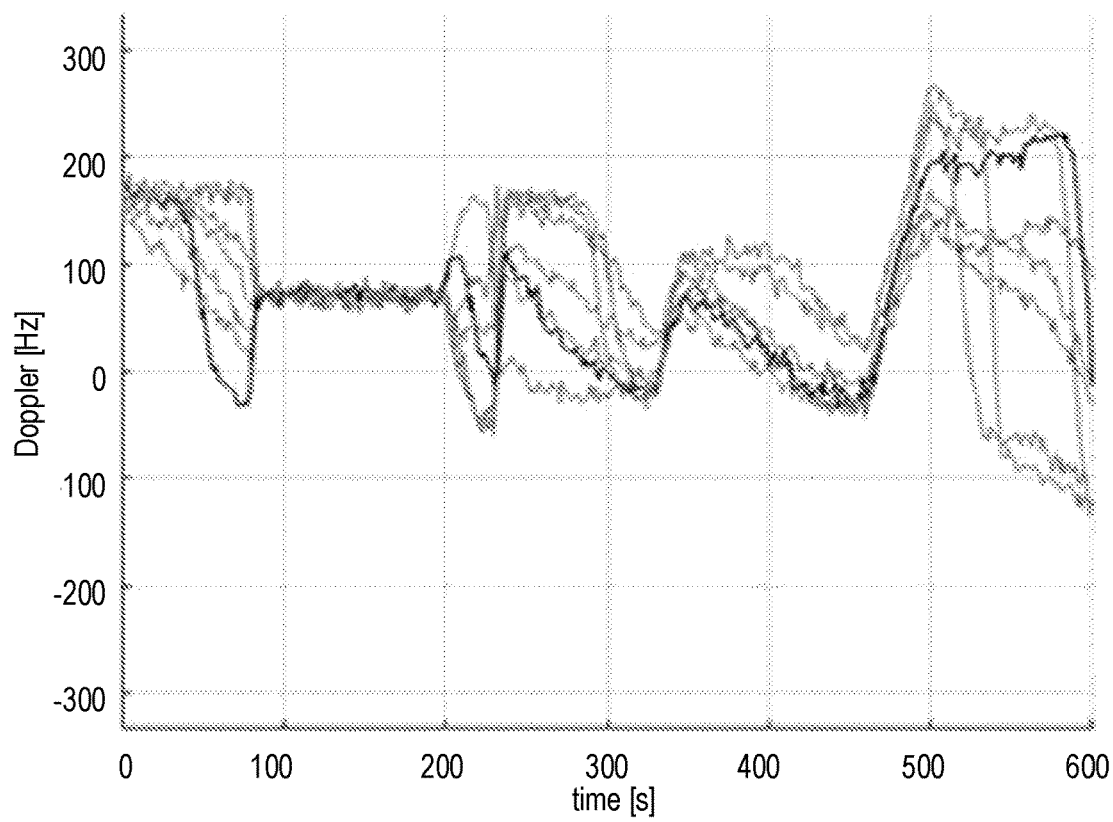

FIGS. 13A-B show trajectory and time evolution of RTT and UE Doppler measurements, respectively, from all seven sites during the course of the simulation. These are based on a sampling period of 2.0 s, an RTT measurement standard deviation of 200 ns, and a Doppler measurements standard deviation of 6 Hz. FIGS. 14A-D show the simulated performance of these embodiments of the UE movement state estimator based on the measurements illustrated in FIGS. 13A-B.

Figure 14A:
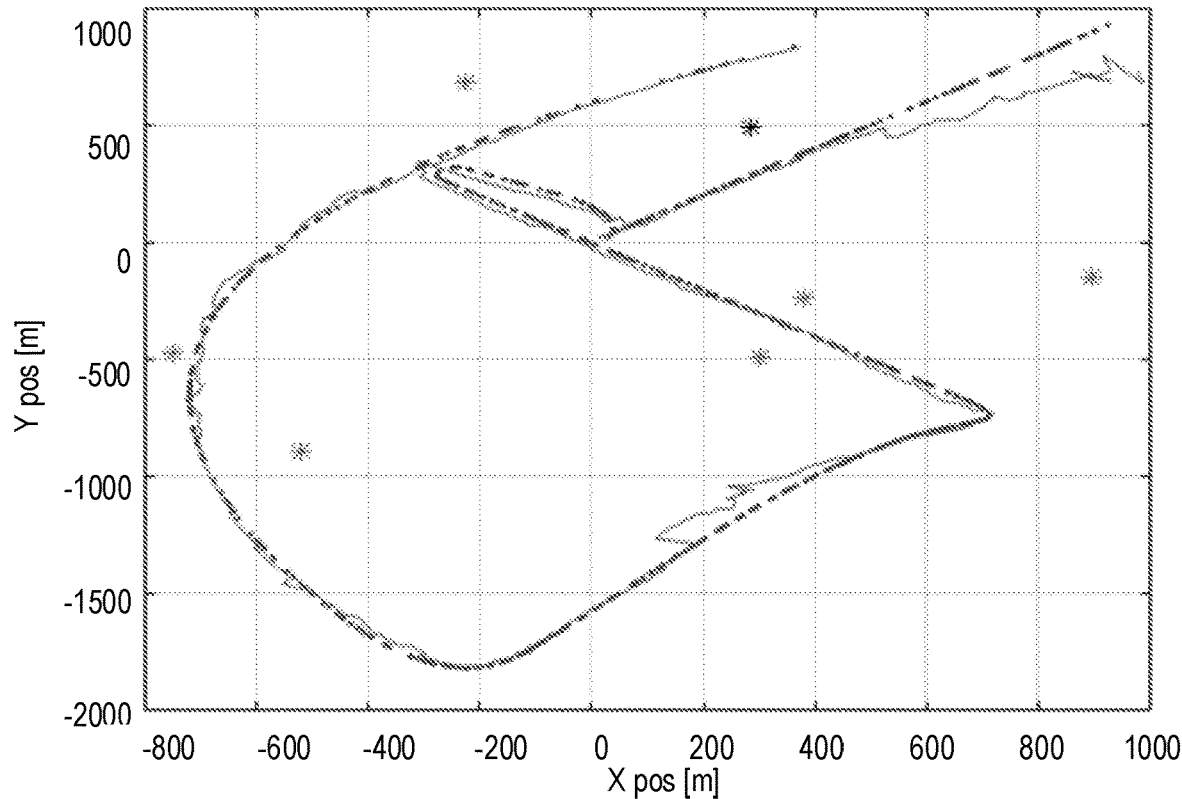
FIGS. 14A-D show results for the simulations of those embodiments in terms of estimated UE horizontal position, UE horizontal velocity, UE Doppler bias, and mode probabilities of the IMM, respectively.
Figure 14B:
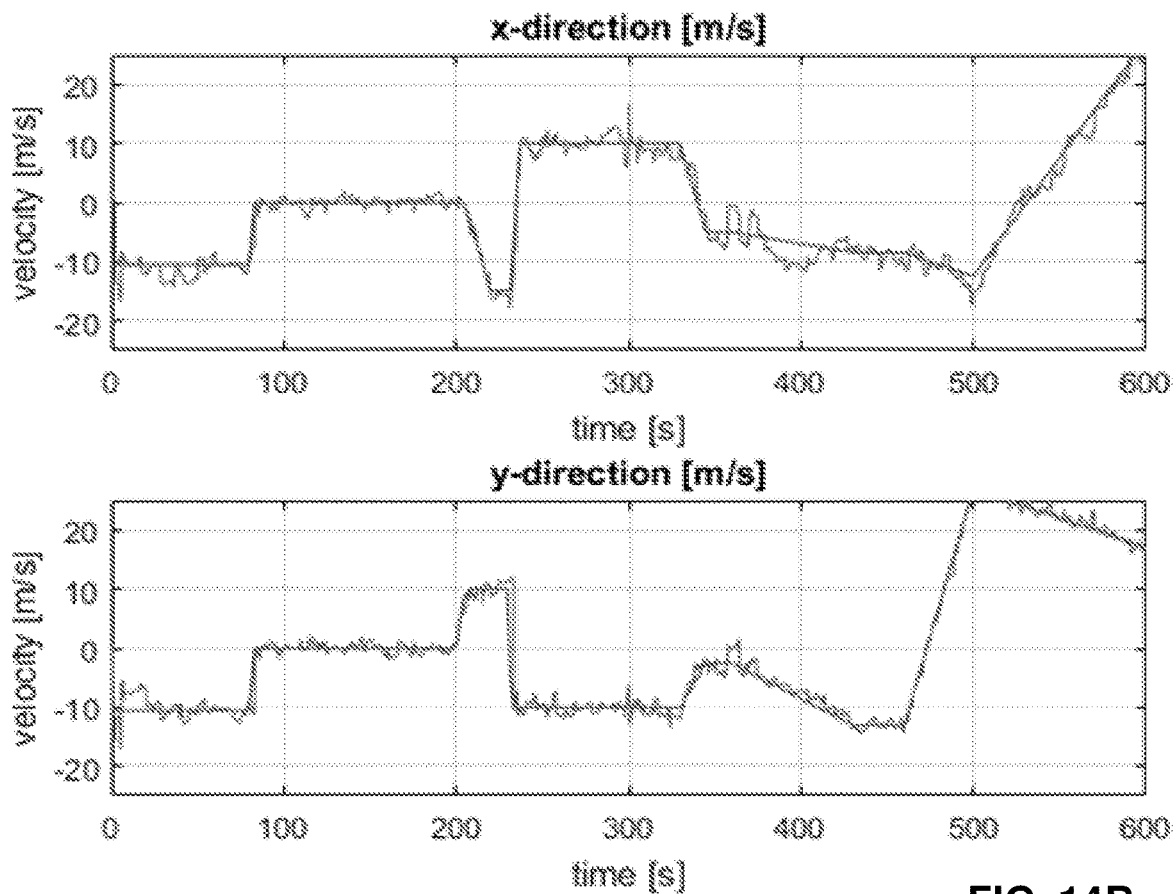
Figure 14C:
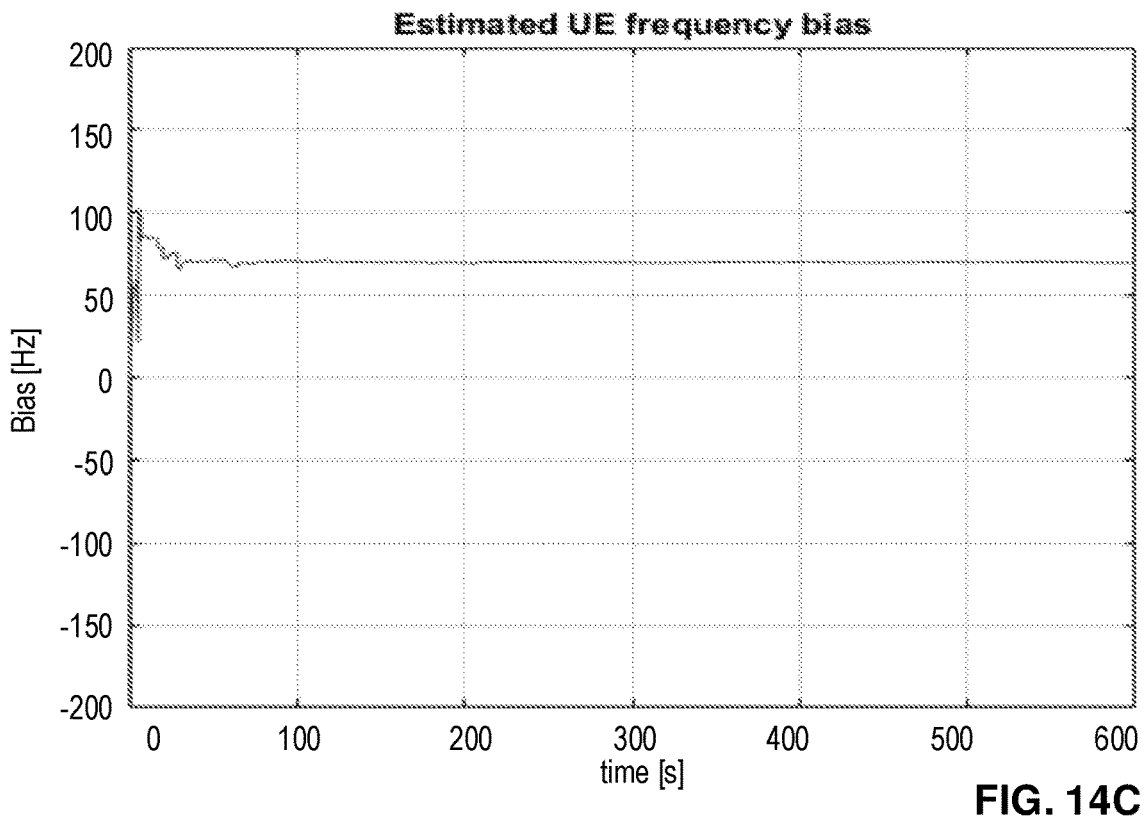
Figure 14D:
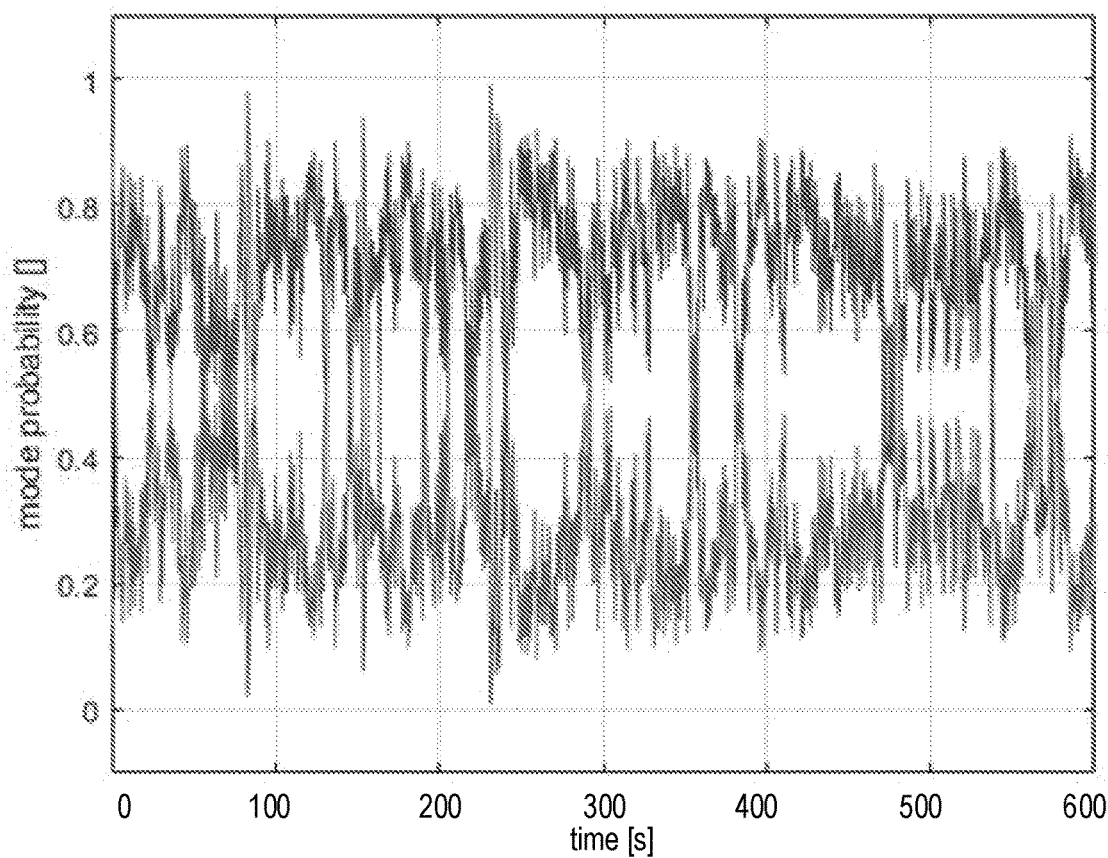

In particular, FIG. 14A illustrates the estimated UE horizontal path overlaid with the actual UE horizontal path shown in FIG. 11A. Similarly, FIG. 14B illustrates the estimated UE horizontal velocity components overlaid with the actual UE horizontal velocity components shown in FIG. 11B. Additionally, FIG. 14C illustrates how the estimated UE Doppler bias converges toward the actual UE Doppler bias of 70 Hz. Finally, FIG. 14D illustrates the evolution of the mode probabilities of the two IMM modes over the course of the simulation.

The linear system observability principles discussed above can also be used to illustrate how embodiments can obtain 2D UE movement state estimates based on three UE Doppler shift measurements on signals from spatially separated transmission points. Recall that FIG. 10A shows that the system is not observable based on UE Doppler shift measurements from two sites.

Figure 15:
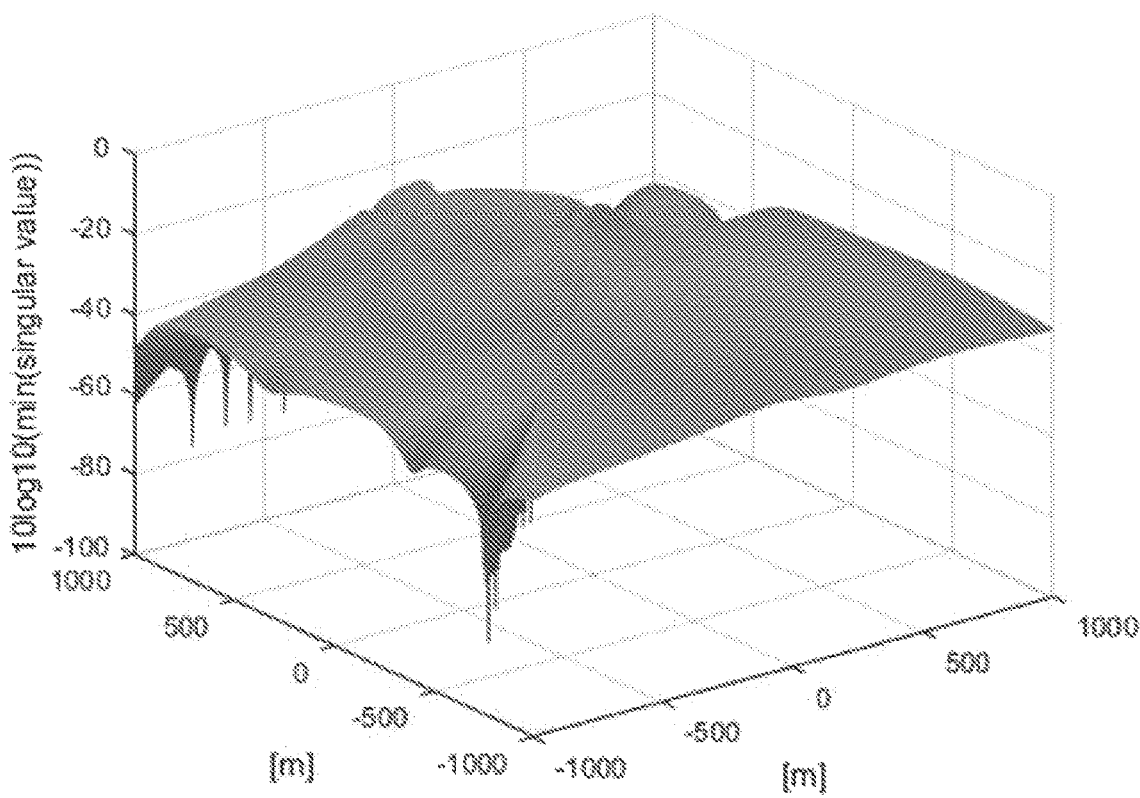
FIG. 15 illustrates observability of UE movement state estimation system by adding a third Doppler shift measurement, in accordance with further embodiments of the present disclosure.

However, when a third UE Doppler shift at a spatially separated site, the system becomes observable. To illustrate this principle, the following site $$S_3 = (800\ -50\ 70)'$$

was added to the two sites used for the previous observability analysis. The observability of the resulting system is illustrated by the plot of the logarithmic measure of s shown in FIG. 15. In other words, FIG. 15 illustrates the underlying principle that 2D UE movement state estimation (including UE frequency bias) can be obtained based on Doppler shift measurements with respect to first, second, and third spatially separated TPs.

The following describes simulation techniques that can be used to validate the performance of these embodiments. In particular, these techniques use the same simulated UE trajectory, UE Doppler shift bias, UE velocity, and base station positions as described above and shown in FIGS. 11A-B. Additionally, the simulation uses the same parameters for the two-mode IMM state estimator as shown in Table 2 above. In this case, however, the simulated UE is configured to perform measurements on signals from the three closest sites.

Figure 16A:
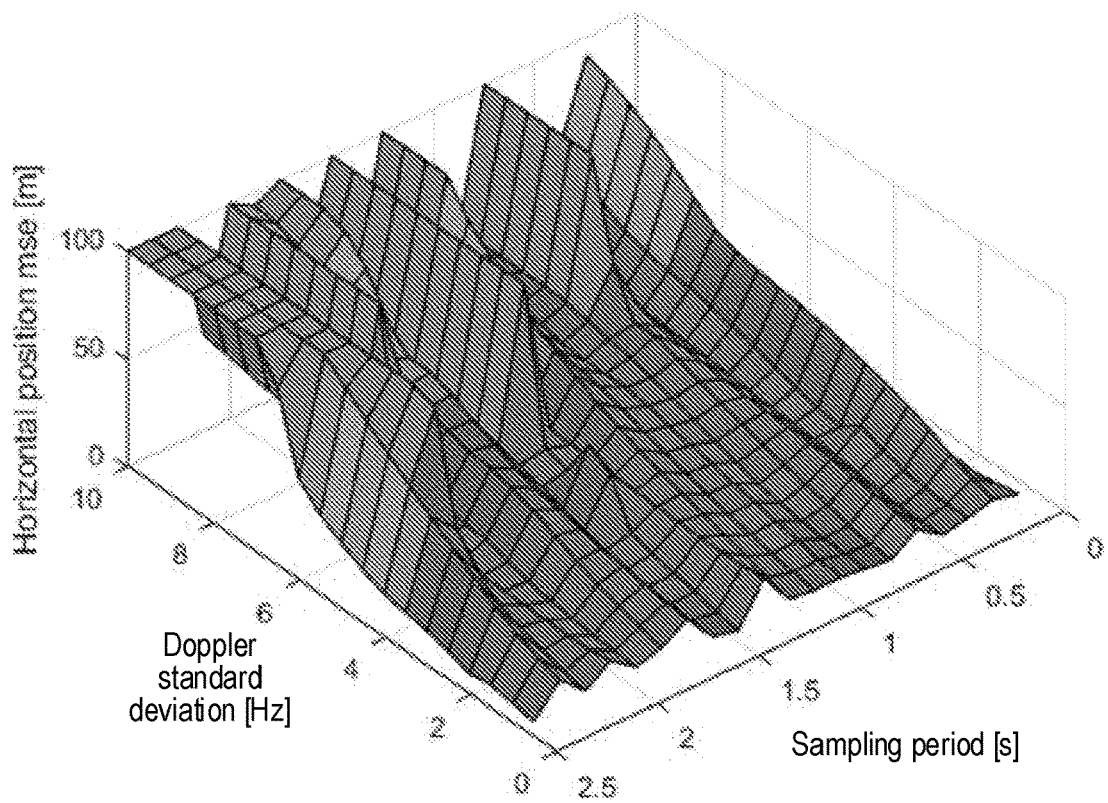
FIGS. 16A-C show MSE of estimated horizontal position, horizontal velocity, and UE frequency bias, respectively, as a function of UE Doppler shift measurement standard deviation and sampling period, according to simulations of the further embodiments.
Figure 16B:
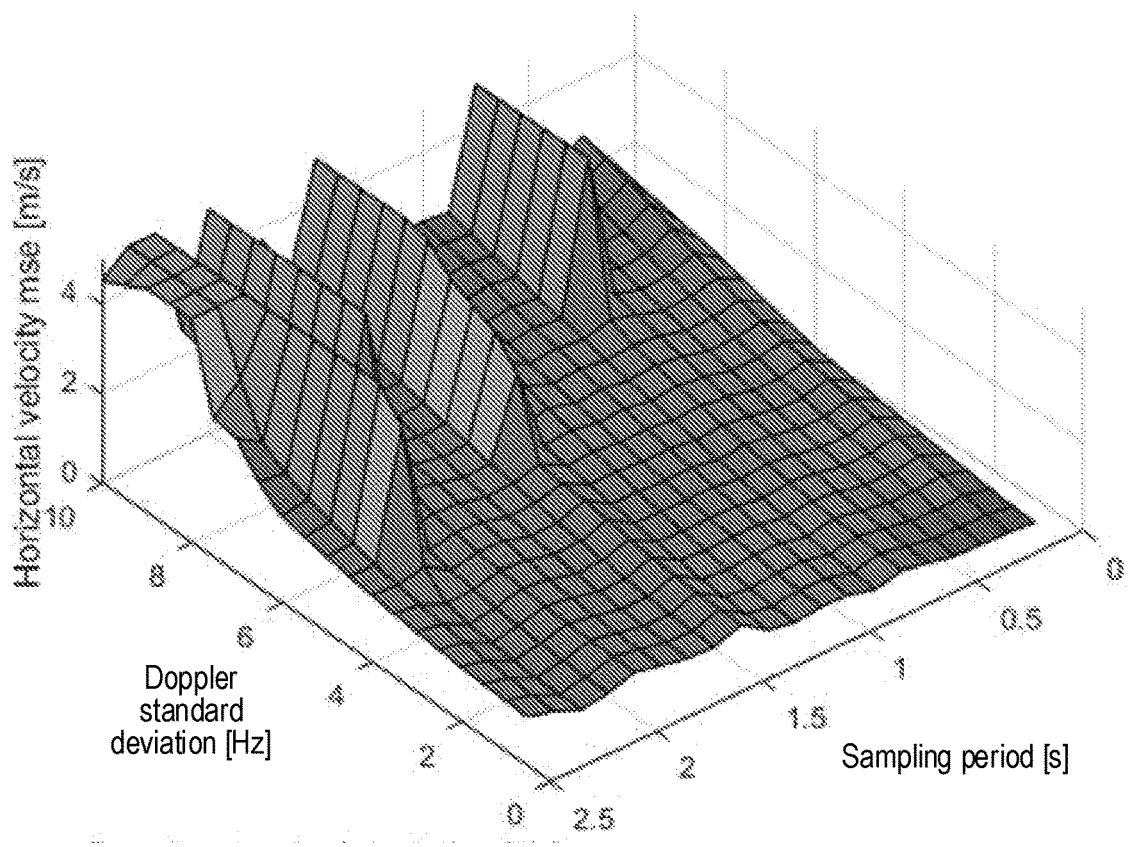
Figure 16C:
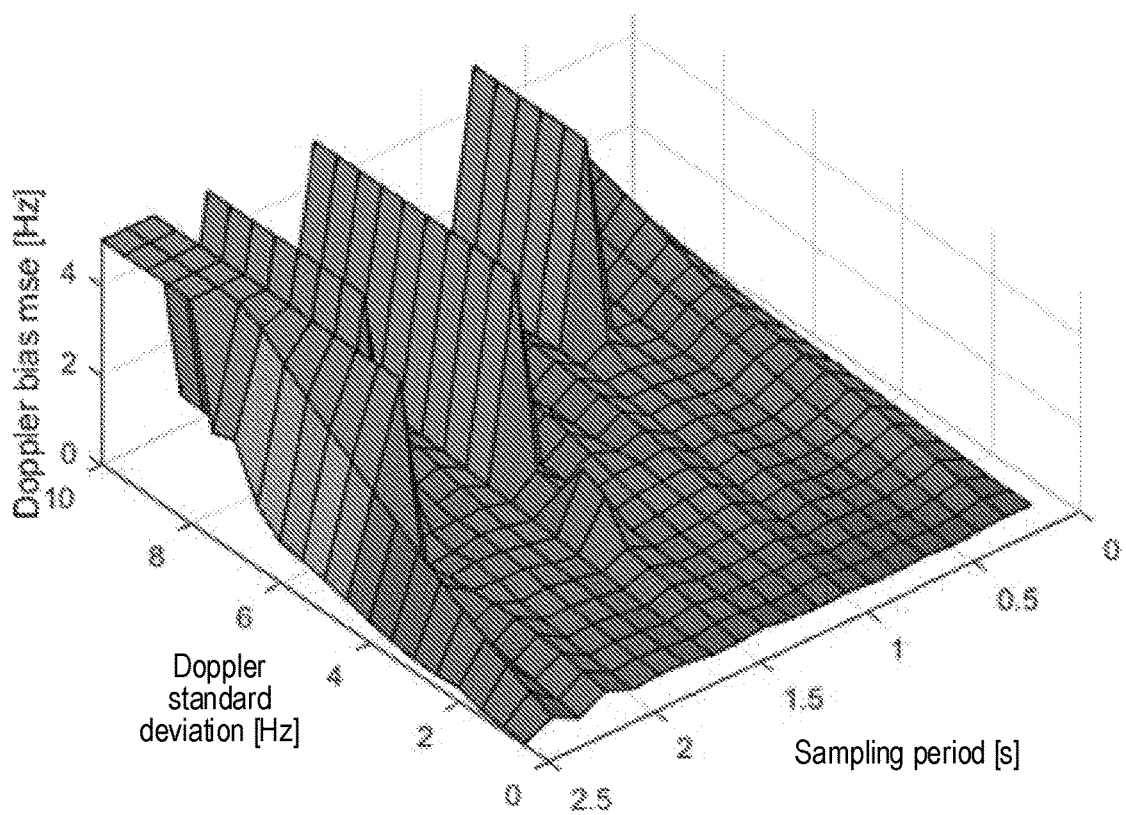

FIG. 16A shows mean square error (MSE) of estimated horizontal position as a function of the UE Doppler shift measurement standard deviation and sampling period. FIG. 16B shows MSE of estimated horizontal velocity as a function of the UE Doppler shift measurement standard deviation and sampling period. FIG. 16C shows MSE of estimated UE frequency bias as a function of UE Doppler shift measurement standard deviation and sampling period. Based on these results, it can be concluded that embodiments based on three UE Doppler measurements perform very well over a large range of measurement inaccuracies. Position MSE below 25 m and velocity MSE below 1.5 m/s are often achieved. Furthermore, Doppler shift measurement accuracy appears to be more important for state estimation accuracy than sampling period.

The UE Doppler measurements from all seven sites (i.e., the closest three sites at each measurement time) used in this simulation are the same as those shown in FIG. 13B. FIGS. 17A-D show the simulated performance of these embodiments of the UE movement state estimator based on the measurements illustrated in FIG. 13B.

Figure 17A:
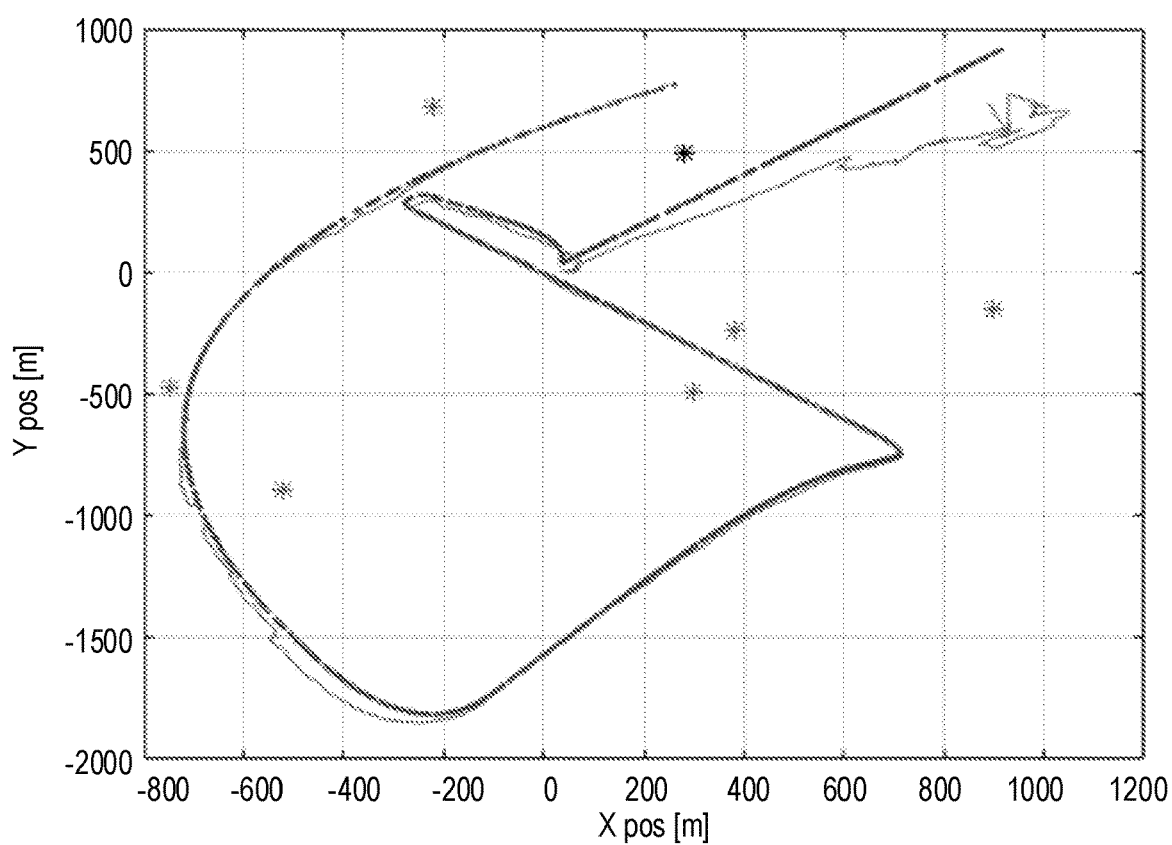
FIGS. 17A-D show results for the simulations of the further embodiments in terms of estimated UE horizontal position, UE horizontal velocity, UE Doppler bias, and mode probabilities of the IMM, respectively.
Figure 17B:
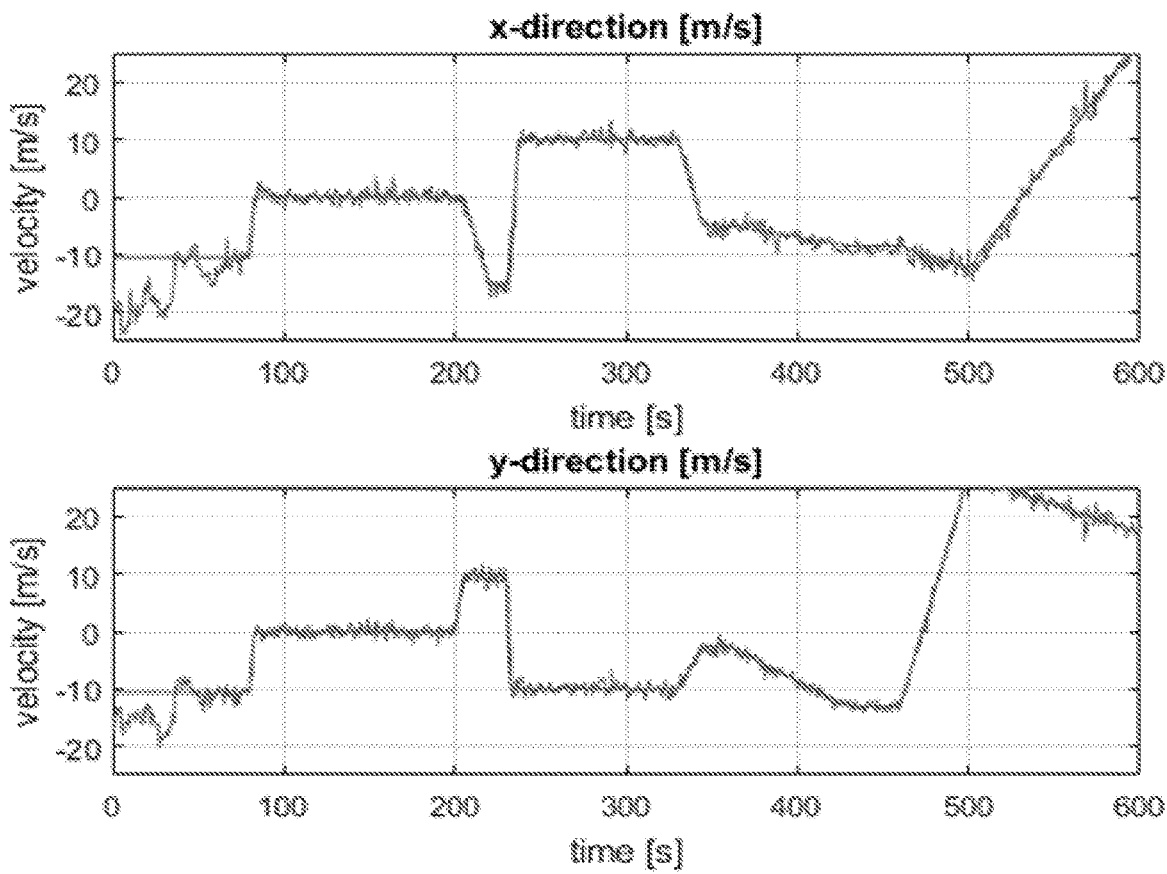
Figure 17C:
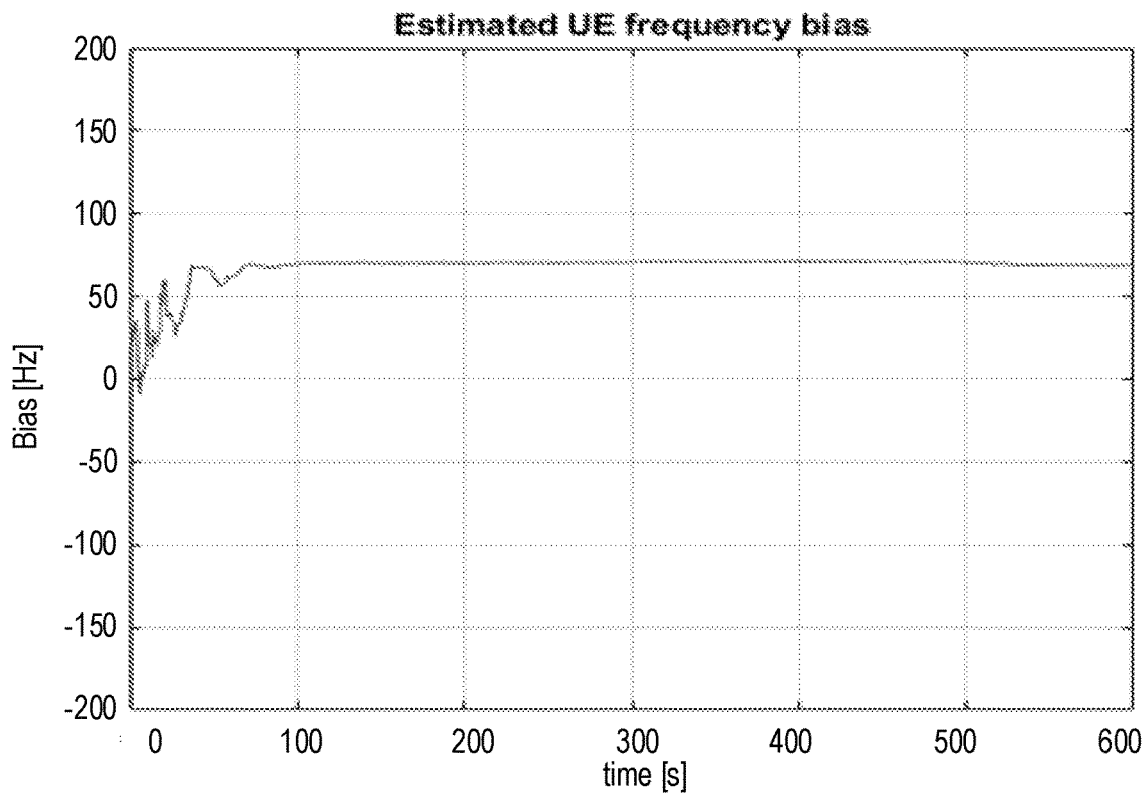
Figure 17D:
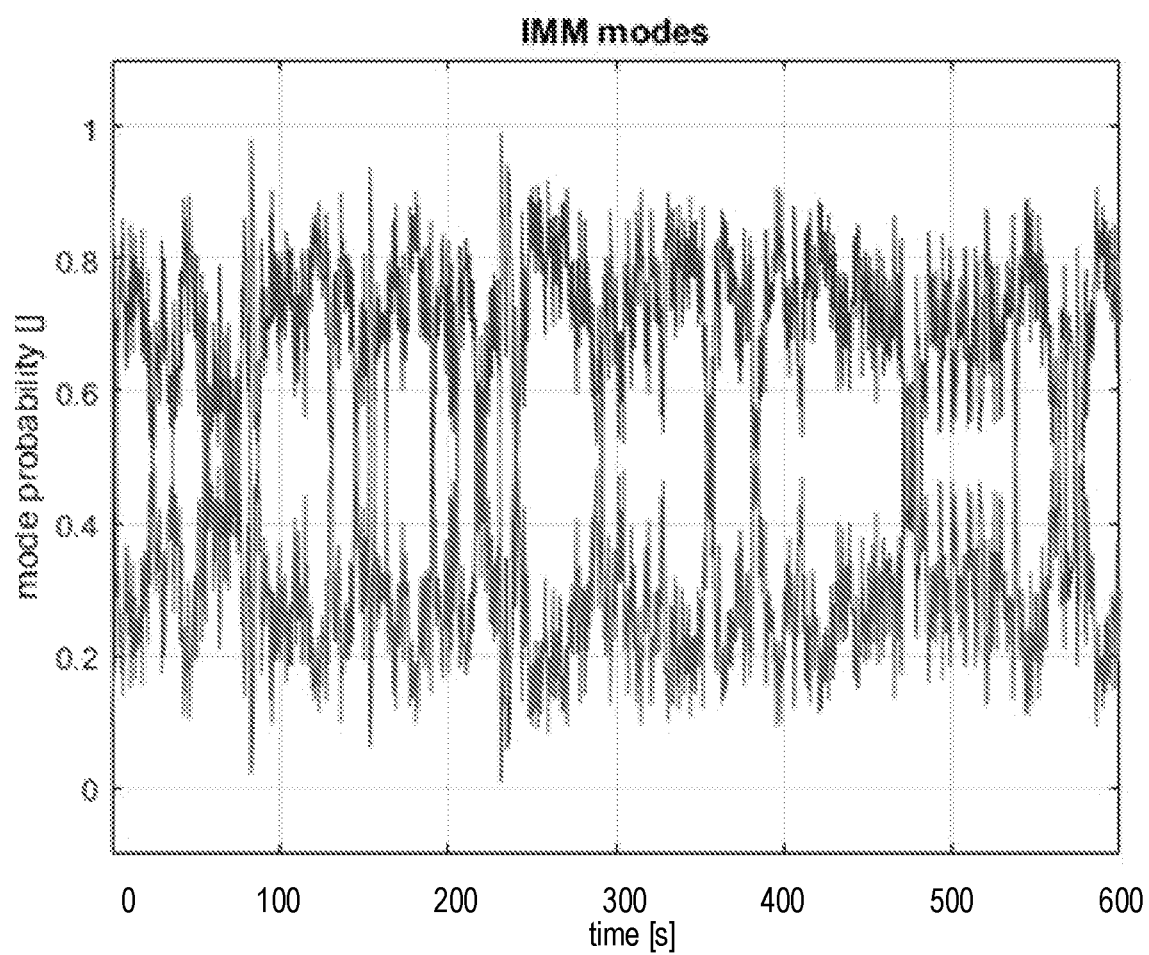

In particular, FIG. 17A illustrates the estimated UE horizontal path overlaid with the actual UE horizontal path shown in FIG. 11A. Similarly, FIG. 17B illustrates the estimated UE horizontal velocity components overlaid with the actual UE horizontal velocity components shown in FIG. 11B. Additionally, FIG. 17C illustrates how the estimated UE Doppler bias converges toward the actual UE Doppler bias of 70 Hz. Finally, FIG. 17D illustrates the evolution of the mode probabilities of the two IMM modes over the course of the simulation.

Other embodiments include various network signaling techniques to support the UE movement state estimation discussed above. In general, such embodiments can be based on existing LTE and/or NR signaling techniques for UE measurement control and measurement reporting but with some additions, enhancements, and/or modifications. Description of some existing signaling, measurement, and reporting techniques for NR are given in the following 3GPP specifications:

- 3GPP TS 38.300 sections 5.3.5.3 (UL timing control), 9.2.4 (Measurements), 9.2.6 (Random Access Procedure), and 9.2.9 (Timing Advance); and
- 3GPP TS 38.331 sections 5.5 (Measurements), 5.6 (UE capabilities), 6.2.2 (Message definitions), 6.3.2 (RRC information elements, IEs, including MeasConfig, MeasId, MeasObjectNR, MeasResults, MeasResult2NR, PhysCellId, QuantityConfig, ReportConfigNR, 6.3.3 (UE capability information elements).

Below are some exemplary updates to various messages and IEs described in the above-listed specifications to facilitate support of UE movement state determination and reporting:

RRC and other protocol messages for UE capability information can be updated to indicate UE capability for UE-based movement state estimation. The UE movement state in this context is 2D horizontal position and 2D horizontal velocity.

RRC IE MeasConfig can be updated to indicate that UE state estimation should start or stop and type of reporting, e.g., periodic or event based. The MeasConfig IE is further divided into the following three IEs:

MeasObjectNR: defines frequency(ies) to measure, cells to measure (WhiteCellList), and cells not to measure (BlackCellList);

ReportConfigNR: defines how to report and on what cells to do event evaluation (WhiteCellList);

QuantityConfig: defines type of RS used for measurement, quantities to be estimated from RS, and how measurement L3 filtering of should be done before event evaluation and reporting.

RRC message MeasurementReport can be updated to include information about position and/or speed event fulfillment, the estimated UE movement state, and optionally which cell s/TPs/signals were measured as a basis for determining the included movement state.

Figure 18:
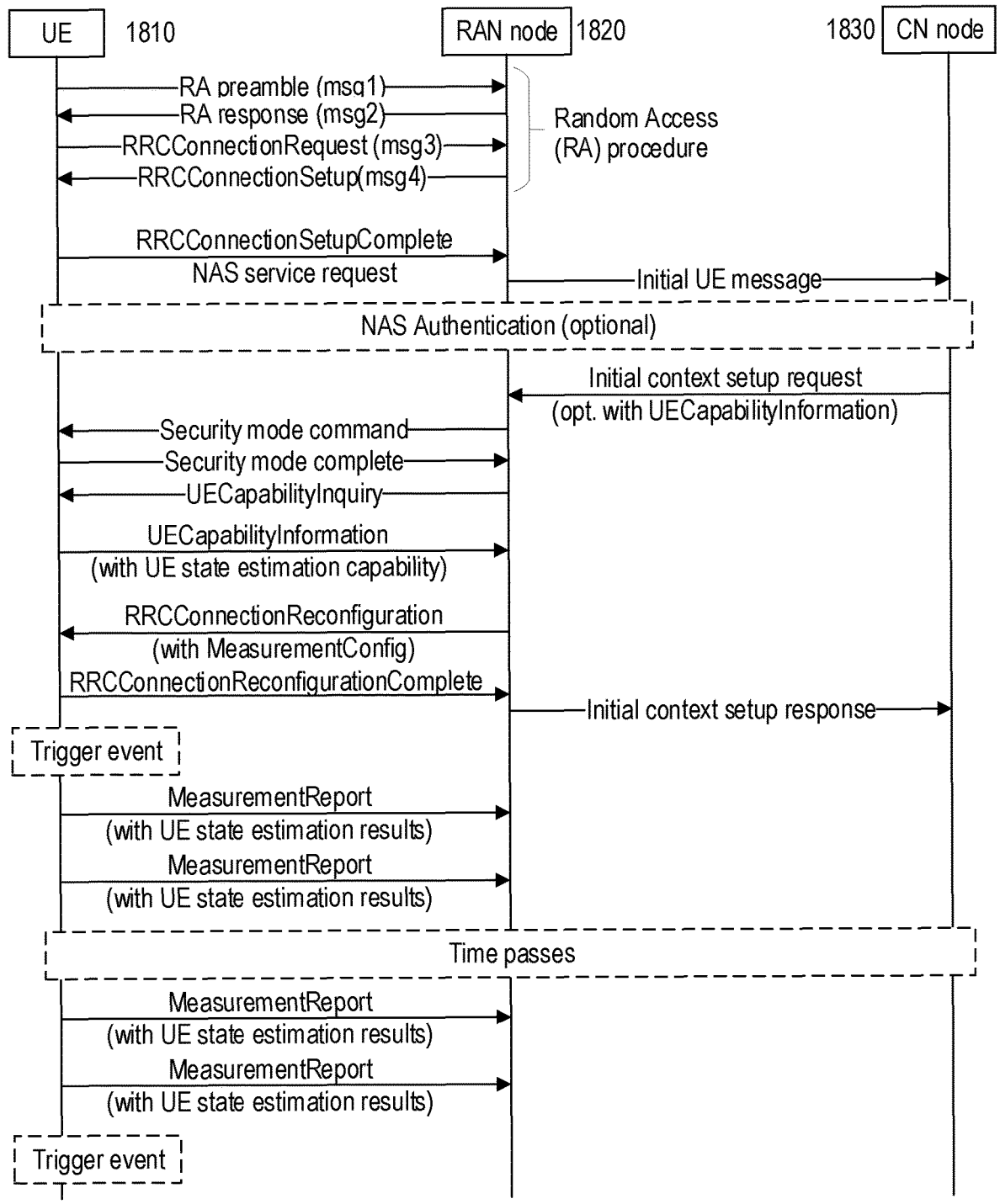
FIG. 18 is a signal flow diagram of various operations between a UE, a RAN node, and a core network (CN) node, according to various exemplary embodiments of the present disclosure.

Various embodiments of network signaling techniques to support the UE movement state estimation are further illustrated by FIG. 18, which is a signal flow diagram that illustrates various operations between a UE 1810, a RAN node 1820 (e.g., eNB, gNB, etc.), and a CN node 1830 (e.g., MME, AMF, etc.) according to various exemplary embodiments. For conciseness, the following description will refer to these entities without these numerical reference designators.

In the scenario shown in FIG. 18, the UE initially performs a random access (RA) procedure to access a cell served by the gNB. An exemplary four-step RA procedure involving exchange of four messages (labelled "msg1" through "msg4") is shown, but other RA procedures involving two steps or messages can also be used. The UE can obtain an initial timing advance (TA) for the serving cell during the RA procedure.

Subsequently, the UE sends an RRCConnectionSetupComplete message to the RAN node, which can include an NAS service request that the RAN node forwards to the CN node. This may provoke an authentication between the UE and the CN node. Subsequently, the AMF sends a context setup request to the RAN node, optionally including a UECapabilityInformation IE that indicates the UE's capability for movement state estimation according to embodiments described herein.

Alternately, the RAN node may send an RRC UECapabilityInquiry message to the UE to inquire about the UE's capability for movement state estimation according to embodiments described herein. The UE can respond with an RRC UECapabilityInformation message that indicates the capability according to the inquiry. Based on this capability indication, the RAN node can send the UE an RRCConnectionReconfiguration message that includes a MeasurementConfigIE containing configuration information for UE Doppler measurements. This configuration information can include any of the following:

an identification of one or more radio access technologies (RATs) of signals to be measured, e.g., UMTS, LTE, NR, etc.;

estimated RTT between the UE and a TP associated with the RAN node, as determined by the RAN node. Any cell for which the network determines UE TA can be used, such as PCell, PSCell, SCell, etc.;

an identification of the TP associated with the estimated RTT (e.g., serving cell ID);

identification of a plurality of candidate TPs for Doppler shift measurements (e.g., neighbor cell IDs, SSB indices, etc.);

identification of DL carrier frequencies used by the plurality of candidate TPs;

respective locations for the plurality of candidate TPs;

one or more rules or criteria for selecting TPs (i.e., from the candidate TPs) for Doppler shift measurements, such as X candidate neighbor cells that have the highest received SSB signal power and that are not blacklisted or are whitelisted;

one or more first trigger events to initiate determination of UE movement state; one or more second trigger events for reporting UE movement state;

one or more third trigger events for stopping reporting of UE movement state; and a reporting interval for periodic reporting of UE movement states.

In some embodiments, each third trigger event can be implicit from a corresponding second trigger event that is explicitly identified in the MeasurementConfig IE. For example, a second trigger event can be that the UE is at least a threshold distance from the TP corresponding to a serving cell for the UE (e.g., PCell). A related second event that causes the UE to stop reporting movement state can be that the UE is less than the threshold distance from the same TP. This related second event can be implicit and/or inferred from the second trigger event that can be explicitly identified in the MeasurementConfig IE.

In some embodiments, the measurement configuration can be conveyed to the UE by more than one message. For example, the RAN node can identify the plurality of candidate TPs and associated DL carrier frequencies in a first message but refrain from including the respective locations of all candidate TPs in the first message. The UE can subsequently identify the strongest TP on each carrier frequency (i.e., from among the candidates) and report the ID of the strongest TP of each provided carrier frequency to the RAN node. Subsequently, the RAN node can send the UE a second message including TP locations corresponding to the reported TP IDs, which the UE can use to determine its movement state.

In some embodiments, the reception of the MeasurementConfig IE can be interpreted by the UE as a request to initiate determination of UE movement state. In other embodiments, the MeasurementConfig IE can include an explicit request to initiate determination of UE movement state. In either case, the UE initiates determination of movement state, e.g., on a periodic basis such as every 2.0 seconds discussed above.

In some embodiments, the reception of the MeasurementConfig IE can also be interpreted by the UE as a request to initiate reporting of determined UE movement state. In other embodiments, the UE can initiate reporting based on detecting a second trigger event identified in the MeasurementConfig IE.

In other embodiments, certain radio link monitoring (RLM) events can be used to trigger and/or initiate UE determination of movement state. These can include any of the following defined in 3GPP TS 38.331 section 5.5.4:

Event A1 (Serving becomes better than threshold);

Event A2 (Serving becomes worse than threshold);

Event A3 (Neighbour becomes offset better than SpCell);

Event A4 (Neighbour becomes better than threshold);
Event A5 (SpCell becomes worse than threshold1 and neighbour becomes better than threshold2);
Event A6 (Neighbour becomes offset better than SCell);
Event B1 (Inter RAT neighbour becomes better than threshold);
Event B2 (PCell becomes worse than threshold1 and inter RAT neighbour becomes better than threshold2);
Event I1 (Interference becomes higher than threshold);
Event C1 (The NR sidelink channel busy ratio is above a threshold); and
Event C2 (The NR sidelink channel busy ratio is below a threshold).

In some embodiments, the same or a different RLM event can trigger reporting of determined UE movement state. Event combinations can also be used to trigger determination and/or reporting of UE movement state.

In any case, the UE sends the RAN node a MeasurementReport message that includes a value of the UE movement state determined most recently before sending the message. Subsequently, the UE can send further MeasurementReport messages that include respective values of the UE movement state determined most recently before sending the respective further message. For example, the messages can be spaced in time according to the reporting interval received in the MeasurementConfig IE. Later, the UE can detect a third trigger event identified in the MeasurementConfig IE, which causes the UE to cease reporting of values of the UE movement state.

The UE can include the following in each MeasurementReport message sent in FIG. 18:
  2D horizontal position determined at a particular measurement time (e.g., from positioning measurements, IMM, and TP locations),
  2D horizontal velocity determined at the particular measurement time,
  the particular measurement time (e.g., when the estimate was finished and provided to UE RRC layer for reporting), and
  identification of TPs (e.g., neighbor cells), carrier frequencies, and/or signals (e.g., type of RS) used for the UE Doppler (and optionally RTT) measurements from which the included position and velocity was determined.

In some embodiments, certain trigger events can be used to initiate UE operations other than movement state reporting. For example, upon occurrence of a particular trigger event, a UE can perform random access to a particular TP, such as the TP with the strongest observed signal or a specific TP on a specific frequency identified in the MeasurementConfig IE or another message from the RAN node. As a result of this operation, the UE can determine an RTT for the TP, as discussed in more detail below.

As another example, when the UE-determined 2D velocity reaches a certain speed threshold, the UE can change the rate of radio link monitoring (RLM), such as sampling of RSRP, RSRQ, etc. As a more specific example, the UE can reduce RLM rate as the measured speed (i.e., magnitude of 2D velocity) decreases below a threshold, thereby reducing UE energy consumption.

As mentioned above, the RTT measurement used in certain embodiments can be performed by the UE or by the network (e.g., serving RAN node). For example, the RTT can be estimated by the UE based on the following:
  The UE use received transmission frame and symbol timing to adjust its UL transmission timing reference.
  When transmitting a RA preamble (e.g., msg1) in a cell, the UE initially transmits a predetermined time before its UL timing reference.
  The RAN node serving the cell adjusts the UE's TA (e.g., by sending the UE a TA command) so that UE UL transmission is time aligned with a RAN node reception window that is used all RRC_CONNECTED UEs in the cell.
  The RAN node maintains this reception time alignment by adjusting the UE's TA as necessary, such as when UE movement changes the signal propagation delay. When changes are needed, the RAN node provides TA updates to the UE.
  The most up-to-date TA value at the UE represents two times the current one-way signal delay between UE and serving cell (e.g., antenna), such that it can serve as a UE round trip time (RTT) measurement.

As another example, the RTT can be estimated by the RAN node serving the cell based on the following:
  The RAN node adjusts the UE's TA (e.g., by sending the UE a TA command) so that UE UL transmission is time aligned with a RAN node reception window that is used all RRC_CONNECTED UEs in the cell
  The RAN node uses a predetermined delay between DL transmission and UE UL reception window.
  After time aligned reception is achieved for a UE's UL transmission, the network determined TA value represents two times the current one-way signal delay between UE and serving cell (e.g., antenna), such that it can serve as a UE round trip time (RTT) measurement.

Figure 19:
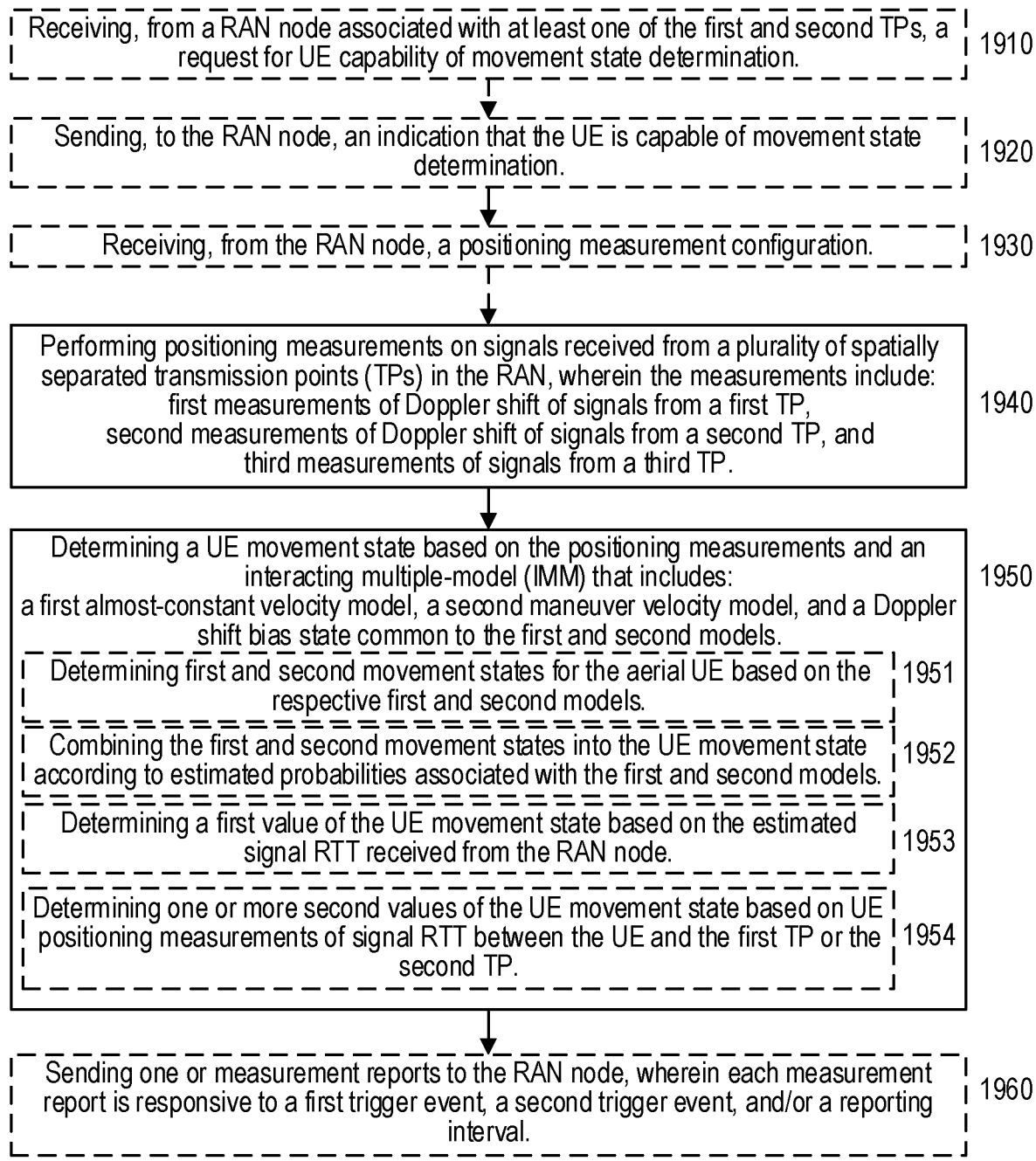
FIG. 19 is a flow diagram illustrating an exemplary method (e.g., procedure) for a user equipment (UE, e.g., wireless device, aerial UE, etc.), according to various exemplary embodiments of the present disclosure.
Figure 20:
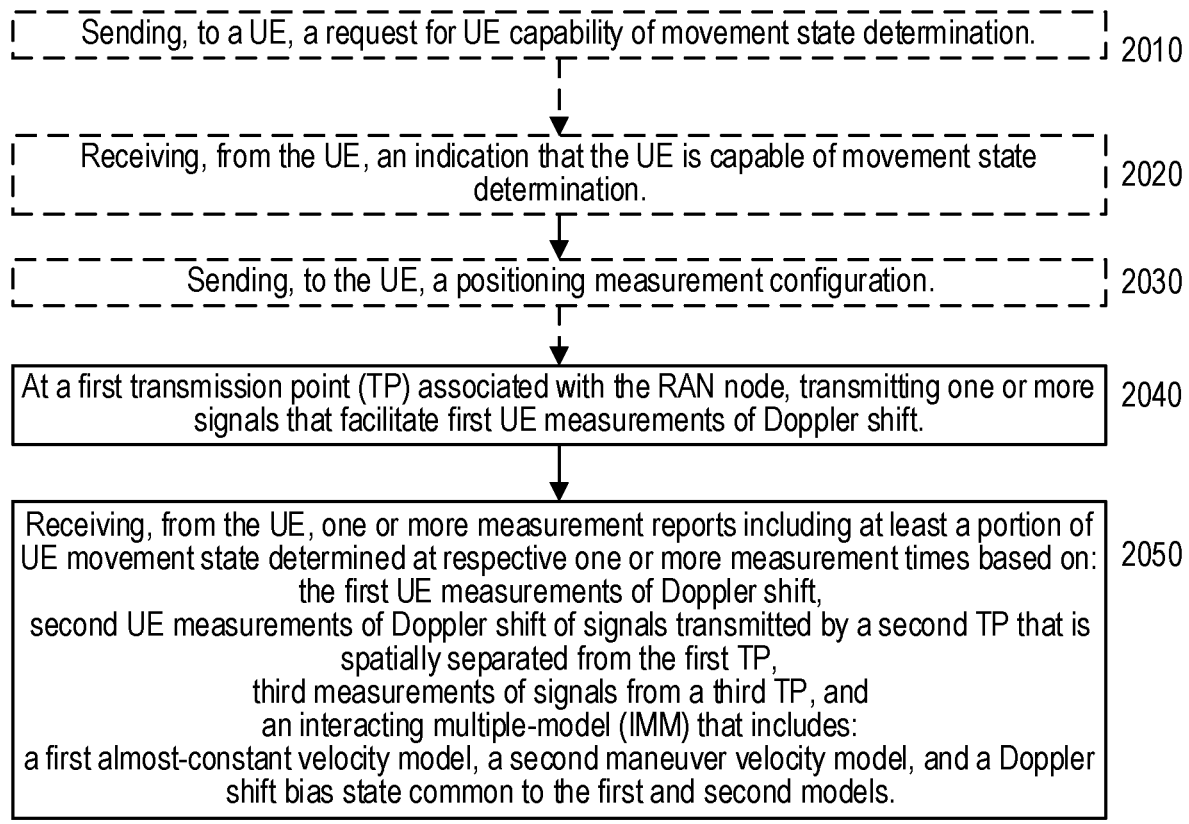
FIG. 20 is a flow diagram illustrating an exemplary method (e.g., procedure) for a radio access network (RAN) node (e.g., base station, eNB, gNB, ng-eNB, en-gNB, etc. or component thereof), according to various exemplary embodiments of the present disclosure.

The embodiments described above can be further illustrated with reference to FIGS. 19-20, which depict exemplary methods (e.g., procedures) for a UE and a RAN node, respectively. In other words, various features of operations described below correspond to various embodiments described above. The exemplary methods shown in FIGS. 19-20 can be used cooperatively to provide various exemplary benefits and/or advantages described herein. Although FIGS. 19-20 show specific blocks in particular orders, the operations of the respective methods can be performed in different orders than shown and can be combined and/or divided into blocks having different functionality than shown. Optional blocks or operations are indicated by dashed lines.

In particular, FIG. 19 shows a flow diagram of an exemplary method (e.g., procedure) for determining a movement state of a user equipment (UE) operating in a radio access network (RAN), according to various exemplary embodiments of the present disclosure. The exemplary method can be performed by a UE (e.g., wireless device, aerial UE, etc.) operating in the RAN (e.g., E-UTRAN, NG-RAN), such as UEs described herein with reference to other figures.

The exemplary method can include the operations of block 1940, in which the UE can perform positioning measurements on signals received from a plurality of transmission points (TPs) in the RAN. The positioning measurements can include the following:
  first measurements of Doppler shift of signals from a first TP, and
  second measurements of Doppler shift of signals from a second TP that is spatially separated from the first TP, and
  third measurements of signals from a third TP.

The exemplary method can also include the operations of block 1950, in which the UE can determine a UE movement state based on the positioning measurements and an interacting multiple-model (IMM) that includes a first almost-constant velocity model, a second maneuver velocity model, and a Doppler shift bias state common to the first and second models.

In some embodiments, the third measurements are of signal round trip time (RTT) and the third TP is the same as the first TP or the second TP. In some of these embodiments, the third measurements are based on UE timing advance (TA) with respect to any of the following for the UE: a primary cell (PCell), a primary secondary cell (PSCell), and a secondary cell (SCell).

In other embodiments, the third measurements are of Doppler shift and the third TP is spatially separated from the first TP and from the second TP.

In some embodiments, the UE movement state (e.g., determined in block 1950) can include two-dimensional (2D) horizontal position, 2D horizontal velocity, and Doppler shift bias.

In some embodiments, the IMM model also includes a Hidden Markov Model (HMM) comprising respective transition probabilities of the UE between any of the first and second models during successive updates of the UE movement state. In such embodiments, each transition probability can be dependent on the duration between successive updates of the UE movement state. Examples of such HMMs are discussed in more detail above.

In some embodiments, the IMM model can include estimated probabilities associated with the first and second models. In such embodiments, the determining operations of block 1950 can include the operations of sub-blocks 1951-1952. In sub-block 1951, the UE can determine first and second movement states for the UE based on the respective first and second models. In sub-block 1952, the UE can combine the first and second movement states into the UE movement state according to the estimated probabilities. In some of these embodiments, the first and second movement states can be determined using respective extended Kalman filters (EKFs), such as those discussed in more detail above.

In some embodiments, one of the first and second TPs can be associated with a serving cell for the UE in the RAN, while the other of the first and second TPs is associated with a neighbor cell for the UE in the RAN.

In some embodiments, the exemplary method can also include the operations of block 1930, where the UE can receive, from a RAN node associated with at least one of the first and second TPs, a positioning measurement configuration including one or more of the following:
  a request to initiate determination of UE movement state;
  one or more first trigger events to initiate determination of UE movement state;
  identification of one or more radio access technologies (RATs) of signals to be measured;
  estimated signal round trip time (RTT) between the UE and a TP associated with the RAN node;
  identification of the TP associated with the estimated RTT;
  identification of a plurality of candidate TPs for Doppler shift measurements;
  identification of downlink (DL) carrier frequencies used by the plurality of candidate TPs;
  respective locations for the plurality of candidate TPs;
  one or more rules or criteria for selecting TPs for Doppler shift measurements;
  one or more second trigger events for reporting UE movement state;
  one or more third trigger events for stopping reporting of UE movement state; and
  a reporting interval for periodic reporting of UE movement states.

In some embodiments, the one or more third trigger events are implicit from the respective one or more second trigger events identified in the positioning measurement configuration.

In various embodiments, the determining operations of block 1950 can include the operations of sub-blocks 1953-1954. In sub-block 1953, the UE can determine a first value of the UE movement state based on the estimated signal RTT received from the RAN node (e.g., in the positioning measurement configuration received in block 1930). In sub-block 1954, the UE can subsequently determine one or more second values of the UE movement state based on UE positioning measurements of signal RTT between the UE and the first TP or the second TP.

In some embodiments, the one or more second trigger events (e.g., identified in the positioning measurement configuration received in block 1930) can include any of the following:
  a position within or outside of an area, such as an absolute area defined by a polygon shape or a relative area defined by a distance from the TP (e.g., first or second) that provides a serving cell for the UE;
  a position change threshold;
  a speed (scalar) or velocity (vector) threshold; and
  a speed (scalar) or velocity (vector) change threshold.

In some embodiments, the exemplary method can also include the operations of blocks 1910-1920. In block 1910, the UE can receive, from the RAN node, a request for UE capability of movement state determination. In block 1920, the UE can send, to the RAN node, an indication that the UE is capable of movement state determination (e.g., in block 1950). In some embodiments, the measurement configuration can be received (e.g., in block 1930) after sending the indication in block 1920. Likewise, performing the positioning measurements in block 1940 can be responsive to receiving the measurement configuration in block 1930.

In some embodiments, the exemplary method can also include the operations of block 1960, where the UE can send one or measurement reports to the RAN node, wherein each measurement report is responsive to one or more of the following from the received positioning measurement configuration: a second trigger event, a third trigger event, and the reporting interval. For example, a first measurement report can be sent in response to the second trigger event and one or more second measurement reports can be sent at respective one or more reporting intervals after the first measurement report and until occurrence of the third trigger event. As an example, the first and third trigger event can be related to the same threshold (e.g., distance).

In some embodiments, each measurement report can include:
  at least a portion of the UE movement state determined at a particular measurement time,
  the particular measurement time, and
  identification of one or more of the following used in the UE positioning measurements from which the included UE movement state was determined: TPs (e.g., by cell IDs), carrier frequencies, and signals (e.g., SSB indices).

In addition, FIG. 20 shows a flow diagram of an exemplary method (e.g., procedure) to facilitate user equipment (UE) determination of movement state, according to various exemplary embodiments of the present disclosure. The exemplary method can be performed by a RAN node (e.g., base station, eNB, gNB, ng-eNB, en-gNB, etc., or component thereof) serving a cell in the RAN (e.g., E-UTRAN, NG-RAN), such as RAN nodes described herein with reference to other figures.

The exemplary method can include the operations of block 2040, where the RAN node can, at a first transmission point (TP) associated with the RAN node, transmit one or more signals that facilitate first UE measurements of Doppler shift. The exemplary method can also include the operations of block 2050, where the RAN node can receive, from a UE, one or more measurement reports including at least a portion of a UE movement state determined at respective one or more measurement times based on:
- the first UE measurements of Doppler shift,
- second UE measurements of Doppler shift of signals transmitted by a second TP that is spatially separated from the first TP,
- third measurements of signals from a third TP, and
- an interacting multiple-model (IMM) that includes:
  - a first almost-constant velocity model,
  - a second maneuver velocity model, and
  - a Doppler shift bias state common to the first and second models.

In some embodiments, the third measurements are of signal round trip time (RTT) and the third TP is the same as the first TP or the second TP. In some of these embodiments, the third measurements are based on UE timing advance (TA) with respect to any of the following for the UE: a primary cell (PCell), a primary secondary cell (PSCell), and a secondary cell (SCell).

In other embodiments, the third measurements are of Doppler shift and the third TP is spatially separated from the first TP and from the second TP.

In some embodiments, the UE movement state can include two-dimensional (2D) horizontal position, 2D horizontal velocity, and Doppler shift bias. For example, the 2D horizontal position and the 2D horizontal velocity can be included in the received measurement report(s).

In some embodiments, the first TP can be associated with a serving cell for the UE in the RAN, while the second TP can be associated with a neighbor cell for the UE in the RAN.

In some embodiments, the exemplary method can also include the operations of block 2030, where the RAN node can send, to the UE, a positioning measurement configuration including one or more of the following:
- a request to initiate determination of UE movement state;
- one or more first trigger events to initiate determination of UE movement state;
- identification of one or more radio access technologies (RATs) of signals to be measured;
- estimated signal round trip time (RTT) between the UE and the first TP;
- identification of the first TP associated with the estimated RTT;
- identification of a plurality of candidate TPs for Doppler shift measurements;
- identification of DL carrier frequencies used by the plurality of candidate TPs;
- respective locations for the plurality of candidate TPs;
- one or more rules or criteria for selecting TPs for Doppler shift measurements;
- one or more second trigger events for reporting UE movement state;
- one or more third trigger events for stopping reporting of UE movement state; and
- a reporting interval for periodic reporting of UE movement states.

In some embodiments, the one or more third trigger events are implicit from the respective one or more second trigger events identified in the positioning measurement configuration.

In some embodiments, the one or more second trigger events (e.g., identified in the positioning measurement configuration in block 2030) can include any of the following:
- a position within or outside of an area, such as an absolute area defined by a polygon shape or a relative area defined by a distance from the TP (e.g., first or second) that provides a serving cell for the UE;
- a position change threshold;
- a speed (scalar) or velocity (vector) threshold; and
- a speed (scalar) or velocity (vector) change threshold.

In some embodiments, the exemplary method can also include the operations of blocks 2010-2020. In block 2010, the RAN node can send, to the UE, a request for UE capability of movement state determination. In block 2020, the RAN node can receive, from the UE, an indication that the UE is capable of movement state determination. In some embodiments, the positioning measurement configuration can be sent (e.g., in block 2030) after receiving the indication in block 2020.

In some embodiments, the one or more measurement reports (e.g., received in block 2050) can include:
- a first measurement report including the at least a portion of the UE movement state determined based on the estimated signal RTT received from the RAN node (e.g., in block 2030); and
- one or more subsequent second measurement reports including the at least a portion of the UE movement state determined based on UE positioning measurements of signal RTT between the UE and the first TP.

In some embodiments, each measurement report can be responsive to one or more of the following included in the positioning measurement configuration: a second trigger event, a third trigger event, and the reporting interval. For example, the one or measurement reports can include:
- a first measurement report responsive to the second trigger event; and
- one or more second measurement reports at respective one or more reporting intervals after the first measurement report and until occurrence of the third trigger event.

In some embodiments, each measurement report can also include the following:
- the measurement time corresponding to the included UE movement state; and
- identification of one or more of the following used in UE positioning measurements from which the included UE movement state was determined: TPs, carrier frequencies, and signals.

Although various embodiments are described above in terms of methods, techniques, and/or procedures, the person of ordinary skill will readily comprehend that such methods, techniques, and/or procedures can be embodied by various combinations of hardware and software in various systems, communication devices, computing devices, control devices, apparatuses, non-transitory computer-readable media, computer program products, etc.

Figure 21:
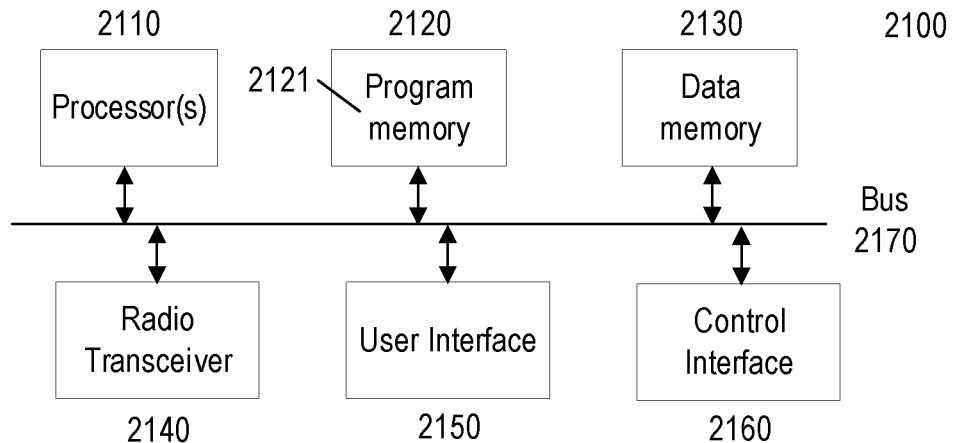
FIG. 21 shows a block diagram of an exemplary wireless device or UE, according to various exemplary embodiments of the present disclosure.

FIG. 21 shows a block diagram of an exemplary wireless device or user equipment (UE) 2100 (hereinafter referred to as "UE 2100") according to various embodiments of the present disclosure, including those described above with reference to other figures. For example, UE 2100 can be configured by execution of instructions, stored on a computer-readable medium, to perform operations corresponding to one or more of the exemplary methods and/or procedures described above.

UE 2100 can include a processor 2110 (also referred to as "processing circuitry") that can be operably connected to a program memory 2120 and/or a data memory 2130 via a bus 2170 that can comprise parallel address and data buses, serial ports, or other methods and/or structures known to those of ordinary skill in the art. Program memory 2120 can store software code, programs, and/or instructions (collectively shown as computer program product 2121 in FIG. 21) that, when executed by processor 2110, can configure and/or facilitate UE 2100 to perform various operations, including operations described below. For example, execution of such instructions can configure and/or facilitate UE 2100 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1×RTT, CDMA2000, 802.11 WiFi, HDMI, USB, Firewire, etc., or any other current or future protocols that can be utilized in conjunction with radio transceiver 2140, user interface 2150, and/or control interface 2160.

As another example, processor 2110 can execute program code stored in program memory 2120 that corresponds to MAC, RLC, PDCP, and RRC layer protocols standardized by 3GPP (e.g., for NR and/or LTE). As a further example, processor 2110 can execute program code stored in program memory 2120 that, together with radio transceiver 2140, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA). As another example, processor 2110 can execute program code stored in program memory 2120 that, together with radio transceiver 2140, implements device-to-device (D2D) communications with other compatible devices and/or UEs.

Program memory 2120 can also include software code executed by processor 2110 to control the functions of UE 2100, including configuring and controlling various components such as radio transceiver 2140, user interface 2150, and/or host interface 2160. Program memory 2120 can also comprise one or more application programs and/or modules comprising computer-executable instructions embodying any of the exemplary methods and/or procedures described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 2120 can comprise an external storage arrangement (not shown) remote from UE 2100, from which the instructions can be downloaded into program memory 2120 located within or removably coupled to UE 2100, so as to enable execution of such instructions.

Data memory 2130 can include memory area for processor 2110 to store variables used in protocols, configuration, control, and other functions of UE 2100, including operations corresponding to, or comprising, any of the exemplary methods and/or procedures described herein. Moreover, program memory 2120 and/or data memory 2130 can include non-volatile memory (e.g., flash memory), volatile memory (e.g., static or dynamic RAM), or a combination thereof. Furthermore, data memory 2130 can comprise a memory slot by which removable memory cards in one or more formats (e.g., SD Card, Memory Stick, Compact Flash, etc.) can be inserted and removed.

Persons of ordinary skill will recognize that processor 2110 can include multiple individual processors (including, e.g., multi-core processors), each of which implements a portion of the functionality described above. In such cases, multiple individual processors can be commonly connected to program memory 2120 and data memory 2130 or individually connected to multiple individual program memories and or data memories. More generally, persons of ordinary skill in the art will recognize that various protocols and other functions of UE 2100 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

Radio transceiver 2140 can include radio-frequency transmitter and/or receiver functionality that facilitates the UE 2100 to communicate with other equipment supporting like wireless communication standards and/or protocols. In some exemplary embodiments, the radio transceiver 2140 includes one or more transmitters and one or more receivers that enable UE 2100 to communicate according to various protocols and/or methods proposed for standardization by 3GPP and/or other standards bodies. For example, such functionality can operate cooperatively with processor 2110 to implement a PHY layer based on OFDM, OFDMA, and/or SC-FDMA technologies, such as described herein with respect to other figures.

In some exemplary embodiments, radio transceiver 2140 includes one or more transmitters and one or more receivers that can facilitate the UE 2100 to communicate with various LTE, LTE-Advanced (LTE-A), and/or NR networks according to standards promulgated by 3GPP. In some exemplary embodiments of the present disclosure, the radio transceiver 2140 includes circuitry, firmware, etc. necessary for the UE 2100 to communicate with various NR, NR-U, LTE, LTE-A, LTE-LAA, UMTS, and/or GSM/EDGE networks, also according to 3GPP standards. In some embodiments, radio transceiver 2140 can include circuitry supporting D2D communications between UE 2100 and other compatible devices.

In some embodiments, radio transceiver 2140 includes circuitry, firmware, etc. necessary for the UE 2100 to communicate with various CDMA2000 networks, according to 3GPP2 standards. In some embodiments, the radio transceiver 2140 can be capable of communicating using radio technologies that operate in unlicensed frequency bands, such as IEEE 802.11 WiFi that operates using frequencies in the regions of 2.4, 5.6, and/or 60 GHz. In some embodiments, radio transceiver 2140 can include a transceiver that is capable of wired communication, such as by using IEEE 802.3 Ethernet technology. The functionality particular to each of these embodiments can be coupled with and/or controlled by other circuitry in the UE 2100, such as the processor 2110 executing program code stored in program memory 2120 in conjunction with, and/or supported by, data memory 2130.

In some embodiments, radio transceiver 2240 can be used to perform measurements on various signals transmitted by a wireless network (e.g., E-UTRAN, NG-RAN), such as measurement of Doppler shift, RTT, etc. according to various embodiments described herein.

User interface 2150 can take various forms depending on the particular embodiment of UE 2100, or can be absent from UE 2100 entirely. In some embodiments, user interface 2150 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 2100 can comprise a tablet computing device including a larger touchscreen display. In such embodiments, one or more of the mechanical features of the user interface 2150 can be replaced by comparable or functionally equivalent virtual user interface features (e.g., virtual keypad, virtual buttons, etc.) implemented using the touchscreen display, as familiar to persons of ordinary skill in the art. In other embodiments, the UE 2100 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the UE 2100 having a touch screen display are capable of receiving user inputs, such as inputs related to exemplary methods and/or procedures described herein or otherwise known to persons of ordinary skill in the art.

In some embodiments, UE 2100 can include an orientation sensor, which can be used in various ways by features and functions of UE 2100. For example, the UE 2100 can use outputs of the orientation sensor to determine when a user has changed the physical orientation of the UE 2100's touch screen display. An indication signal from the orientation sensor can be available to any application program executing on the UE 2100, such that an application program can change the orientation of a screen display (e.g., from portrait to landscape) automatically when the indication signal indicates an approximate 90-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 2160 of the UE 2100 can take various forms depending on the particular exemplary embodiment of UE 2100 and of the particular interface requirements of other devices that the UE 2100 is intended to communicate with and/or control. For example, the control interface 2160 can comprise an RS-232 interface, a USB interface, an HDMI interface, a Bluetooth interface, an IEEE ("Firewire") interface, an I²C interface, a PCMCIA interface, or the like. In some exemplary embodiments of the present disclosure, control interface 2160 can comprise an IEEE 802.3 Ethernet interface such as described above. In some exemplary embodiments of the present disclosure, the control interface 2160 can comprise analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the UE 2100 can comprise more functionality than is shown in FIG. 21 including, for example, a video and/or still-image camera, microphone, media player and/or recorder, etc. Moreover, radio transceiver 2140 can include circuitry necessary to communicate using additional radio-frequency communication standards including Bluetooth, GPS, and/or others. Moreover, the processor 2110 can execute software code stored in the program memory 2120 to control such additional functionality. For example, directional velocity and/or position estimates output from a GPS receiver can be available to any application program executing on the UE 2100, including various exemplary methods and/or computer-readable media according to various exemplary embodiments of the present disclosure.

Figure 22:
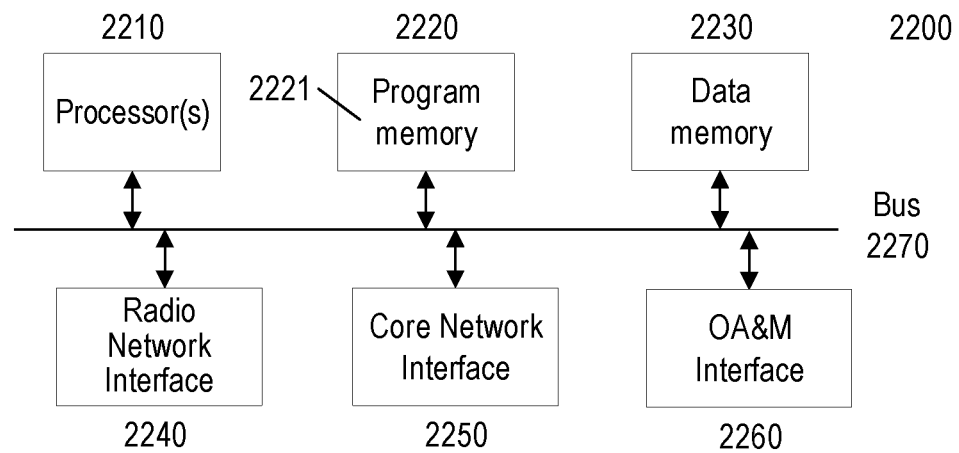
FIG. 22 shows a block diagram of an exemplary network node, according to various exemplary embodiments of the present disclosure.

FIG. 22 shows a block diagram of an exemplary network node 2200 according to various embodiments of the present disclosure, including those described above with reference to other figures. For example, exemplary network node 2200 can be configured by execution of instructions, stored on a computer-readable medium, to perform operations corresponding to one or more of the exemplary methods and/or procedures described above. In some exemplary embodiments, network node 2200 can comprise a base station, eNB, gNB, or one or more components thereof. For example, network node 2200 can be configured as a central unit (CU) and one or more distributed units (DUs) according to NR gNB architectures specified by 3GPP. More generally, the functionally of network node 2200 can be distributed across various physical devices and/or functional units, modules, etc.

Network node 2200 can include processor 2210 (also referred to as "processing circuitry") that is operably connected to program memory 2220 and data memory 2230 via bus 2270, which can include parallel address and data buses, serial ports, or other methods and/or structures known to those of ordinary skill in the art.

Program memory 2220 can store software code, programs, and/or instructions (collectively shown as computer program product 2221 in FIG. 22) that, when executed by processor 2210, can configure and/or facilitate network node 2200 to perform various operations. For example, execution of such stored instructions can configure network node 2200 to communicate with one or more other devices using protocols according to various embodiments of the present disclosure, including one or more exemplary methods and/or procedures discussed above. Program memory 2220 can also comprise software code executed by processor 2210 that can facilitate and specifically configure network node 2200 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with radio network interface 2240 and core network interface 2250. By way of example and without limitation, core network interface 2250 can comprise the S1 interface and radio network interface 2240 can comprise the Uu interface, as standardized by 3GPP. Program memory 2220 can further comprise software code executed by processor 2210 to control the functions of network node 2200, including configuring and controlling various components such as radio network interface 2240 and core network interface 2250.

Data memory 2230 can comprise memory area for processor 2210 to store variables used in protocols, configuration, control, and other functions of network node 2200. As such, program memory 2220 and data memory 2230 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 2210 can include multiple individual processors (not shown), each of which implements a portion of the functionality described above. In such case, multiple individual processors may be commonly connected to program memory 2220 and data memory 2230 or individually connected to multiple individual program memories and/or data memories. More generally, persons of ordinary skill will recognize that various protocols and other functions of network node 2200 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 2240 can comprise transmitters, receivers, signal processors, ASICs, antennas, beamforming units, and other circuitry that enables network node 2200 to communicate with other equipment such as, in some embodiments, a plurality of compatible user equipment (UE). In some embodiments, interface 2240 can also enable network node 2200 to communicate with compatible satellites of a satellite communication network. In some exemplary embodiments, radio network interface 2240 can comprise various protocols or protocol layers, such as the PHY, MAC, RLC, PDCP, and/or RRC layer protocols standardized by 3GPP for LTE, LTE-A, LTE-LAA, NR, NR-U, etc.; improvements thereto such as described herein above; or any other higher-layer protocols utilized in conjunction with radio network interface 2240. According to further exemplary embodiments of the present disclosure, the radio network interface 2240 can comprise a PHY layer based on OFDM, OFDMA, and/or SC-FDMA technologies. In some embodiments, the functionality of such a PHY layer can be provided cooperatively by radio network interface 2240 and processor 2210 (including program code in memory 2220).

In some embodiments, radio network interface 2240 can be used to transmit various signals that facilitate UE measurement of Doppler shift, RTT, etc. according to various embodiments described herein.

Core network interface 2250 can comprise transmitters, receivers, and other circuitry that enables network node 2200 to communicate with other equipment in a core network such as, in some embodiments, circuit-switched (CS) and/or packet-switched Core (PS) networks. In some embodiments, core network interface 2250 can comprise the S1 interface standardized by 3GPP. In some embodiments, core network interface 2250 can comprise the NG interface standardized by 3GPP. In some exemplary embodiments, core network interface 2250 can comprise one or more interfaces to one or more AMFs, SMFs, SGWs, MMES, SGSNs, GGSNs, and other physical devices that comprise functionality found in GERAN, UTRAN, EPC, 5GC, and CDMA2000 core networks that are known to persons of ordinary skill in the art. In some embodiments, these one or more interfaces may be multiplexed together on a single physical interface. In some embodiments, lower layers of core network interface 2250 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

In some embodiments, network node 2200 can include hardware and/or software that configures and/or facilitates network node 2200 to communicate with other network nodes in a RAN, such as with other eNBs, gNBs, ng-eNBs, en-gNBs, IAB nodes, etc. Such hardware and/or software can be part of radio network interface 2240 and/or core network interface 2250, or it can be a separate functional unit (not shown). For example, such hardware and/or software can configure and/or facilitate network node 2200 to communicate with other RAN nodes via the X2 or Xn interfaces, as standardized by 3GPP.

OA&M interface 2260 can comprise transmitters, receivers, and other circuitry that enables network node 2200 to communicate with external networks, computers, databases, and the like for purposes of operations, administration, and maintenance of network node 2200 or other network equipment operably connected thereto. Lower layers of OA&M interface 2260 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 2240, core network interface 2250, and OA&M interface 2260 may be multiplexed together on a single physical interface, such as the examples listed above.

Figure 23:
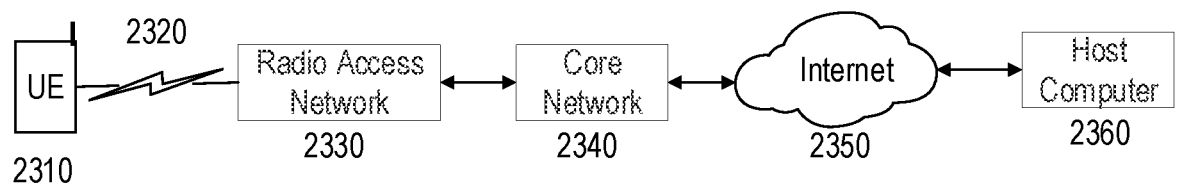
FIG. 23 shows a block diagram of an exemplary network configured to provide over-the-top (OTT) data services between a host computer and a UE, according to various exemplary embodiments of the present disclosure.

FIG. 23 is a block diagram of an exemplary communication network configured to provide over-the-top (OTT) data services between a host computer and a user equipment (UE), according to one or more exemplary embodiments of the present disclosure. UE 2310 can communicate with radio access network (RAN) 2330 over radio interface 2320, which can be based on protocols described above including, e.g., LTE, LTE-A, and 5G/NR. For example, UE 2310 can be configured and/or arranged as shown in other figures discussed above.

RAN 2330 can include one or more terrestrial network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 2330 can cooperatively operate using licensed and unlicensed spectrum. In some embodiments, RAN 2330 can include, or be capable of communication with, one or more satellites comprising a satellite access network.

RAN 2330 can further communicate with core network 2340 according to various protocols and interfaces described above. For example, one or more apparatus (e.g., base stations, eNBs, gNBs, etc.) comprising RAN 2330 can communicate to core network 2340 via core network interface 1650 described above. In some exemplary embodiments, RAN 2330 and core network 2340 can be configured and/or arranged as shown in other figures discussed above. For example, eNBs comprising an E-UTRAN 2330 can communicate with an EPC core network 2340 via an S1 interface, such as shown in FIG. 1. As another example, gNBs comprising a NR RAN 2330 can communicate with a 5GC core network 2330 via an NG interface.

Core network 2340 can further communicate with an external packet data network, illustrated in FIG. 23 as Internet 2350, according to various protocols and interfaces known to persons of ordinary skill in the art. Many other devices and/or networks can also connect to and communicate via Internet 2350, such as exemplary host computer 2360. In some exemplary embodiments, host computer 2360 can communicate with UE 2310 using Internet 2350, core network 2340, and RAN 2330 as intermediaries. Host computer 2360 can be a server (e.g., an application server) under ownership and/or control of a service provider. Host computer 2360 can be operated by the OTT service provider or by another entity on the service provider's behalf.

For example, host computer 2360 can provide an over-the-top (OTT) packet data service to UE 2310 using facilities of core network 2340 and RAN 2330, which can be unaware of the routing of an outgoing/incoming communication to/from host computer 2360. Similarly, host computer 2360 can be unaware of routing of a transmission from the host computer to the UE, e.g., the routing of the transmission through RAN 2330. Various OTT services can be provided using the exemplary configuration shown in FIG. 23 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 23 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The exemplary embodiments described herein provide techniques for UE determination of movement state (e.g., 2D position and velocity) based on receiving signals from a minimum of two spatially separated transmission points in a RAN. When used in UEs (e.g., UE 2310) and RAN nodes (e.g., gNBs comprising RAN 2330), exemplary embodiments described herein can provide various improvements, benefits, and/or advantages including highly accurate position and velocity estimates, even indoors or in other challenging propagation conditions, without requiring any special UE hardware. This enables a variety of new services from OTT service providers to end-users, such as seamless high-accuracy personal safety and navigation. As such, embodiments can provide significant value to both end users and OTT service providers.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The invention claimed is:

1. A method for determining a movement state of a user equipment (UE) operating in a radio access network (RAN), the method comprising:
    performing positioning measurements on signals received from a plurality of transmission points (TPs) in the RAN, wherein the positioning measurements include:
        first measurements of Doppler shift of signals from a first TP, and second measurements of Doppler shift of signals from a second TP that is spatially separated from the first TP, and
third measurements of signals from a third TP; and
determining a UE movement state based on the positioning measurements and an interacting multiple-model (IMM) that includes:
a first almost-constant velocity model,
a second maneuver velocity model, and
a Doppler shift bias state common to the first and second models.

2. The method of claim 1, wherein:
the third measurements are of signal round trip time (RTT), and
the third TP is the same as the first TP or the second TP.

3. The method of claim 2, wherein the third measurements are based on UE timing advance with respect to any of the following for the UE:
a primary cell (PCell);
a primary secondary cell (PSCell); and
a secondary cell (SCell).

4. The method of claim 1, wherein:
the third measurements are of Doppler shift, and
the third TP is spatially separated from the first TP and from the second TP.

5. The method of claim 1, wherein the UE movement state includes:
two-dimensional (2D) horizontal position;
2D horizontal velocity; and
Doppler shift bias.

6. The method of claim 1, wherein:
the IMM model also includes a Hidden Markov Model (HMM) comprising respective transition probabilities of the UE between any of the first and second models during successive updates of the UE movement state; and
each transition probability is dependent on the duration between successive updates of the UE movement state.

7. The method of claim 1, wherein:
the IMM also include estimated probabilities associated with the first and second models; and
determining the UE movement state comprises:
determining first and second movement states for the UE based on the respective first and second models, and
combining the first and second movement states into the UE movement state according to the estimated probabilities.

8. The method of claim 7, wherein the first and second movement states are determined using respective extended Kalman filters (EKFs).

9. The method of claim 1, wherein:
one of the first and second TPs is associated with a serving cell for the UE in the RAN; and
the other of the first and second TPs is associated with a neighbor cell for the UE in the RAN.

10. The method of claim 1, further comprising receiving, from a RAN node associated with at least one of the first and second TPs, a positioning measurement configuration including one or more of the following:
a request to initiate determination of UE movement state;
one or more first trigger events to initiate determination of UE movement state;
identification of one or more radio access technologies (RATs) of signals to be measured;
estimated signal round trip time (RTT) between the UE and a TP associated with the RAN node;
identification of the TP associated with the estimated RTT;
identification of a plurality of candidate TPs for Doppler shift measurements;
identification of downlink carrier frequencies used by the plurality of candidate TPs;
respective locations for the plurality of candidate TPs;
one or more rules or criteria for selecting TPs for Doppler shift measurements;
one or more second trigger events for reporting UE movement state;
one or more third trigger events for stopping reporting of UE movement state; and
a reporting interval for periodic reporting of UE movement states.

11. The method of claim 10, wherein the one or more third trigger events are implicit from the respective one or more second trigger events identified in the positioning measurement configuration.

12. The method of claim 10, wherein determining the UE movement state comprises:
determining a first value of the UE movement state based on the estimated signal RTT received from the RAN node; and
subsequently determining one or more second values of the UE movement state based on UE positioning measurements of signal RTT between the UE and the first TP or the second TP.

13. The method of claim 10, wherein the one or more second trigger events include any of the following:
a position within or outside of an area,
a position change threshold,
a speed or velocity threshold, and
a speed or velocity change threshold.

14. The method of claim 10, further comprising:
receiving from the RAN node a request for UE capability of movement state determination; and
sending to the RAN node an indication that the UE is capable of movement state determination.

15. The method of claim 10, wherein:
the measurement configuration is received after sending the indication; and
performing the positioning measurements is responsive to receiving the measurement configuration.

16. The method of claim 10, further comprising sending one or measurement reports to the RAN node, wherein:
each measurement report is responsive to one or more of the following: a second trigger event, a third trigger event, and the reporting interval; and
each measurement report includes:
at least a portion of the UE movement state determined at a particular measurement time,
the particular measurement time, and
identification of one or more of the following used in the positioning measurements from which the included UE movement state was determined: TPs, carrier frequencies, and signals.

17. The method of claim 16, wherein the one or measurement reports include:
a first measurement report responsive to the second trigger event; and
one or more second measurement reports at respective one or more reporting intervals after the first measurement report and until occurrence of the third trigger event.

18. A user equipment (UE) configured to determine movement state while operating in a radio access network (RAN), the UE comprising:
- radio transceiver circuitry configured to communicate with a RAN node and to perform measurements on signals received from the RAN; and
- processing circuitry operatively coupled to the radio transceiver circuitry, whereby the processing circuitry and the radio transceiver circuitry are configured to:
  - perform positioning measurements on signals received from a plurality of transmission points (TPs) in the RAN, wherein the positioning measurements include:
    - first measurements of Doppler shift of signals from a first TP, and
    - second measurements of Doppler shift of signals from a second TP that is spatially separated from the first TP, and
    - third measurements of signals from a third TP; and
  - determine a UE movement state based on the positioning measurements and an interacting multiple-model (IMM) that includes:
    - a first almost-constant velocity model,
    - a second maneuver velocity model, and
    - a Doppler shift bias state common to the first and second models.

19. The UE of claim 18, wherein the UE movement state includes:
- two-dimensional (2D) horizontal position;
- 2D horizontal velocity; and
- Doppler shift bias.

20. The UE of claim 18, wherein:
- the IMM model also includes a Hidden Markov Model (HMM) comprising respective transition probabilities of the UE between any of the first and second models during successive updates of the UE movement state; and
- each transition probability is dependent on the duration between successive updates of the UE movement state.

21. The UE of claim 18, wherein:
- the IMM also include estimated probabilities associated with the first and second models; and
- the processing circuitry is configured to determine the UE movement state based on:
  - determining first and second movement states for the UE based on the respective first and second models, and
  - combining the first and second movement states into the UE movement state according to the estimated probabilities.

22. The UE of claim 21, wherein the first and second movement states are determined using respective extended Kalman filters (EKFs).

* * * * *